(12) United States Patent
Kim et al.

(10) Patent No.: US 11,662,132 B2
(45) Date of Patent: *May 30, 2023

(54) SYSTEMS AND METHODS FOR CRYOGENIC STORAGE

(71) Applicant: Celltrio, Inc., Santa Clara, CA (US)

(72) Inventors: Jin-Oh Kim, Seongnam (KR); Jin Seok Han, Seongnam (KR); Seung Wook Na, Seongnam (KR); Soo-Mi Chung, Seongnam (KR); Ji-Wan Kim, Seongnam (KR); Jeffry Baird, Santa Clara, CA (US); Raphael Kim, Santa Clara, CA (US)

(73) Assignee: Celltrio, Inc., Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/588,011

(22) Filed: Jan. 28, 2022

(65) Prior Publication Data

US 2022/0390164 A1 Dec. 8, 2022

Related U.S. Application Data

(63) Continuation of application No. 17/170,274, filed on Feb. 8, 2021, now Pat. No. 11,333,419, which is a (Continued)

(30) Foreign Application Priority Data

Aug. 10, 2018 (KR) .................. 10-2018-0093526
Feb. 27, 2019 (KR) .................. 10-2019-0023138

(51) Int. Cl.
 *F25D 3/10* (2006.01)
 *A01N 1/02* (2006.01)
(Continued)

(52) U.S. Cl.
 CPC ........... *F25D 3/105* (2013.01); *A01N 1/0257* (2013.01); *B25J 21/00* (2013.01); *F25D 25/024* (2013.01);
(Continued)

(58) Field of Classification Search
 CPC . A01N 1/0257; B01L 7/50; B01L 2300/1894; F25D 3/105; F25D 25/04; F25D 25/00; F25D 29/001; G01N 2035/0465
 See application file for complete search history.

(56) References Cited

U.S. PATENT DOCUMENTS 5,536,128 A * 7/1996 Shimoyashiro ... H01L 21/67161
 118/719
5,921,102 A 7/1999 Vago
(Continued)

FOREIGN PATENT DOCUMENTS

EP 2060511 B1 11/2011
EP 2492663 A2 8/2012
(Continued)

OTHER PUBLICATIONS

European search report and opinion dated Mar. 30, 2022 for EP Application No. 19846983.5.
(Continued)

*Primary Examiner* — Lionel Nouketcha
(74) *Attorney, Agent, or Firm* — Wilson Sonsini Goodrich & Rosati

(57) ABSTRACT

The present disclosure provides cryogenic storage systems and methods of using the cryogenic storage systems. A cryogenic storage system of the present disclosure may comprise a cryogenic tank with an inner door and an outer door, and a robot apparatus located adjacent to the cryogenic tank. The cryogenic tank may store multiple racks such that at most a single rack is removable through the inner door or (Continued)

the outer door. The cryogenic tank may store the multiple racks in multiple groups of racks comprising a first group of racks located at a first radial distance and a second group of racks located at a second radial distance that is greater than the first radial distance. The robot apparatus may selectively open and close the inner or outer doors, and insert or withdraw the single rack into or out of the cryogenic tank through the inner door or the outer door.

20 Claims, 31 Drawing Sheets

Related U.S. Application Data continuation of application No. PCT/US2019/045548, filed on Aug. 7, 2019.

(51) Int. Cl.
| | | |
|---|---|---|
| *B25J 21/00* | (2006.01) | |
| *F25D 25/02* | (2006.01) | |
| *B01L 7/00* | (2006.01) | |
| *F25D 25/00* | (2006.01) | |
| *F25D 29/00* | (2006.01) | |
| *G01N 35/04* | (2006.01) | |
| *F25D 25/04* | (2006.01) | |

(52) U.S. Cl.
CPC ......... *B01L 7/50* (2013.01); *B01L 2300/1894* (2013.01); *F25D 25/00* (2013.01); *F25D 25/04* (2013.01); *F25D 29/001* (2013.01); *G01N 2035/0465* (2013.01)

(56) References Cited

U.S. PATENT DOCUMENTS

| | | | |
|---|---|---|---|
| 7,540,168 B2 * | 6/2009 | Schumann | ............... A01N 1/02 |
| | | | 62/378 |
| 8,083,080 B2 | 12/2011 | Li et al. | |
| 8,925,346 B2 | 1/2015 | Natarajan et al. | |
| 9,163,869 B2 | 10/2015 | Warhurst et al. | |
| 10,421,607 B2 * | 9/2019 | Caveney | ............... A01N 1/0236 |
| 11,333,419 B2 | 5/2022 | Kim et al. | |
| 2009/0144494 A1 | 6/2009 | Lin et al. | |
| 2009/0188272 A1 | 7/2009 | Cloutier et al. | |
| 2012/0060520 A1 * | 3/2012 | Collins | ................... F17C 3/085 |
| | | | 62/62 |
| 2014/0000307 A1 | 1/2014 | Fuhr et al. | |
| 2016/0095309 A1 * | 4/2016 | Reuteler | ................... A47F 5/00 |
| | | | 414/281 |
| 2016/0288999 A1 | 10/2016 | Caveney et al. | |
| 2016/0289000 A1 | 10/2016 | Caveney et al. | |
| 2018/0055043 A1 | 3/2018 | Aota et al. | |
| 2018/0202908 A1 * | 7/2018 | Croquette | .............. G01N 35/00 |
| 2018/0224180 A1 | 8/2018 | Berchowitz | |

FOREIGN PATENT DOCUMENTS

| | | |
|---|---|---|
| JP | 2015054572 A | 3/2015 |
| JP | 2018514737 A | 6/2018 |
| KR | 20170129123 A | 11/2017 |
| WO | WO-2016148254 A1 | 9/2016 |
| WO | WO-2016160984 A1 | 10/2016 |
| WO | WO-2020033578 A1 | 2/2020 |

OTHER PUBLICATIONS

International search report with written opinion dated Nov. 5, 2019 for PCT/US2019/045548.
Notice of Allowance dated Nov. 10, 2021 for U.S. Appl. No. 17/170,274.
Office action dated Jul. 28, 2021 for U.S. Appl. No. 17/170,274.

\* cited by examiner (a)

(b)

SYSTEMS AND METHODS FOR CRYOGENIC STORAGE

CROSS-REFERENCE

This application is a continuation application of U.S. application Ser. No. 17/170,274 filed on Feb. 8, 2021, which is a continuation of International Application No. PCT/US2019/045548 filed on Aug. 7, 2019, which claims priority to Korean Patent Application No. 10-2018-0093526 filed on Aug. 10, 2018, and Korean Patent Application No. 10-2019-0023138 filed on Feb. 27, 2019, each of which is incorporated herein by reference in its entirety for all purposes.

BACKGROUND

Cryopreservation may be used to keep biological materials (e.g., a cell sample) at ultra-low temperatures that can temporarily stop biological activity and preserve the biological materials for thawing and/or processing at a later time. Cryogenic storage systems may provide a temperature-controlled cryogenic environment that enables cryopreservation of biological materials received and stored within the cryogenic storage system. Some cryogenic storage systems may be configured to hold one or more racks in a cryogenic storage tank. Such systems may provide a plurality of doors allowing a user or operator to access one or more racks in the cryogenic storage tank.

In general, a cryogenic storage tank may comprise one or more doors with a larger area than a rack held within the cryogenic storage tank. The door may be opened to allow insertion of a rack into the storage tank and/or removal of a rack from the storage tank. Since the door may have a larger area than a rack, when a rack comes into or out of the cryogenic tank, the tank may discharge nitrogen gas, thereby affecting the storage temperatures for target materials contained in other racks held within the cryogenic tank. Further, the position of the door and the arrangement of racks within the cryogenic tank may require additional time and/or movement for an operator or a robot apparatus to open or close a door, which may result in low uniformity of storage temperatures across multiple racks stored within the cryogenic tank.

SUMMARY

The present disclosure provides systems and methods for cryogenic storage. The systems and methods disclosed herein may reduce the amount of nitrogen gas discharged when a rack comes in and out of the system. The systems and methods disclosed herein may minimize the time and/or movement required for an operator or a robot apparatus to open and/or close one or more doors of the cryogenic storage system, thereby increasing the efficiency of the operator or robot apparatus and enhancing the uniformity of storage temperatures across multiple racks of the cryogenic storage systems. The systems and methods disclosed herein may also increase the packing density of a cryogenic storage tank and reduce the maximum separation distances between racks, as compared with conventional cryogenic tanks.

In an aspect, the present disclosure provides a cryogenic storage system. The cryogenic storage system may comprise: a cryogenic tank comprising an inner door and an outer door through which a rack is insertable into the cryogenic tank or removable from the cryogenic tank, wherein the cryogenic tank is configured to hold multiple racks that are rotatable relative to (a) a center of the cryogenic tank and (b) the inner door or the outer door, and wherein the cryogenic tank is configured to hold the multiple racks such that no more than a single rack of the multiple racks is removable from the cryogenic tank via the inner door or the outer door at any given instance; and a robot apparatus that is located adjacent to the cryogenic tank and configured to (i) selectively open or close the inner door or the outer door, and (ii) insert or withdraw the single rack into or out of the cryogenic tank through the inner door or the outer door.

In some embodiments, the cryogenic tank may be configured to hold the multiple racks in a ring configuration comprising a first group of racks and a second group of racks, wherein the first group of racks is located at a first radial distance from the center of the cryogenic tank and the second group of racks is located at a second radial distance from the center of the cryogenic tank. IN some embodiments, the first radial distance may be less than the second radial distance.

In some embodiments, the first group of racks may be configured to move along a first circumferential path that coincides with the inner door, and the second group of racks may be configured to move along a second circumferential path that coincides with the outer door.

In some embodiments, the inner door may be configured to allow access to a first rack included in the first group of racks when the first rack is positioned adjacent to the inner door, and the outer door may be configured to allow access to a second rack included in the second group of racks when the second rack is positioned adjacent to the outer door.

In some embodiments, the single rack may be selected from the first group of racks or the second group of racks.

In some embodiments, for any rotational angle ranging between 0 degrees and 360 degrees, the single rack may positioned adjacent to either the inner door or the outer door such that the single rack may be removable from the cryogenic tank via either the inner door or the outer door In some embodiments, the first rack included in the first group of racks and the second rack included in the second group of racks may be respectively positioned adjacent to the inner door and the outer door at different time instances, such that no more than one rack from the first group of racks and the second group of racks is accessible via the inner door or the outer door at any given time instance.

In some embodiments, the first rack included in the first group of racks may not be positioned adjacent to the inner door when the second rack included in the second group of racks is positioned adjacent to the outer door.

In some embodiments, the second rack included in the second group of racks may not be positioned adjacent to the outer door when the first rack included in the first group of racks is positioned adjacent to the inner door.

In some embodiments, the first rack included in the first group of racks may be accessible via the inner door when the second rack included in the second group of racks is not accessible via the outer door.

In some embodiments, the second rack included in the second group of racks may be accessible via the outer door when the first rack included in the first group of racks is not accessible via the inner door.

In some embodiments, the first rack included in the first group of racks and the second rack included in the second group of racks may be respectively accessible via the inner door and the outer door in a sequential manner when the first group of racks and the second group of racks are rotated relative to the center of the cryogenic tank.

In another aspect, the present disclosure provides a cryogenic storage system for storing multiple racks. The system may comprise: a cryogenic tank comprising an inner door and an outer door through which a rack of the multiple racks is insertable into the cryogenic tank or removable from the cryogenic tank, wherein the cryogenic tank is configured to hold the multiple racks in a ring configuration comprising (i) a first group of racks located at a first radial distance from the center of the cryogenic tank and (ii) a second group of racks located at a second radial distance from the center of the cryogenic tank, and wherein a center point of the cryogenic tank and a center point of the inner door lie along a first axis, and the center point of the cryogenic tank and a center point of the outer door lie along a second axis that is different from the first axis.

In some embodiments, the first axis and the second axis may not be parallel with each other. In some embodiments, the first axis and the second axis may intersect at an angle. In some embodiments, the angle may range from 0 degrees to about 90 degrees.

In some embodiments, the first axis and the second axis may lie on substantially a same plane. In some embodiments, the first axis may lie on a first plane, and the second axis may lie on a second plane that is different from the first plane. In some embodiments, the first plane and the second plane may be substantially parallel to each other. In some embodiments, the first plane and the second plane may be oblique to each other.

In some embodiments, the first axis and the second axis may not lie along a common radial lien extending from a center point of the cryogenic tank.

In some embodiments, the cryogenic tank may be configured to rotate the multiple racks relative to (a) a center of the cryogenic tank and (b) the inner door and the outer door. In some embodiments, the cryogenic tank may be configured to hold the multiple racks such that at most one rack of the multiple racks is removable from the cryogenic tank through the inner door or the outer door at a given time instance.

In some embodiments, the cryogenic storage system may further comprise a robot apparatus that is located adjacent to the cryogenic tank and configured to (i) selectively open or close the inner door or the outer door, and (ii) insert or withdraw the rack into or out of the cryogenic tank through the inner door or the outer door.

In some embodiments, the rack may comprise no more than a single rack insertable into the cryogenic tank or removable from the cryogenic tank via the inner door or the outer door. In some embodiments, the rack may comprise an array of subracks comprising two or more subracks insertable into the cryogenic tank or removable from the cryogenic tank via the inner door or the outer door.

In another aspect, the present disclosure provides a cryogenic storage system. The cryogenic storage system may comprise: a cryogenic tank comprising an inner door and an outer door through which a rack is insertable into the cryogenic tank or removable from the cryogenic tank, wherein the cryogenic tank is configured to hold (i) a first group of racks at a first radial distance from a center of the cryogenic tank and (ii) a second group of racks at a second radial distance from the center of the cryogenic tank, and wherein the first group of racks has a different angular orientation than the second group of racks relative to a radial line extending from the center of the cryogenic tank.

In some embodiments, the first group of racks and the second group of racks may be rotatable relative to (a) the center of the cryogenic tank and (b) the inner door and the outer door.

In some embodiments, the cryogenic tank may be configured to hold the first group of racks and the second group of racks such that at most a single rack from either the first group of racks or the second group of racks is removable from the cryogenic tank through the inner door or the outer door.

In some embodiments, the cryogenic storage system may further comprise a robot apparatus located adjacent to the cryogenic tank and configured to (i) selectively open or close the inner door or the outer door, and (ii) insert or withdraw the rack into or out of the cryogenic tank through the inner door or the outer door.

In some embodiments, the single rack may comprise an array of subracks comprising two or more subracks insertable into the cryogenic tank or removable from the cryogenic tank via the inner door or the outer door.

In another aspect, the present disclosure provides a cryogenic storage system for storing multiple racks. The cryogenic storage system may comprise: a cryogenic tank comprising an inner door and an outer door each located on an upper surface of the cryogenic tank, wherein the cryogenic tank is configured to hold the multiple racks in a ring configuration comprising (i) a first group of racks located at a first radial distance from a center of the cryogenic tank and (ii) a second group of racks located at a second radial distance from the center of the cryogenic tank, and wherein a center of the inner door and a center of the outer door lie along an axis that is laterally offset by a distance from the center of the cryogenic tank.

In some embodiments, the axis may not lie along a radial line extending from the center of the cryogenic tank.

In some embodiments, the cryogenic storage system may further comprise: a receiving unit configured to arrange the multiple racks such that at most a single rack from the first group of racks and the second group of racks is removable from the cryogenic tank through the inner door or the outer door; and a rotatable frame structure configured to rotate the first group of racks and the second group of racks relative to the center of the cryogenic tank.

In some embodiments, the rotatable frame structure may be configured to (i) position the first group of racks at the inner door by rotating the multiple racks by a first set of rotational angles and (ii) position the second group of racks at the outer door by rotating the multiple racks by a second set of rotational angles.

In some embodiments, the rotatable frame structure may be configured to position the first group of racks and the second group of racks in an arrangement exhibiting point symmetry with respect to the center of the cryogenic tank.

In some embodiments, the rotatable frame structure may be configured to (i) align consecutive racks within the first group of racks with the inner door when the multiple racks are rotated by a first rotational angle, and (ii) align consecutive racks within the second group of racks with the outer door when the multiple racks are rotated by a second rotational angle. In some embodiments, the first rotational angle may be greater than the second rotational angle.

In some embodiments, the inner door and the outer door may be positioned at different radial distances from the center of the cryogenic tank.

In some embodiments, the cryogenic storage system may further comprise a robot apparatus located adjacent to the cryogenic tank and configured to selectively (i) open the inner door, (ii) close the inner door, (iii) open the outer door, (iv) close the outer door, (v) insert a rack of the first group of racks or the second group of racks into the cryogenic tank, and (vi) withdraw a rack of the first group of racks or the second group of racks from the cryogenic tank.

In some embodiments, the single rack may comprise an array of subracks comprising two or more subracks insertable into the cryogenic tank or removable from the cryogenic tank via the inner door or the outer door.

In some embodiments, the robot apparatus may comprise a puller configured to withdraw a rack from the cryogenic tank or insert a rack into the cryogenic tank, which puller may include: (a) a grip portion configured to grip one of the inner door, the outer door, the first rack of the first group of racks, or the second rack of the second group of racks; and (b) a moving bar that is configured to extend upward from the grip portion and move in an upward direction, a downward direction, and in a direction parallel to the inner door and the outer door.

In some embodiments, the puller may be configured to grip one of the inner door or the outer door and (i) place the inner door on the outer door, thereby exposing an inner open region, or (ii) place the outer door on the inner door, thereby exposing an outer open region.

In some embodiments, the robot apparatus may further comprise: a housing; a pusher configured to push a box to extend at least a portion of the box out of the housing when the rack is withdrawn from the cryogenic tank; and a box door that is provided on the housing and configured to allow at least the portion of the box to pass through the box door when the box is pushed by the pusher, such that the portion of the box is exposed to the outside of the housing.

In some embodiments, the box door may comprise (i) an inner box door configured such that a box within a rack from the first group of racks passes through the inner box door when pushed by the pusher and (ii) an outer box door configured such that a box within a rack from the second group of racks passes through the outer box door when pushed by the pusher.

In some embodiments, the pusher may be configured to push the box such that the portion of the box is exposed to the outside of the housing when the rack is withdrawn from the cryogenic tank. In some embodiments, the puller may be configured to move the rack in a downward direction to be inserted into the cryogenic tank when the box is partially pushed by the pusher and eliminated from the rack.

In some embodiments, the pusher may be further configured to push a partially pushed box and forcibly eliminate the partially pushed box from the rack if the partially pushed box is not eliminated from the rack within a predetermined period of time, and wherein the puller is configured to move the rack in the downward direction to insert the rack into the cryogenic tank if the box is forcibly eliminated from the rack.

In some embodiments, the robot apparatus may further comprise a box door sensor configured to (i) obtain opening information associated with the box door, and (ii) provide the opening information to a processor, which processor is configured to determine, based on the opening information, (a) whether or not a time to remove the box exceeds a predetermined period of time, (b) whether or not an operator is present to receive the box, and (c) whether or not to extend the pusher to remove the box from the rack.

In some embodiments, the robot apparatus may further comprise a push sensing unit configured to (i) obtain push information associated with the pusher, and (ii) calculate, based on the push information, the degree of insertion of the box into the rack.

In some embodiments, the puller may further comprise a temporary door provided on the moving bar and above the grip portion, which temporary door may be configured to temporarily close the inner open region or the outer open region when any one of the inner door or the outer door is opened.

In some embodiments, the temporary door may be provided on the moving bar with one or more degrees of freedom in an upward and a downward direction, and a guide unit that guides an upward movement of the temporary door may be provided on a level between the temporary door of the moving bar and the grip portion such that: (i) when the grip portion is moved in a downward direction to be inserted into the inner open region or outer open region, the temporary door is configured to (a) mount on an edge of the inner open region or outer open region and (b) close the inner open region or the outer open region through which the grip portion is inserted, and (ii) when the grip portion is moved in an upward direction to be withdrawn from the cryogenic tank, (a) the guide unit is configured to support the temporary door, and (b) the temporary door is configured to move in the upward direction in line with the moving bar.

In some embodiments, the puller may be configured to close the inner open region or the outer open region when a time during which the temporary door closes the inner open region or the outer open region exceeds a predetermined period of time.

In another aspect, the present disclosure provides a method for accessing multiple racks. The method may comprise: (a) providing (i) a cryogenic tank and a robot apparatus, which robot apparatus is located adjacent to the cryogenic tank; and (ii) the multiple racks in the cryogenic tank, wherein the multiple racks are arranged in multiple groups of racks, which multiple groups of racks comprise a first group of racks with a first rack located at a first radial distance and a second group of racks with a second rack located at a second radial distance that is greater than the first radial distance; and (b) withdrawing or inserting at most one rack of the first group of racks or the second group of racks through an inner door or an outer door of the cryogenic tank using the robot apparatus, wherein a center of the cryogenic tank and a center of the inner door lie along a first axis, and wherein the center of the cryogenic tank and a center of the outer door lie along a second axis. In some embodiments, the first axis and the second axis may be non-parallel to each other.

In some embodiments, the inner door may be configured to allow access to the first rack included in the first group of racks when the first rack is positioned adjacent to the inner door, and the outer door may be configured to allow access to the second rack included in the second group of racks when the second rack is positioned adjacent to the outer door.

In some embodiments, the multiple racks may be rotatable relative to the inner door and the outer door, and the cryogenic tank may be configured to hold the multiple racks such that, for a rotational angle between 0 degrees and 360 degrees, at most a single rack of the multiple racks is removable from the cryogenic tank through the inner door or the outer door.

In some embodiments, when the first rack of the first group of racks is oriented at a first angle relative to a center line of the cryogenic tank, each individual rack of the second group of racks may be oriented at one or more angles relative to the center line of the cryogenic tank, which one or more angles may be different than the first angle.

In some embodiments, the robot apparatus may be configured to (i) selectively open or close the inner door or the outer door, and (ii) insert or withdraw the single rack into or out of the cryogenic tank through the inner door or the outer door.

In another aspect, the present disclosure provides a method for accessing multiple racks. The method may comprise: (a) providing (i) a cryogenic tank and a robot apparatus, which robot apparatus is located adjacent to the cryogenic tank; and (ii) the multiple racks in the cryogenic tank, wherein the multiple racks are arranged in multiple groups of racks, which multiple groups of racks comprise a first group of racks with a first rack located at a first radial distance and a second group of racks with a second rack located at a second radial distance that is greater than the first radial distance; and (b) withdrawing or inserting a rack of the first group of racks or the second group of racks through an inner door or an outer door of the cryogenic tank using the robot apparatus, wherein the first group of racks has a different angular orientation than the second group of racks relative to a radial line extending from the center of the cryogenic tank.

In some embodiments, the first group of racks and the second group of racks may be rotatable relative to (a) the center of the cryogenic tank and (b) the inner door and the outer door.

In some embodiments, the cryogenic tank may be configured to hold the first group of racks and the second group of racks such that at most a single rack from either the first group of racks or the second group of racks is removable from the cryogenic tank through the inner door or the outer door.

In another aspect, the present disclosure provides a method for accessing multiple racks. The method may comprise: (a) providing (i) a cryogenic tank and a robot apparatus, which robot apparatus is located adjacent to the cryogenic tank; and (ii) the multiple racks in the cryogenic tank, wherein the multiple racks are arranged in multiple groups of racks, which multiple groups of racks comprise a first group of racks with a first rack located at a first radial distance and a second group of racks with a second rack located at a second radial distance that is greater than the first radial distance; and (b) withdrawing or inserting a rack of the first group of racks or the second group of racks through an inner door or an outer door of the cryogenic tank using the robot apparatus, wherein a center of the inner door and a center of the outer door lie along an axis that is laterally offset by a distance from the center of the cryogenic tank. In some embodiments, the axis may not lie along a radial line extending from the center of the cryogenic tank.

In some embodiments, the cryogenic tank may be configured to hold the first group of racks and the second group of racks such that at most a single rack from either the first group of racks or the second group of racks is removable from the cryogenic tank through the inner door or the outer door.

In another aspect, the present disclosure provides a method for accessing multiple racks. The method may comprise: (a) providing (i) a cryogenic tank and a robot apparatus, which robot apparatus is located adjacent to the cryogenic tank; and (ii) the multiple racks in the cryogenic tank, wherein the multiple racks are arranged in multiple groups of racks, which multiple groups of racks comprise a first group of racks with a first rack located at a first radial distance and a second group of racks with a second rack located at a second radial distance that is greater than the first radial distance; and (b) withdrawing or inserting a rack of the first group of racks or the second group of racks through an inner door or an outer door of the cryogenic tank using the robot apparatus. In some embodiments, the cryogenic tank may be configured to hold the first group of racks and the second group of racks such that no more than a single rack is removable from the cryogenic tank via the inner door or the outer door at any given instance.

In some embodiments, the single rack may comprise no more than one rack insertable into the cryogenic tank or removable from the cryogenic tank via the inner door or the outer door.

In some embodiments, the single rack may comprise an array of racks comprising two or more racks insertable into the cryogenic tank or removable from the cryogenic tank via the inner door or the outer door.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the present disclosure are set forth with particularity in the appended claims. A better understanding of the features and advantages of the present disclosure will be obtained by reference to the following detailed description that sets forth illustrative embodiments, in which the principles of the present disclosure are utilized, and the accompanying drawings (also "Figure" and "FIG." herein), of which:

DETAILED DESCRIPTION

While various embodiments of the present disclosure are shown and described herein, it will be obvious to those skilled in the art that such embodiments are provided by way of example only. Numerous variations, changes, and substitutions may occur to those skilled in the art without departing from the present disclosure. It should be understood that various alternatives to the embodiments of the present disclosure described herein may be employed.

The term "box," as used herein, generally refers to any labware that may be configured to hold and/or store one or more objects or samples. Labware may refer to any equipment that may be used in a laboratory or research environment. Examples of labware may include a holder or a container configured to hold and/or store one or more objects (e.g., biological samples). Other examples of labware may include SBS microplates (e.g., 96 well SBS microplates, 384 well SBS microplates, or 1536 well SBS microplates), cassettes, glassware (e.g., bottles, beakers, slides, dishes, flasks, vials, and/or tubes), or vial storage boxes.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

The term "connected to" or "coupled to" may be used to designate a connection or coupling of one element to another element, and may include cases where an element is directly connected or coupled to another element, cases where an element is indirectly connected or coupled to another element (e.g., through one or more intermediate elements), and/or cases where an element is physically or operatively coupled to another element via yet another element.

The terms "on", "above", "on an upper end", "below", "under", and "on a lower end" may be used to designate a position of a first element with respect to a second element, and may include cases where the first element is directly adjacent to the second element, and/or cases in which there may be one or more other elements between the first element and the second element.

Figure 3A:
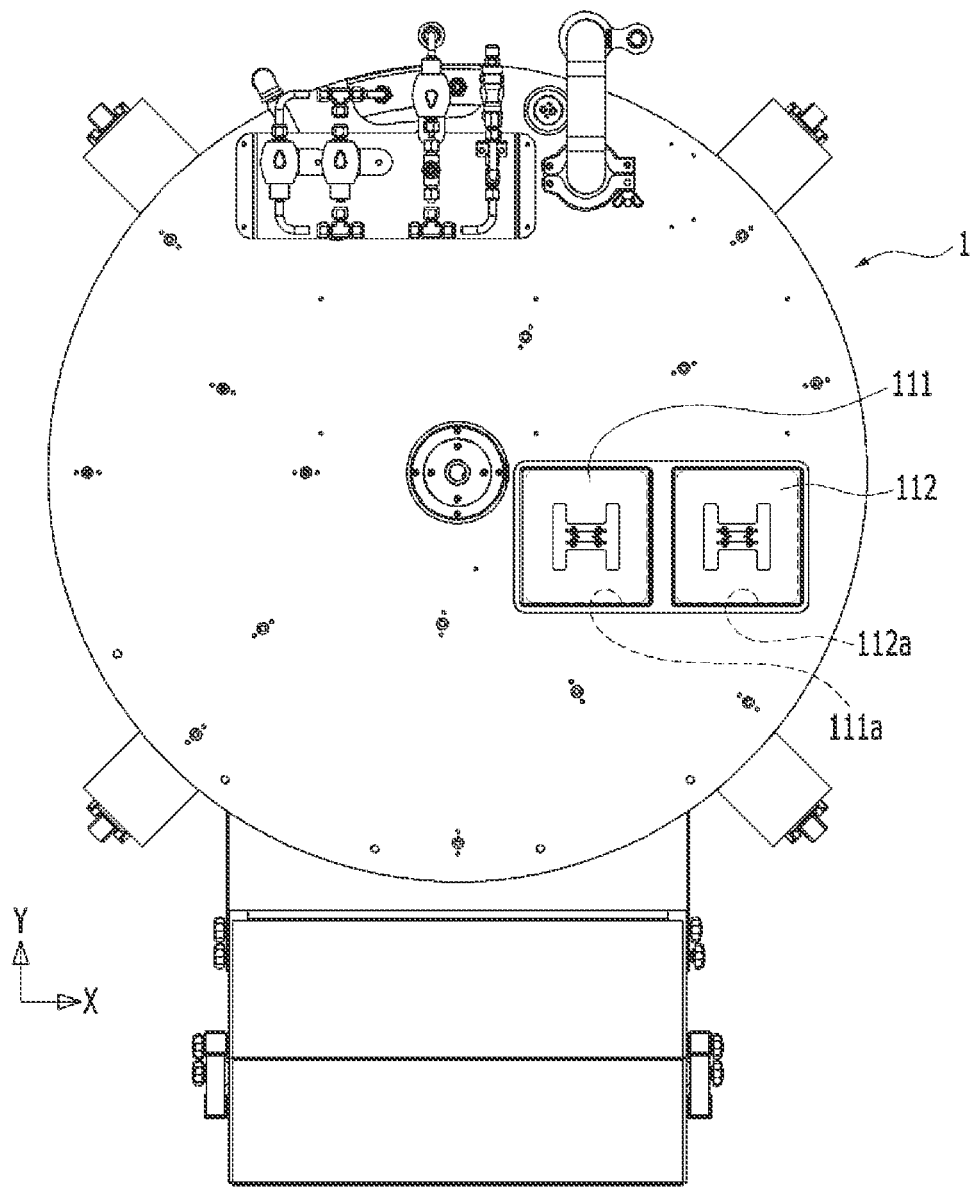
FIG. 3A is a plan view of a cryogenic tank provided to explain an inner door and an outer door of a cryogenic storage system, in accordance with some embodiments.

Further, in the explanation of the embodiments of the present disclosure, the terms (upper side, lower side, etc.) related to directions or positions may be defined with reference to the spatial arrangement of respective components illustrated in the drawings. In FIG. 3A, for example, a general 12 o'clock position may refer to a portion of an upper side of the cryogenic tank that coincides with a radial line extending upwards from the center of the cryogenic tank in the positive Y direction, and a general 6 o'clock position may refer to a portion of a lower side of the cryogenic tank that coincides with a radial line extending downwards from the center of the cryogenic tank in the negative Y direction.

The present disclosure provides a cryogenic storage system for storing multiple racks containing one or more biological samples.

Figure 1A:
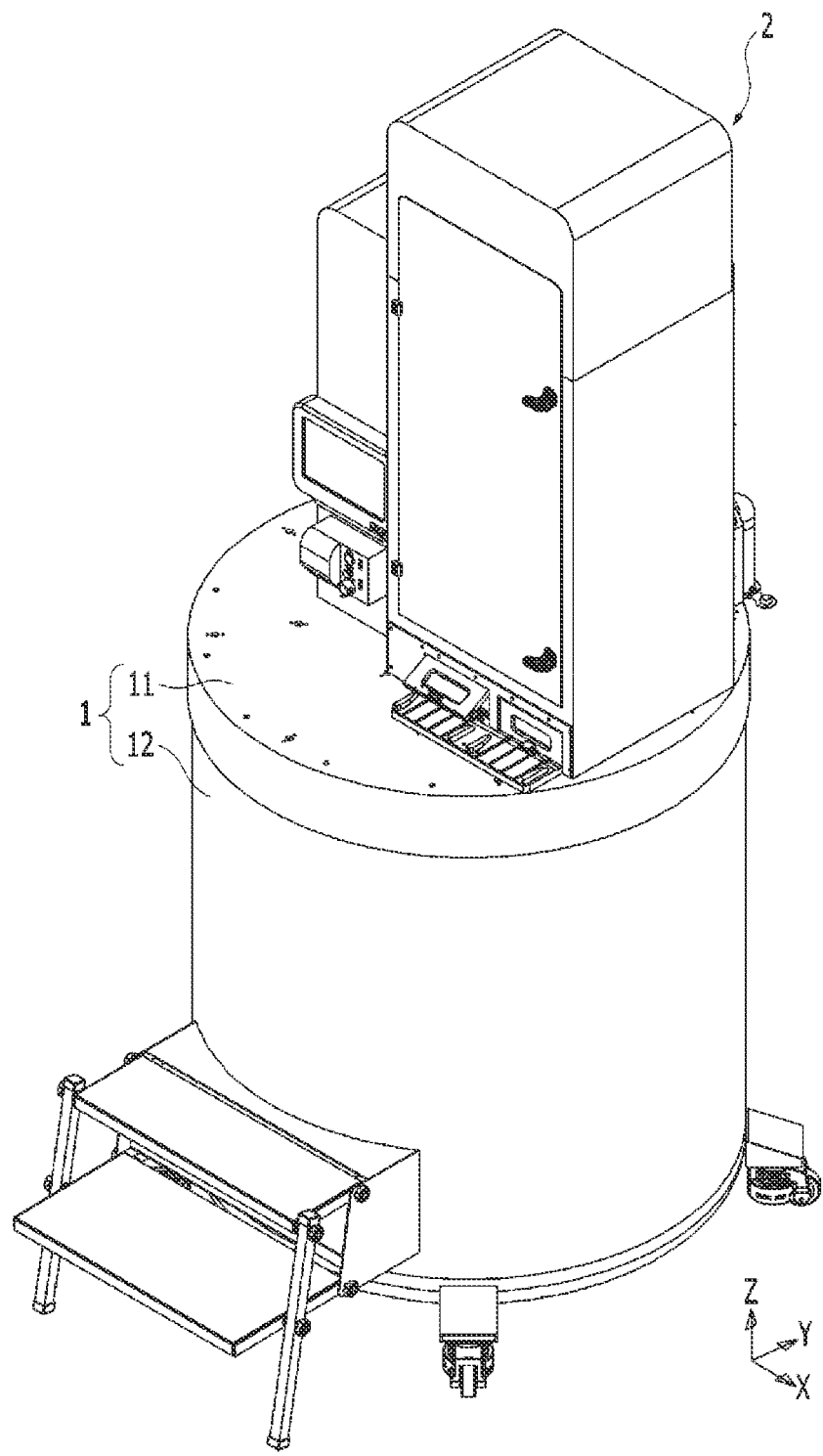
FIG. 1A is a schematic perspective view of the present cryogenic storage system, in accordance with some embodiments.
Figure 1B:
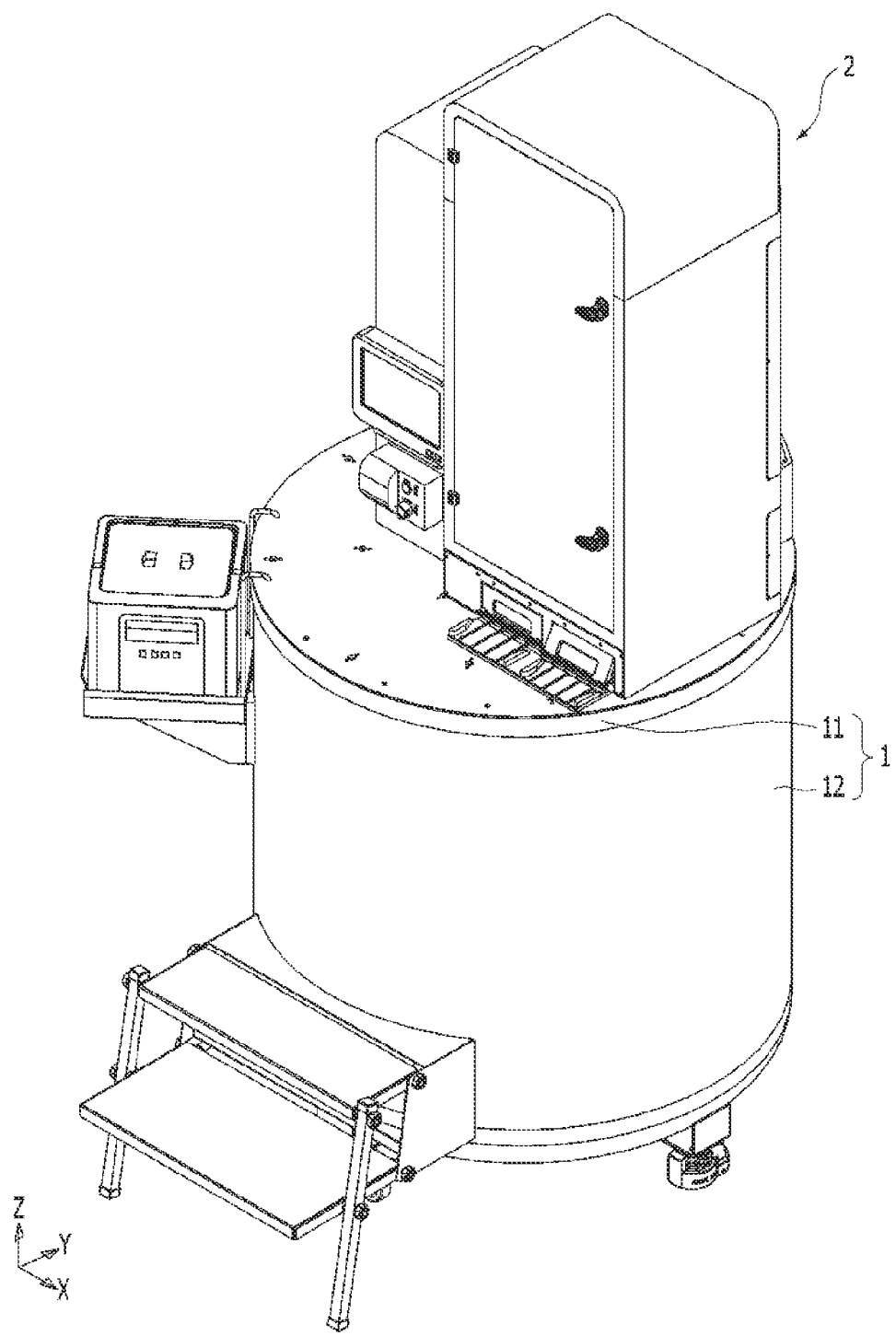
FIG. 1B illustrates the present cryogenic storage system, in accordance with some embodiments.

FIGS. 1A-1B illustrate a cryogenic storage system for storing one or more racks. As shown in FIGS. 1A-1B, the present cryogenic storage system may include a cryogenic tank 1 and a robot apparatus 2. The cryogenic tank may comprise a lid 11 and a receiving part 12 that is configured to receive multiple racks comprising one or more racks. The lid 11 may be positioned adjacent to and/or above the receiving part 12 of the cryogenic tank. The cryogenic tank may be configured to house one or more racks in a configuration that comprises a first group of racks and a second group of racks. The one or more racks in the first group of racks and the second group of racks may be arranged in a ring configuration around a center of the cryogenic tank. The one or more racks of the first group of racks may be located at a first radial distance from a center of the cryogenic tank. The one or more racks of the second group of racks may be located at a second radial distance from a center of the cryogenic tank.

In some cases, the cryogenic tank may be configured to house one or more racks in a configuration that comprises a plurality of rack groups. The plurality of rack groups may comprise n groups of racks, where n may be at least about one, two, three, four, five, six, seven, eight, nine, ten, eleven, twelve, thirteen, fourteen, fifteen, sixteen, seventeen, eighteen, nineteen, twenty, thirty, forty, fifty, sixty, seventy, eighty, ninety, one hundred, or more. Each group of racks of the plurality of rack groups may be arranged in a ring configuration around a center of the cryogenic tank. Each group of racks of the plurality of rack groups may or may not be disposed at a same radial distance from a center of the cryogenic tank. In some cases, each group of racks of the plurality of rack groups may be disposed at a different radial distance from a center of the cryogenic tank.

In any of the embodiments described herein, the multiple racks comprising one or more racks may be arranged in multiple groups of racks. The multiple groups of racks may comprise a first group of racks, a second group of racks, and a plurality of intermediate rack groups located between the first group of racks and the second group of racks. The multiple groups of racks may comprise n groups of racks, where n may be at least about one, two, three, four, five, six, seven, eight, nine, ten, eleven, twelve, thirteen, fourteen, fifteen, sixteen, seventeen, eighteen, nineteen, twenty, thirty, forty, fifty, sixty, seventy, eighty, ninety, one hundred, or more. Each group of racks may comprise a plurality of racks arranged in a ring configuration around a center of the cryogenic tank. Each group of racks may be located at a radial distance from a center of the cryogenic tank. Each group of racks of the multiple groups of racks may be located at a different radial distance from a center of the cryogenic tank. For example, a first group of racks may be located at a first radial distance, a second group of racks may be located at a second radial distance, a third group of racks may be located at a third radial distance, a fourth group of racks may be located at a fourth radial distance, a fifth group of racks may be located at a fifth radial distance, and so on. The first radial distance, the second radial distance, the third radial distance, the fourth radial distance, and the fifth radial distance may all correspond to different radial distances from a center of the cryogenic tank.

The multiple racks may be configured to house one or more boxes in a vertical orientation. A box may be a holder or a container configured to hold and/or store one or more objects. The holder and/or the container may or may not be enclosed. The holder and/or the container may have at least one wall or side configured to partially surround, enclose, or cover an object held and/or stored within the holder and/or the container. The holder and/or the container may have one or more supporting members configured to hold and/or store one or more objects in a desired orientation, position, or configuration. In some cases, the box may be any kind of labware configured to hold and/or store one or more objects. Labware may include any equipment that may be used in a laboratory or research environment. Examples of labware may include a holder or a container configured to hold and/or store one or more objects (e.g., biological samples). Other examples of labware may include SBS microplates (e.g., 96 well SBS microplates, 384 well SBS microplates, or 1536 well SBS microplates), cassettes, glassware (e.g., bottles, beakers, slides, dishes, flasks, vials, and/or tubes), or vial storage boxes. A microplate may be a plate with one or more wells configured to hold one or more objects or samples (e.g., a fluid sample). A cassette may be an open, closed, or partially enclosed structure configured to hold one or more objects or samples (e.g., a blood bag or a bag containing a solid object, a fluid, a liquid, or a gas). A box as used herein may be interchanged with any one of a holder, a container, a microplate, a cassette, glassware, or any storage device configured to hold one or more objects or samples. Further, any racks or any groups of racks described herein may be configured to house and/or store any one of a holder, a container, a microplate, a cassette, glassware, or any storage device configured to hold one or more objects or samples. The storage device may not be limited to a box. The storage device may comprise one or more internal regions configured to store an object or a sample. The storage device may comprise one or more openings configured to provide access to a stored object or sample. The storage device may be configured to hold and/or store one or more biological samples (e.g., tissue, blood, organs, plasma, urine, skin, hair, etc.). The one or more biological samples may be a solid, a liquid, a gas, and/or plasma. The box may be interchanged with any labware or storage device configured to hold one or more objects or samples, depending on the type of sample and/or a desired method of cryogenic storage or preservation.

The cryogenic storage system may comprise a robot apparatus 2 configured to insert and/or withdraw one or more racks into or out of the cryogenic tank 1 through an inner door and an outer door of the cryogenic tank 1. The robot apparatus 2 may be located adjacent to the lid 11 of the cryogenic tank 1. The robot apparatus 2 may be configured to selectively open and close the inner door or the outer door before and/or after inserting or withdrawing one or more racks into or out of the cryogenic tank 1.

As illustrated in FIG. 1B, the cryogenic storage system may comprise an external storage unit configured to house one or more biological materials, samples, vials, and/or boxes containing the one or more biological materials, samples, and/or vials. The external storage unit may be positioned and/or secured adjacent to an outer edge of the lid 11 of the cryogenic storage tank 1.

Figure 2A:
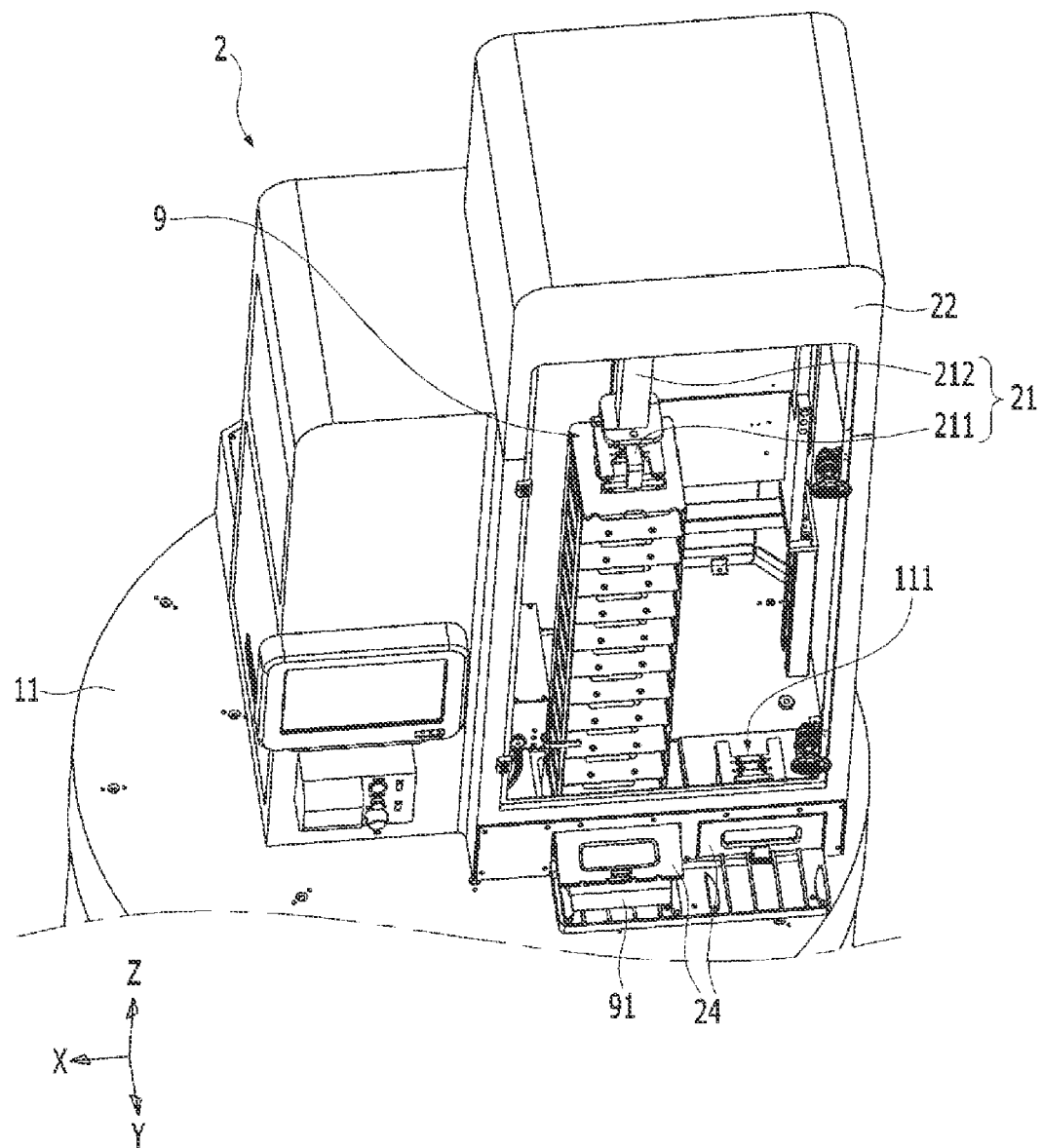
FIG. 2A is a schematic perspective view showing the inside of a partially cut-open robot apparatus of a cryogenic storage system, in accordance with some embodiments.
Figure 2B:
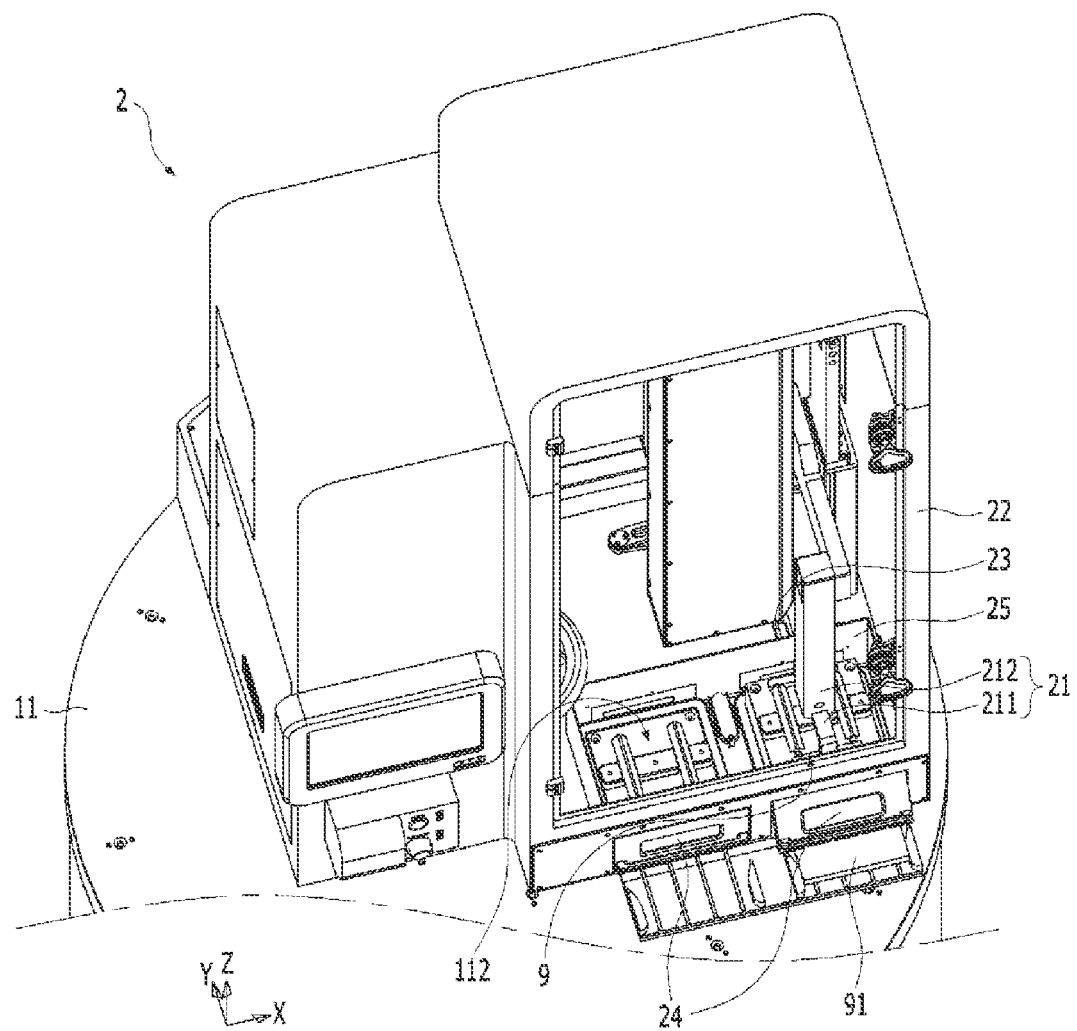
FIG. 2B illustrates a portion of a robot apparatus of a cryogenic storage system, in accordance with some embodiments.
Figure 2C:
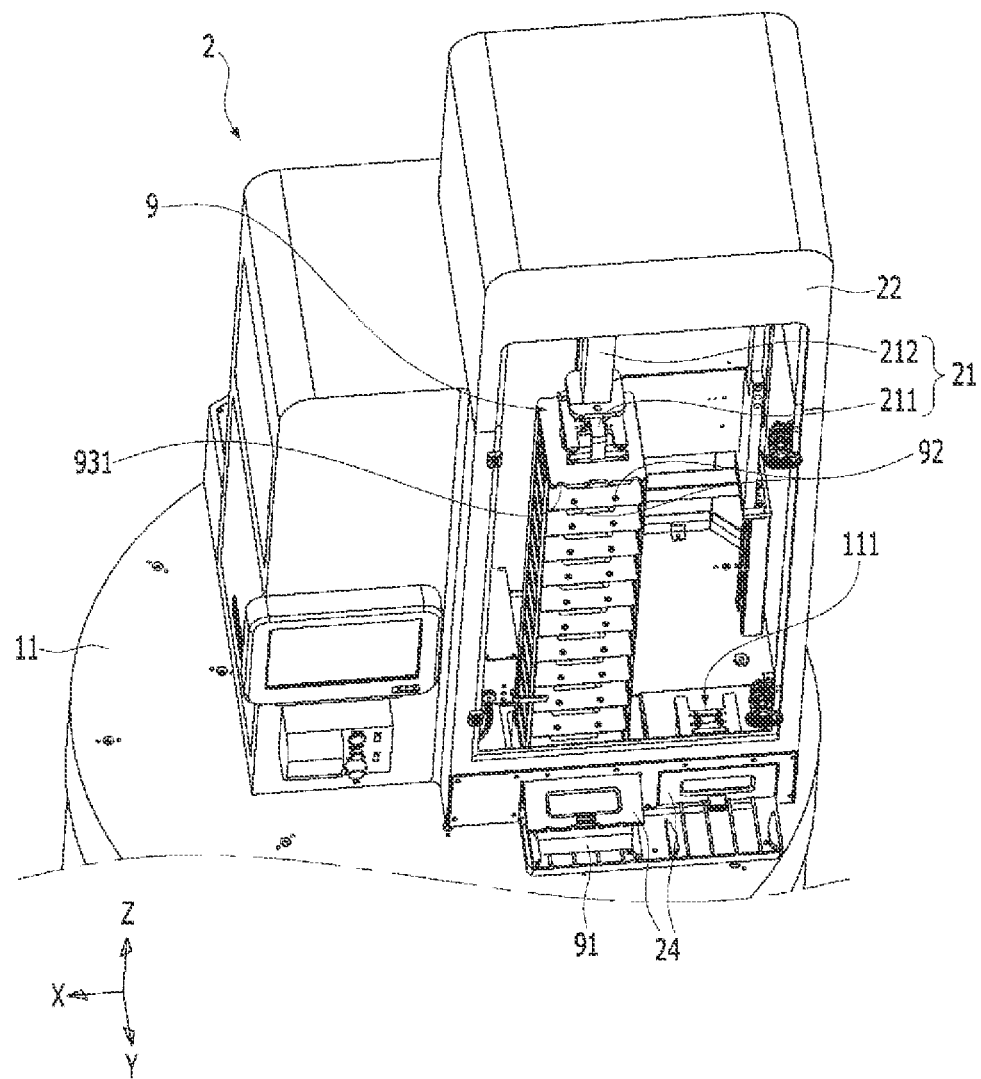
FIG. 2C illustrates an inner portion of a part of a robot apparatus of a cryogenic storage system, in accordance with some embodiments.

FIGS. 2A-2C show a robot apparatus 2 of the cryogenic storage system. The robot apparatus 2 may be positioned above and/or adjacent to the lid 11 of the cryogenic tank. The robot apparatus 2 may comprise a puller 21. The puller 21 may be configured to insert and/or withdraw one or more racks 9 into or out of the cryogenic tank 1. The one or more racks 9 may be inserted into or withdrawn from the cryogenic tank 1 through an inner door and/or an outer door disposed on an upper surface of the lid 11 of the cryogenic tank 1.

Figure 3B:
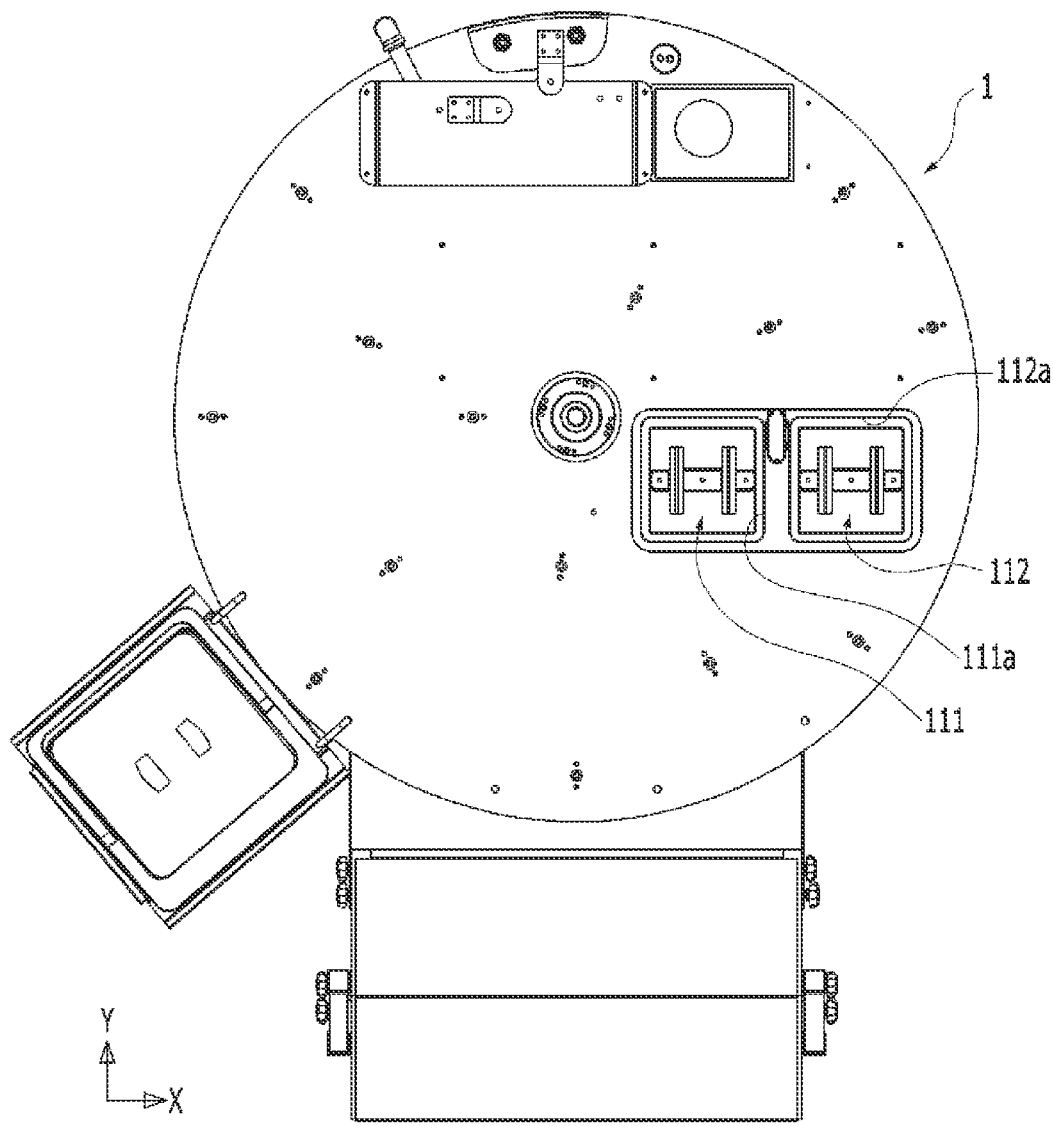
FIG. 3B is a plan drawing illustrating an inner door and an outer door of a cryogenic storage system, in accordance with some embodiments.

FIGS. 3A-3B show a top view of the cryogenic tank 1 and an inner door and an outer door of the cryogenic storage system. As illustrated in FIGS. 3A-3B, the cryogenic tank 1 may comprise two rack doors comprising an inner door 111 and an outer door 112. The inner door 111 may cover an inner opening and the outer door 112 may cover an outer opening. The inner and outer open regions respectively covered by the inner door and the outer door are indicated by a dotted line in FIG. 3A.

The inner door and the outer door may have one or more shapes. For example, the inner door may be in the shape of a circle, a square, a rectangle, a triangle, a pentagon, a hexagon, a heptagon, an octagon, a nonagon, a decagon, or any polygon with at least three or more sides. The outer door may be in the shape of a circle, a square, a rectangle, a triangle, a pentagon, a hexagon, a heptagon, an octagon, a nonagon, a decagon, or any polygon with at least three or more sides. The inner door and the outer door may be sized and/or shaped according to (i) the size and/or shape of the one or more racks, and/or (ii) the size and/or shape of the respective openings covered by the inner door and the outer door.

In some cases, the cryogenic tank may comprise a plurality of doors. The plurality of doors may comprise n doors, where n may be at least about one, two, three, four, five, six, seven, eight, nine, ten, eleven, twelve, thirteen, fourteen, fifteen, sixteen, seventeen, eighteen, nineteen, twenty, thirty, forty, fifty, sixty, seventy, eighty, ninety, one hundred, or more. Each of the plurality of doors may be located at a different radial distance from a center of the cryogenic tank. Each of the plurality of doors may be located corresponding to a respective group of racks of the multiple groups of racks. Each of the plurality of doors may be located corresponding to one or more openings disposed on an upper surface of the lid of the cryogenic tank. The respective centers of each of the plurality of doors may lie along an axis that is not a radial line extending from a center of the cryogenic tank. The respective centers of each of the plurality of doors may lie along an axis that is laterally offset by a distance from the center of the cryogenic tank.

In some cases, the plurality of doors may comprise an inner door, an outer door, and a plurality of intermediate doors located between the inner door and the outer door. The plurality of intermediate doors may comprise n intermediate doors, where n may be at least about one, two, three, four, five, six, seven, eight, nine, ten, eleven, twelve, thirteen, fourteen, fifteen, sixteen, seventeen, eighteen, nineteen, twenty, thirty, forty, fifty, sixty, seventy, eighty, ninety, one hundred, or more.

Referring to FIGS. 1A-1B and FIGS. 3A-3B, the cryogenic tank 1 may include a lid 11 on which the inner door 111 and the outer door 112 are provided. The inner door 111 and the outer door 112 may be provided along an axis that is parallel to the X-axis. The inner door 111 and the outer door 112 may be oriented such that one or more sides of the inner door 111 and the outer door 112 are parallel to the X-axis. The lid 11 may comprise an inner open area 111a and an outer open area 112a. The inner open area 111a may be an inner open region corresponding to the inner opening covered by the inner door 111. The outer open area 112a may be an outer open region corresponding to the outer opening covered by the outer door 112. The inner door 111 and the outer door 112 may close the respective open regions 111a and 112a. Therefore, when the inner door 111 is opened, the open region 111a closed by the inner door 111 may be opened, and when the outer door 112 is opened, the open region 112a closed by the outer door 112 may be opened. Further, when the inner door 111 or the outer door 112 is opened, a respective open region 111a or 112a may be exposed. The one or more racks 9 may be inserted into and/or withdrawn from the cryogenic tank 1 through the inner open region 111a or the outer open region 112a. The inner door 111 may be positioned closer to the center of the cryogenic tank 1 than the outer door 112. For example, as shown in FIG. 5E, a center c1 of the inner door 111 may be located a first radial distance r1 from a center 101 of the cryogenic tank that is less than a second radial distance r2 at which a center c2 of the outer door 112 is located. Further, an inside portion of the cryogenic tank 1 where the racks 9 are housed may be maintained at an internal temperature suitable for storing and/or preserving the biological materials. The internal temperature may range from 0 degrees Celsius to 273 degrees Celsius below zero. The internal temperature may be at most about 0 degrees, −5 degrees Celsius, −10 degrees Celsius, −20 degrees Celsius, −30 degrees Celsius, −40 degrees Celsius, −50 degrees Celsius, −60 degrees Celsius, −70 degrees Celsius, −80 degrees Celsius, −90 degrees Celsius, −100 degrees Celsius, −110 degrees Celsius, −120 degrees Celsius, −130 degrees Celsius, −140 degrees Celsius, −150 degrees Celsius, −160 degrees Celsius, −170 degrees Celsius, −180 degrees Celsius, −190 degrees Celsius, −200 degrees Celsius, −210 degrees Celsius, −220 degrees Celsius, −230 degrees Celsius, −240 degrees Celsius, −250 degrees Celsius, −260 degrees Celsius, −270 degrees Celsius, −270 degrees Celsius, or less. For example, the inside portion of the cryogenic tank 1 may be filled with a nitrogen gas (e.g., liquid nitrogen) and maintained at a temperature of 190 degrees Celsius below zero to quickly freeze the biological materials received therein and maintain them in a frozen state. In some examples, an internal temperature of the cryogenic tank 1 may be controlled using a LN2 (i.e., liquid nitrogen) gas. The cryogenic tank 1 may be an LN2 container.

In some cases, the cryogenic storage tank may comprise a plurality of open regions. The plurality of open regions may comprise an inner open region, an outer open region, and a plurality of intermediate open regions located between the inner open region and the outer open region. Each open region of the plurality of open regions may or may not be located at a different radial distance from the center of the cryogenic tank. Each open region of the plurality of open regions may be located corresponding to (i) one or more doors of the plurality of doors (e.g., an inner door, an outer door, or any one of the plurality of intermediate doors) and/or (ii) one or more groups of racks of the multiple groups of racks. A rack from any one of the multiple groups of racks may be inserted into and/or withdrawn from the cryogenic tank via an open region located corresponding to the group of racks containing the rack to be inserted and/or withdrawn.

Referring to FIGS. 2A-2C and FIGS. 3A-3B, the robot apparatus 2 may be configured to reposition the inner door 111 and the outer door 112, withdraw the one or more racks 9 from the cryogenic tank 1, and/or insert the one or more racks 9 into the cryogenic tank 1. The puller 21 of the robot apparatus 2 may be configured to grip the two racks door for repositioning and/or grip the one or more racks for withdrawal from and/or insertion into the cryogenic tank 1. In some cases, the puller 21 may be configured to place the inner door 111 on top of the outer door 112 to create an inner open region 111a through which a rack may be raised or lowered. In other cases, the puller 21 may be configured to place the outer door 112 on top of the inner door 111 to create an outer open region 112a through which a rack may be raised or lowered. The puller 21 may be configured to raise a rack through the inner open region 111a or the outer open region 112a to a predetermined height, thereby allowing a user or operator to withdraw one or more boxes from the rack and/or load one or more boxes onto the rack. In some cases, the puller 21 may be configured to raise and/or lower a rack through the inner open region 111a, the outer open region 112a, or any one of the plurality of intermediate open regions.

Referring to FIGS. 2A-2C and FIGS. 3A-3B, the cryogenic tank 1 may include an inner door 111 and an outer door 112 through which a rack may be inserted into the cryogenic tank 1 or withdrawn from the cryogenic tank 1. The inner door 111 and the outer door 112 may be configured to receive one or more racks 9. The racks may be multi-layered vertical structures configured to receive a plurality of boxes 91 containing biological materials and/or samples for cryogenic storage. In any of the embodiments described herein, a box may be interchanged with any one of a holder, a container, a microplate, a cassette, glassware, and/or any storage device configured to hold one or more objects or samples for cryogenic storage. Each box 91 may be loaded onto a separate level of each rack 9. The multiple boxes 91 may be stored at different heights corresponding to different levels of each rack 9. In some cases, one or more boxes 91 may be loaded onto a same level of each rack 9. In such cases, each level of a rack 9 may be configured to hold one or more boxes 91 in a horizontal configuration and/or vertical configuration. The one or more boxes 91 may or may not be stacked on top of each other. In order to illustrate the internal structure of the rack 9, FIGS. 2A-2C omit the illustration of a box 91 accommodated within the rack and only illustrate a box 91 being withdrawn through a box door 24.

Figure 4A:
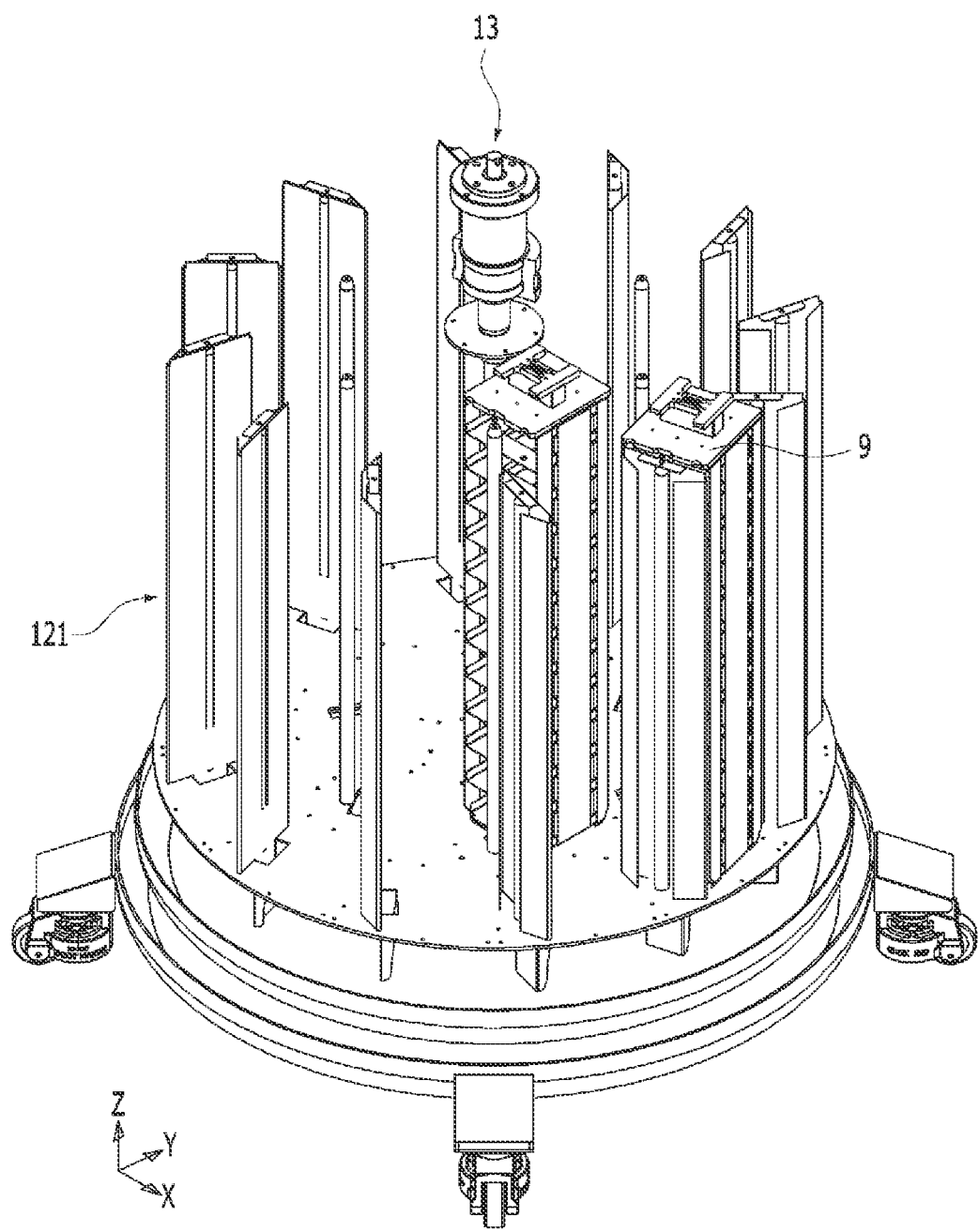
FIG. 4A is a conceptual diagram illustrating the inside of a cryogenic tank of a cryogenic storage system, in accordance with some embodiments.
Figure 4B:
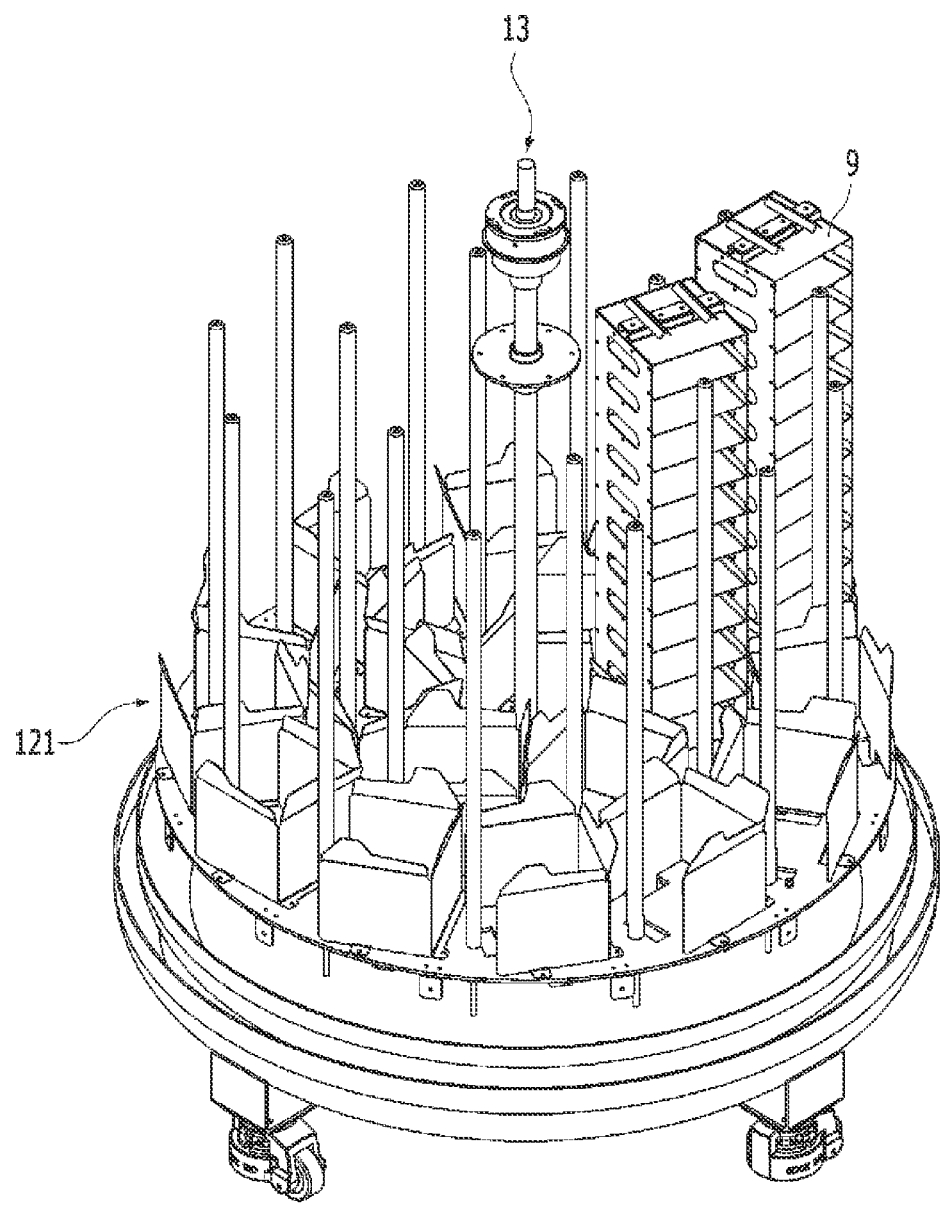
FIG. 4B is a conceptual diagram illustrating the inside of a cryogenic tank of a cryogenic storage system, in accordance with some embodiments.

FIGS. 4A-4B illustrate an inner structure of the cryogenic tank of the cryogenic storage system. As illustrated in FIGS. 4A-4B, the receiving part 12 of the cryogenic tank 1 may comprise a frame structure 121 configured to guide the multiple racks 9 to be placed at one or more predetermined locations. Furthermore, the cryogenic tank 1 may comprise a rotational shaft 13 configured to rotate the multiple racks 9 within the receiving part 12 and/or the frame structure 121 supporting the multiple racks 9. The multiple racks 9 within the cryogenic tank 1 may be rotatable relative to (a) a center of the cryogenic tank 1 and (b) an inner door and/or an outer door of the cryogenic tank 1. The rotational shaft 13 may be connected to and rotated by a driving apparatus (e.g., a motor) located within a housing of the robot apparatus.

The receiving part 12 of the cryogenic tank 1, the frame structure 121 of the receiving part 12, and the rotational shaft 13 may be configured as a carousel. The carousel may be configured to position the first group of racks and the second group of racks in a ring configuration around a center of the cryogenic tank 1. The carousel may be mechanically coupled to a driving apparatus, such as an engine or a motor. The carousel may be driven and/or rotated by a motor (e.g., an electric motor) or an engine (e.g., a combustion engine). The driving apparatus may be configured to rotate the carousel and the multiple racks positioned within the carousel around a center of the cryogenic tank 1. The driving apparatus may be configured to rotate the carousel by a first set of rotational angles to align the first set of racks with the inner door. The driving apparatus may be configured to rotate the carousel by a second set of rotational angles to align the second set of racks with the outer door. The first set of rotational angles may be different than the second set of rotational angles.

Figure 4C:
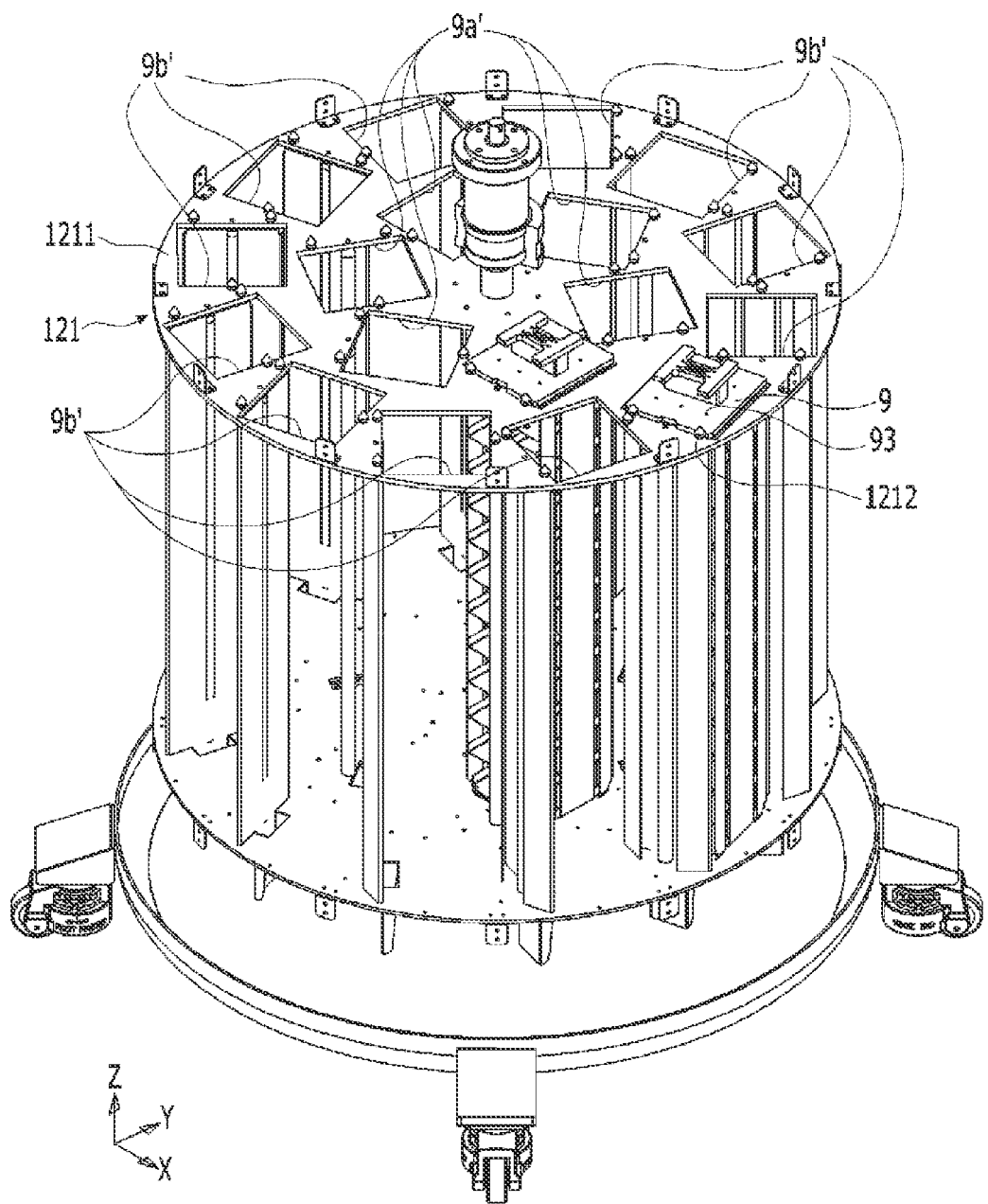
FIG. 4C is a conceptual diagram illustrating the inside of a cryogenic tank, in accordance with some embodiments.

Referring to FIGS. 4A-4C, the rotational shaft 13 and/or the driving apparatus (e.g., a motor) may be configured to rotate a first group of racks 9a and/or a second group of racks 9b around a center axis of the rotational shaft 13 (i.e., around a center of the cryogenic tank), between two or more rotational angles. The two or more rotational angles may be greater than or equal to 0 degrees and less than or equal to 360 degrees. The rotational shaft 13 and the driving apparatus that rotates the rotational shaft 13 may be referred to as an "R-axis driving apparatus." The one or more racks 9 received in the receiving part 12 of the cryogenic tank 1 may be rotated relative to the inner door and/or the outer door, and may be arranged such that any one of the multiple racks 9 can be withdrawn through the inner door or the outer door.

As shown in FIG. 4C and FIGS. 5A-5D, the one or more racks may be stored in a rack packing configuration that may optimize for packing density (e.g., number of racks per unit area) and/or optimize heat transfer such that a temperature distribution among the multiple racks is more constant or uniform, thereby improving the thermal insulation of the cryogenic storage system. A more uniform temperature distribution may be achieved when a variation in internal temperatures between a first and second internal location inside the cryogenic tank is less than a desired threshold. The desired threshold may be a percentage value corresponding to a maximum difference in temperatures between the first and second internal locations. For example, the desired threshold may be 50%, 40%, 30%, 25%, 20%, 15%, 10%, 9%, 8%, 7%, 6%, 5%, 4%, 3%, 2%, 1%, 0.1%, 0.01%, or less.

The rack packing configuration may involve storing multiple racks in a first group of racks and a second group of racks such that a first rack of the first group of racks is stored at a first radial distance that is less than a second radial distance at which a second rack of the second group of racks is stored, as described in greater detail below. As such, at most a single rack (i.e., no more than one rack) may be inserted into the cryogenic tank or removed from the cryogenic tank at any given time instance through the inner door or the outer door.

In some cases, a single rack may have only one rack. As described herein, a rack may be a multi-layered vertical structure configured to receive a plurality of boxes, holders, containers, labware, glassware, cassettes, and/or storage devices configured to hold or store biological materials and/or samples for cryogenic storage. In other cases, the single rack may comprise an array of subracks (i.e., a subrack array). The subrack array may comprise a plurality of subracks. A subrack may be a multi-layered vertical structure configured to receive a plurality of boxes, holders, containers, labware, glassware, cassettes, and/or storage devices configured to hold or store biological materials and/or samples for cryogenic storage. A subrack may or may not be substantially similar to a rack. Each structural element of a subrack may or may not correspond to a structural element of a rack. The structural elements of the subrack may have one or more dimensions (e.g., height, length, width, etc.) that are proportional to one or more dimensions associated with a corresponding structural element of a rack. The structural elements of the subrack may have one or more dimensions that are greater than, less than, or equal to one or more dimensions associated with a corresponding structural element of a rack. The subrack array may comprise a plurality of subracks stacked together and/or a plurality of subracks coupled to each other. For example, the subrack array may comprise a vertical stack of two or more subracks. The vertical stack of two or more subracks may be insertable into the cryogenic tank and/or removable from the cryogenic tank via the inner door or the outer door. Alternatively, the subrack array may comprise two or more subracks coupled to each other in a side-by-side configuration or a lateral configuration. The plurality of subracks of the subrack array may be releasably coupled to one other using a coupling mechanism. In some embodiments, the coupling mechanism may include a quick release mechanism. The quick release mechanism may include springs, snap fits, latches, clips, straps, and/or magnetic attachments. The plurality of subracks may be separated from one other using the quick release mechanism, without requiring the use of tools. The quick release mechanism may be configured to allow one or more subracks to be stacked together or decoupled in a quick and efficient manner. For example, in some cases, the quick release mechanism may allow one or more subracks to be stacked and/or coupled together within a desired time frame. The desired time frame may be at most about 5 minutes, 4 minutes, 3 minutes, 2 minutes, 1 minute, 30 seconds, 20 seconds, 10 seconds, 5 seconds, or less. In other cases, the quick release mechanism may be configured to allow one or more subracks to be selectively removed from the subrack array and/or selectively coupled to the subrack array. In some cases, the plurality of subracks of the subrack array may be coupled together using screws, bolts, rubber bands, adhesives, magnets, and/or rivets.

FIG. 4C illustrates an inner structure of the cryogenic tank of the cryogenic storage system. As shown in FIG. 4C, the receiving part 12 may contain a frame structure 121 for arranging a plurality of racks 9 in accordance with one or more predetermined positions. Referring to FIGS. 4C and 5C together, the frame structure 121 may be configured to arrange a first group of racks 9a in a first arrangement pattern such that the first group of racks 9a are positioned in a first set of arrangement areas 9a'. The first arrangement pattern may position the first group of racks 9a such that the racks in the first group of racks 9a are disposed in a ring configuration (e.g., a circular pattern) around a center of the cryogenic tank at a first radial distance from the center of the cryogenic tank. The frame structure 121 may be further configured to arrange a second group of racks 9b in a second arrangement pattern such that the second group of racks 9a are positioned in a second set of arrangement areas 9b'. The second arrangement pattern may position the second group of racks 9b such that the racks in the second group of racks 9b are disposed in a ring configuration (e.g., a circular pattern) around a center of the cryogenic tank at a second radial distance from the center of the cryogenic tank. The second radial distance may be greater than the first radial distance.

The frame structure 121 may be rotatable. The cryogenic tank 1 may comprise a rotary shaft 13 that may be configured to rotate the frame structure 121 supporting a plurality of racks 9 or to rotate the plurality of racks 9 in the receiving portion 12 of the cryogenic tank. The rotary shaft 13 may be connected and/or mechanically coupled to a drive apparatus (e.g., a motor) located in a housing of the robot apparatus. The rotary shaft 13 and the drive apparatus for rotating the rotary shaft 13 may be referred to as an R-axis driving apparatus. The plurality of racks 9 accommodated in the receiving portion 12 of the cryogenic tank 1 may be rotated relative to (a) a center of the cryogenic tank and (b) the inner door and/or the outer door of the cryogenic tank. Any one of the racks 9 of the first group of racks 9a or the second group of racks 9b may be aligned with and/or positioned underneath the inner door or the outer door so as to correspond to an open region that is exposed when the inner door or outer door is removed.

Referring to FIG. 4C, the frame structure 121 may comprise an upper frame 1211 with upper inlets that correspond to the positions and/or orientations of (i) the first set of arrangement areas 9a' for the first group of racks and (ii) the second set of arrangement areas 9b' for the second group of racks. Moreover, referring to FIGS. 4C-4D, an upper surface 93 of a rack 9 may protrude further outward in the XY plane than the outer edges of the upper inlets corresponding to the plurality of first arrangement areas 9a' and the plurality of second arrangement areas 9b'. Accordingly, when a rack 9 is inserted into the cryogenic tank and positioned within one of the first set of arrangement areas 9a' or the second set of arrangement areas 9b', one or more edges of a bottom portion of the upper surface 93 of the rack 9 may be hooked onto the upper frame 1211.

Figure 4D:
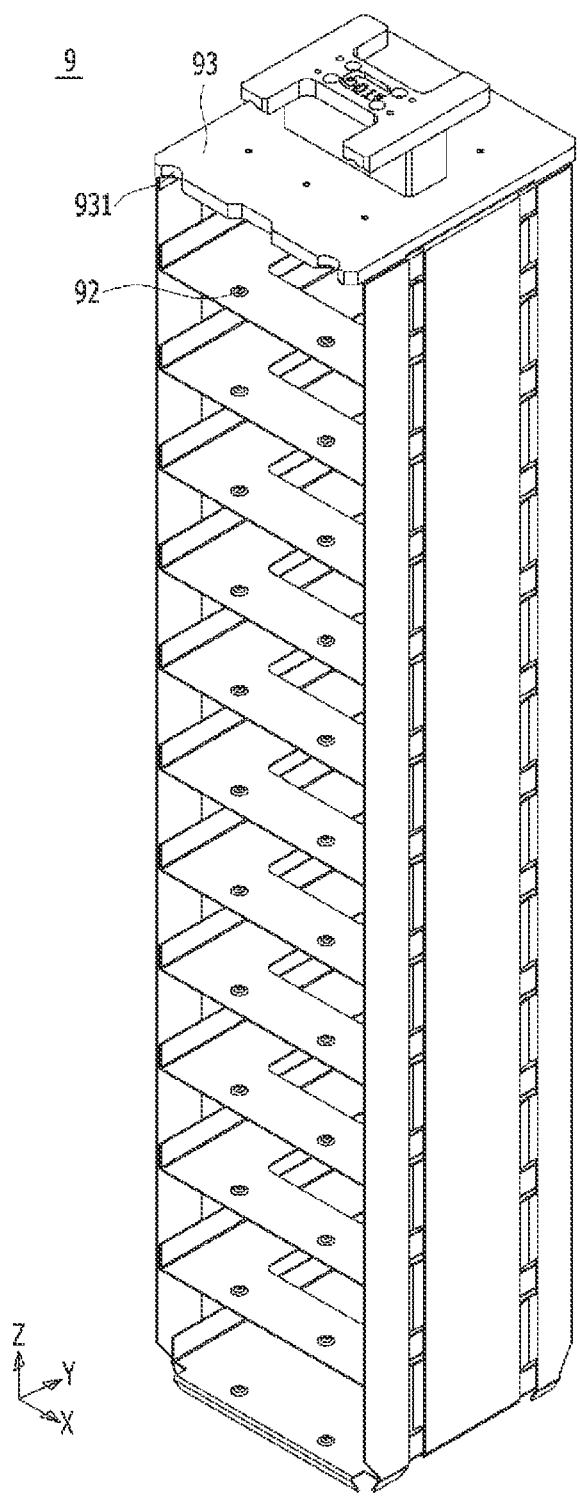
FIG. 4D is a perspective view of a rack, in accordance with some embodiments.

Referring to FIGS. 4C-4D, the one or more racks 9 may have an upper surface 93. The upper surface 93 may comprise one or more grooves 931 recessed inward in the Y-direction. The one or more grooves 931 may be formed on a portion of the upper surface 93 of the rack 9 that projects further outward in the XY-plane than an edge of the upper inlet of the upper frame 1211. The upper frame 1211 may comprise a projecting pin 1212 that may be configured to engage with the groove 931. Accordingly, when a rack 9 is inserted into the receiving part of the cryogenic tank, the rack 9 may be drawn into an arrangement area of the first set of arrangement areas 9a' and/or an arrangement area of the second set of second arrangement areas 9b', and the projecting pin 1212 may interlock with the groove 931. Thus, the rack 9 may be "home-positioned" in one arrangement area of the first set of arrangement areas 9a' and/or one arrangement area of the second set of arrangement areas 9b'. The one or more grooves 931 and the projecting pin 1212 may be configured to orient and/or align the racks 9 with respect to the first and second sets of arrangement areas 9a' and 9b' so that the racks 9 may be positioned underneath either the inner door and/or the outer door when the frame structure 121 rotates. The one or more grooves 931 and the projecting pin 1212 may be configured to prevent the racks 9 from deviating from one or more predetermined positions and/or orientations. The one or more grooves 931 and the projecting pins 1212 may be used to prevent (i) any deviations (e.g., translations and/or rotations) with respect to rack orientations and (ii) any changes to one or more spacing distances between one or more racks in the first group of racks and/or the second group of racks.

Referring to FIG. 4D, the one or more racks 9 may comprise one or more horizontal levels stacked in a vertical arrangement. The one or more horizontal levels may house one or more boxes 91. Each of the plurality of boxes 91 may be positioned on a level. Each of the plurality of boxes 91 may be stored on a different level such that each box 91 is stored at a different height. The rack 9 may comprise one or more projections 92 that project upward in the Z-direction from a surface of each of the levels of the rack 9. The one or more projections 92 may be positioned near the inlet of each level of the rack 9 (i.e., near a front portion of the rack 9 where a box 91 may be inserted into or withdrawn from the rack 9). The one or more projections 92 may be configured to lift one or more sides of a box 91 (e.g., a portion of the box facing the inlet of a horizontal level of the rack) upward in the Z-direction when the box 91 is inserted. A portion (e.g., an edge, a surface, a side, or a corner) of the box 91 may be lifted up in the Z-direction by the projection 92, so that at least a portion of the bottom surface of the box 91 does not remain in contact with the horizontal level of the rack. For example, the lower surface of the box 91 and the horizontal level of the rack may be in point or line contact rather than in surface contact. A front portion of the box 91 may be raised upwards in the Z-direction such that a bottom surface of the box 91 is inclined downwards in the Y-direction.

The one or more projections 92 may be configured to minimize the risk of a bottom surface of the box 91 freezing to a horizontal level of the rack 9. As described above, the one or more projections 92 may be configured to lift up a portion of the box 91 (e.g., an end of the box 91 facing the inlet) in the Z-direction at an oblique incline, so that the center of gravity of the box 91 is biased towards the portion of the box 91 facing a direction opposite the inlet. Such an orientation may help to prevent separation (i.e., detachment) of the box 91 from the rack 9. Further, such an orientation may help to prevent slippage of the rack 9. For example, when the rack 9 is located outside the cryogenic tank, there may be a possibility of the formation of water (moisture) between the box 91 and the horizontal level of the rack 9, due to temperature differences between the inside and the outside of the cryogenic tank. Such moisture may result in conditions that cause the box 91 to slip. According to the embodiments previously described above, the box 91 can be inclined obliquely by the one or more projection 92, and the center of gravity of the box 91 may be adjusted towards the side of the box 91 facing the opposite end of the inlet, such that slippage of the box 91 may be minimized and separation of the box 91 from the rack 9 by slippage can be prevented.

Figure 5A:
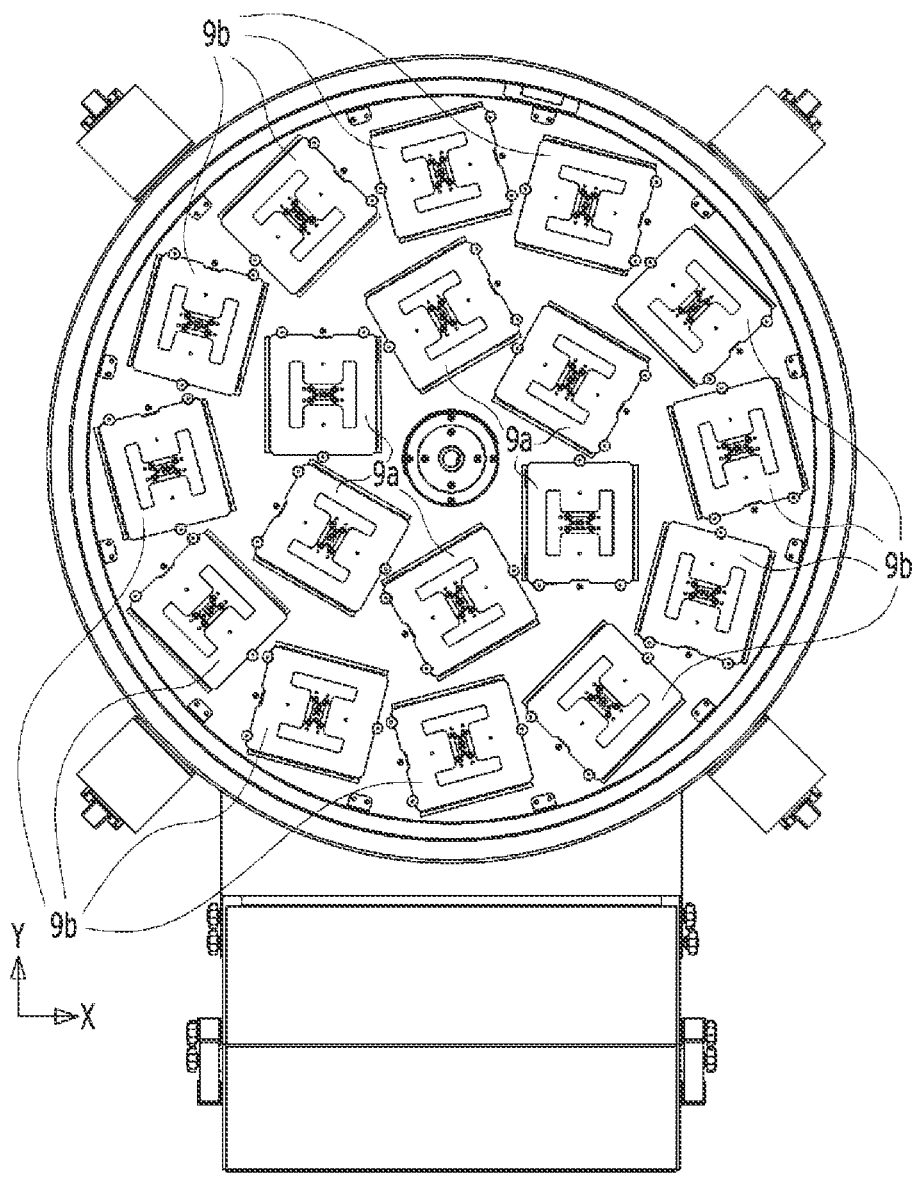
FIG. 5A is a conceptual top view showing the inside of a cryogenic tank in which racks are arranged and provided to explain the array of the racks in the cryogenic tank of a cryogenic storage system according to an embodiment of the present disclosure.
Figure 5B:
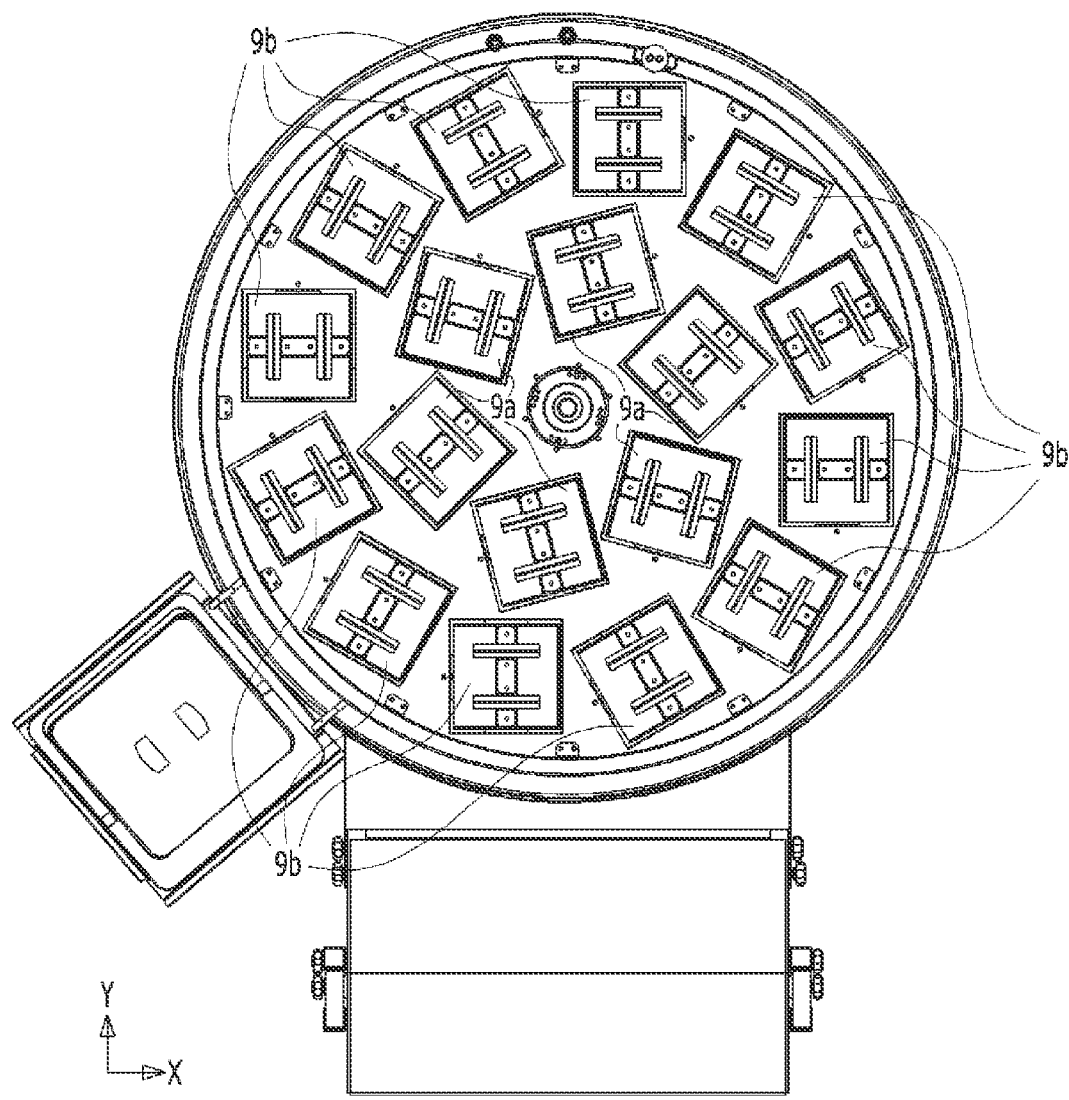
FIG. 5B illustrates the arrangement of racks in a cryogenic tank of a cryogenic storage system, in accordance with some embodiments.
Figure 5C:
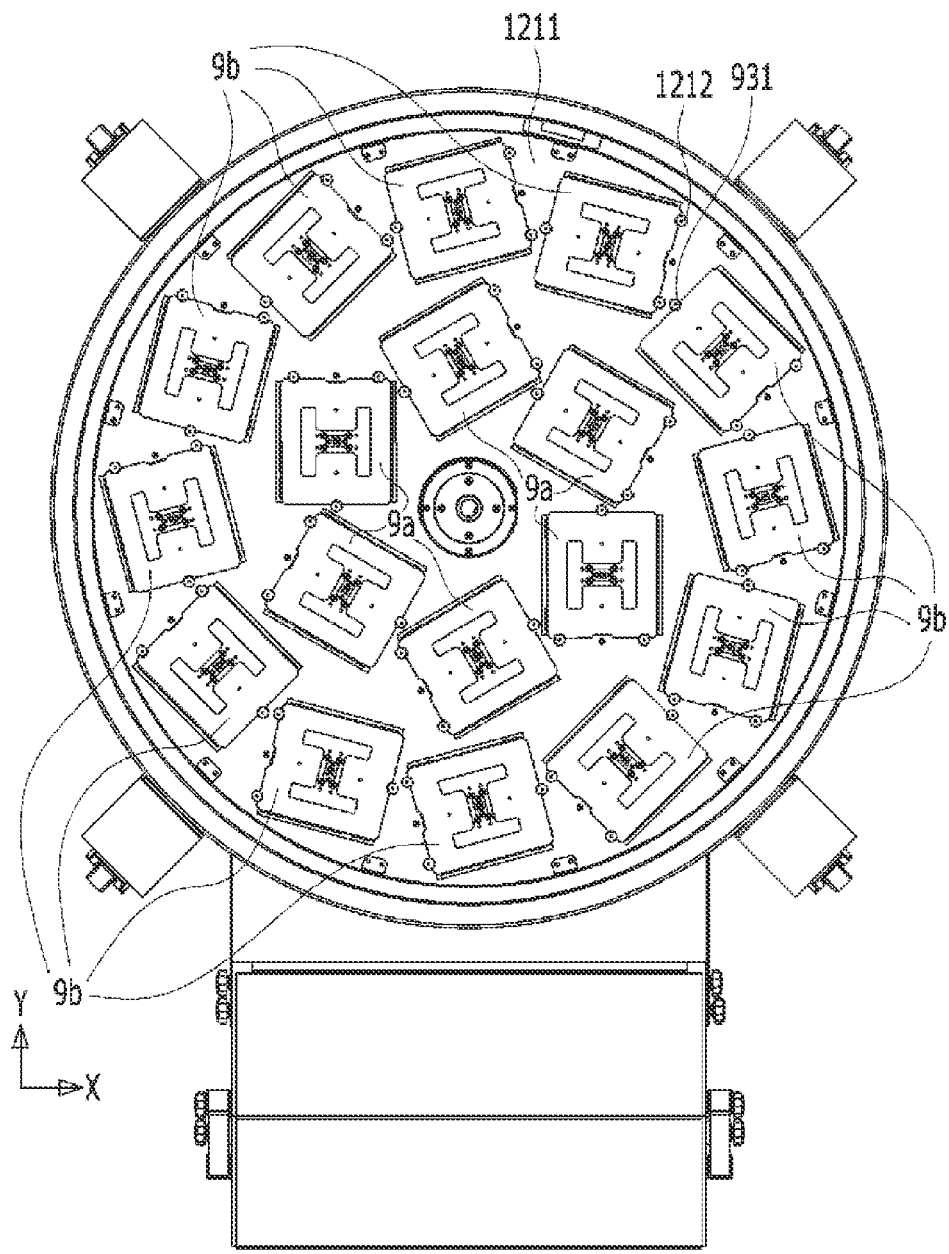
FIG. 5C is a top view of the inside of a cryogenic tank in which one or more racks may be arranged, in accordance with some embodiments.

FIGS. 5A-5C illustrate a top view of an inside of a cryogenic tank in which multiple racks are arranged in a first group of racks 9a and a second group of racks 9b. The first group of racks 9a may be arranged in a ring configuration around a center of the cryogenic tank and along a circumferential direction within the cryogenic tank. The racks within the first group of racks 9a may be positioned around a center of the cryogenic tank and equally spaced at a first angular interval. The second group of racks may be arranged in a ring configuration around a center of the cryogenic tank and along the circumferential direction within the cryogenic tank. The racks within the second group of racks 9b may be positioned around a center of the cryogenic tank and equally spaced at a second angular interval. The second angular interval may be less than the first angular interval. The cryogenic tank may be configured to store the multiple racks in a first group of racks 9a and a second group of racks 9b such that a first rack of the first group of racks is stored at a first radial distance that is less than a second radial distance at which a second rack of the second group of racks is stored. The first radial distance at which a first rack in the first group of racks is stored may be equal to the first radial distance r1 that corresponds to a distance from a center 101 of the cryogenic tank to a center c1 of the inner door 111, as shown in FIG. 5E. The second radial distance at which a second rack in the second group of racks is stored may be equal to the second radial distance r2 that corresponds to a distance from a center 101 of the cryogenic tank to a center c2 of the outer door 112, as shown in FIG. 5E. As described herein, a center of a rack may be a location on the rack corresponding to a point of intersection of a first diagonal length of the rack and a second diagonal length of the rack. The first diagonal length may be a length from a first vertex of the rack to a second vertex of the rack opposite the first vertex. The second diagonal length may be a length from a third vertex of the rack to a fourth vertex of the rack opposite the third vertex.

In another aspect of the present disclosure, the cryogenic storage system may comprise a cryogenic tank comprising an inner door and an outer door through which a rack may be insertable into the cryogenic tank or removable from the cryogenic tank. The cryogenic tank may be configured to hold multiple racks that are rotatable relative to (a) a center of the cryogenic tank and (b) the inner door or the outer door. The cryogenic tank may be configured to hold the multiple racks such that no more than a single rack of the multiple racks is removable from the cryogenic tank via the inner door or the outer door at any given instance (e.g., at any given time and/or at any given rotational angle). The single rack may comprise at most one rack from either the first group of racks or the second group of racks. In some cases, the single rack may have only one rack. The single rack may be selected from the first group of racks or the second group of racks. A rack as described herein may include a single multi-layered vertical structure that is configured to receive a plurality of boxes containing biological materials and/or samples for cryogenic storage.

The cryogenic tank may be configured to hold multiple racks in a ring configuration comprising multiple groups of racks. The multiple groups of racks may comprise a first group of racks and a second group of racks. The first group of racks may be located at a first radial distance from the center of the cryogenic tank and the second group of racks may be located at a second radial distance from the center of the cryogenic tank. The first radial distance may or may not be less than the second radial distance.

The first group of racks may be configured to move along a first circumferential path that coincides with the inner door. The first circumferential path may be a path defined by a circle with a center located at the center of the cryogenic tank and a radius equal to the first radial distance. The second group of racks may be configured to move along a second circumferential path that coincides with the outer door. The second circumferential path may be a path defined by a circle with a center located at the center of the cryogenic tank and a radius equal to the second radial distance.

The inner door of the cryogenic tank may be configured to allow access to a first rack included in the first group of racks when the first rack is positioned adjacent to the inner door (i.e., positioned underneath the inner door). The outer door may be configured to allow access to a second rack included in the second group of racks when the second rack is positioned adjacent to the outer door (i.e., positioned underneath the outer door). For any rotational angle ranging between 0 degrees and 360 degrees, the single rack may be positioned adjacent to either the inner door or the outer door such that the single rack is removable from the cryogenic tank via either the inner door or the outer door.

The first rack included in the first group of racks and the second rack included in the second group of racks may be respectively positioned adjacent to the inner door and the outer door at different time instances, such that no more than one rack from the first group of racks and the second group of racks may be accessible (i.e., insertable and/or removable) via the inner door or the outer door at any given time instance. The first rack included in the first group of racks may not be positioned adjacent to the inner door when the second rack included in the second group of racks is positioned adjacent to the outer door. Alternatively, the second rack included in the second group of racks may not be positioned adjacent to the outer door when the first rack included in the first group of racks is positioned adjacent to the inner door. The first rack included in the first group of racks may be accessible via the inner door when the second rack included in the second group of racks is not accessible via the outer door. Alternatively, the second rack included in the second group of racks may be accessible via the outer door when the first rack included in the first group of racks is not accessible via the inner door. In some cases, the first rack included in the first group of racks and the second rack included in the second group of racks may be respectively accessible via the inner door and the outer door in a sequential manner when the first group of racks and the second group of racks are rotated relative to the center of the cryogenic tank.

As shown in FIGS. 5A-5C, the number of the racks in the second group 9b may be twice the number of the racks in the first group 9a. For example, the number of the racks in the first group 9a may be 6 and the number of the racks in the second group 9b may be 12. Further, the racks in the first group 9a (i.e., each of the racks in the first group 9a) may be rotated in one direction along the first circumferential path by a first angle from an initial array state where the racks in the first group 9a are radially arranged (e.g., equally spaced by 60 degrees).

Furthermore, the racks in the second group 9b (i.e., each of the racks in the second group 9b) may be rotated in one direction along the second circumferential path by a second angle from a state where the racks in the second group 9b are radially arranged (e.g., equally spaced by 30 degrees). The first angle may be greater than the second angle. For example, the racks in the first group 9a (i.e., each of the racks in the first group 9a) may be rotated in one direction along the first circumferential path by 60° from the state where the racks in the first group 9a are radially arranged. Further, the racks in the second group 9b (i.e., each of the racks in the second group 9b) may be rotated in one direction along the second circumferential path by 30° from the state where the racks in the second group 9b are radially arranged. The one direction may refer to a counterclockwise direction.

The arrangement of racks 9 may reduce a maximum distance between the racks 9 as compared with conventional systems, and may minimize differences between a minimum distance and a maximum distance between the racks 9, thereby allowing the cryogenic storage system to maintain more uniform distances between the racks 9. As such, the temperature variation among the racks 9 within the cryogenic tank may be minimized as compared with conventional systems, and each of the one or more racks 9 may be stored at a desired temperature. Conventionally, the racks in the first group and the second group may be simply radially arranged (i.e., equally spaced from the center of the cryogenic tank 1), and, thus, there may be a great variation between minimum distances and a maximum distances between the racks. However, in the present cryogenic storage system, the arrangement of the racks 9 may reduce maximum distances between the racks 9 as compared with rack arrangements in other conventional systems.

FIG. 5C illustrates the first group of racks 9a and the second group of racks 9b positioned within the receiving part of the cryogenic tank. As described elsewhere herein, the receiving part may comprise a frame structure for positioning the first group of racks and the second group of racks in a first arrangement pattern and a second arrangement pattern around the center of the cryogenic tank. The frame structure may comprise an upper frame 1211, and the upper frame 1211 may comprise a projecting pin 1212 that may be configured to engage with one or more grooves 931 on an upper surface of a rack, when the rack is inserted into the frame structure, as described elsewhere herein.

Referring to FIGS. 5A-5C and FIGS. 6A-6C, the racks 9 may be arranged and rotated around a center axis of the rotational shaft such that at most a single rack of all the multiple racks 9 can come in and out at a time through any one of the inner door 111 or the outer door 112. The rotational shaft 13 and/or a driving apparatus (e.g., a motor) may rotate the first group of racks 9a and/or the second group of racks 9b between two or more rotational angles. The two or more rotational angles may be greater than or equal to 0 degrees and less than or equal to 360 degrees. At any given time and/or any given rotational angle between the two or more rotational angles, at most one rack from either the first group of racks 9a or the second group of racks 9b may be aligned directly underneath the inner door 111 or the outer door 112. In such cases, at most one rack from either the first group of racks 9a or the second group of racks 9b may be inserted into or withdrawn from the cryogenic tank at a time through the inner door 111 or the outer door 112.

The multiple racks 9 (i.e., the first group of racks and/or the second group of racks) may be rotated about the center of the cryogenic tank by one or more predetermined rotational angles, or a multiple thereof, such that an individual rack in the first group of racks 9a and/or the second group of racks 9b may be aligned with (i.e., positioned directly underneath) one of the inner door 111 or the outer door 112. The one or more predetermined rotational angles may be set such that each rack of the first set of racks and/or the second set of racks may become sequentially aligned with the inner door 111 or the outer door 112 when the racks are rotated around the center of the cryogenic tank by the one or more predetermined rotational angles or a multiple thereof. The first group of racks may be rotated by a first set of predetermined rotational angles. The second group of racks may be rotated by a second set of predetermined rotational angles. The second set of predetermined rotational angles may or may not be the same as the first set of predetermined rotational angles. The first set of predetermined rotational angles and the second set of predetermined rotational angles may be used to rotate the first group of racks and the second group of racks into an aligned state relative to one of the inner door or the outer door of the cryogenic tank. The aligned state may allow for an individual rack of the first group of racks or the second group of racks to be inserted into the cryogenic tank and/or removed from the cryogenic tank via one of the inner door or the outer door. Alignment may occur when all vertices of a rack lie within and/or directly underneath the open region 111a or 112a corresponding to the inner door 111 or the outer door 112. The racks 9 may be stored, rotated, and subsequently aligned with one of the inner door 111 or the outer door 112 in consecutive order such that at most a single rack of all the multiple racks 9 may be inserted into the cryogenic tank and/or withdrawn from the cryogenic tank at a time through any one of the inner door 111 or the outer door 112.

Figure 5D:
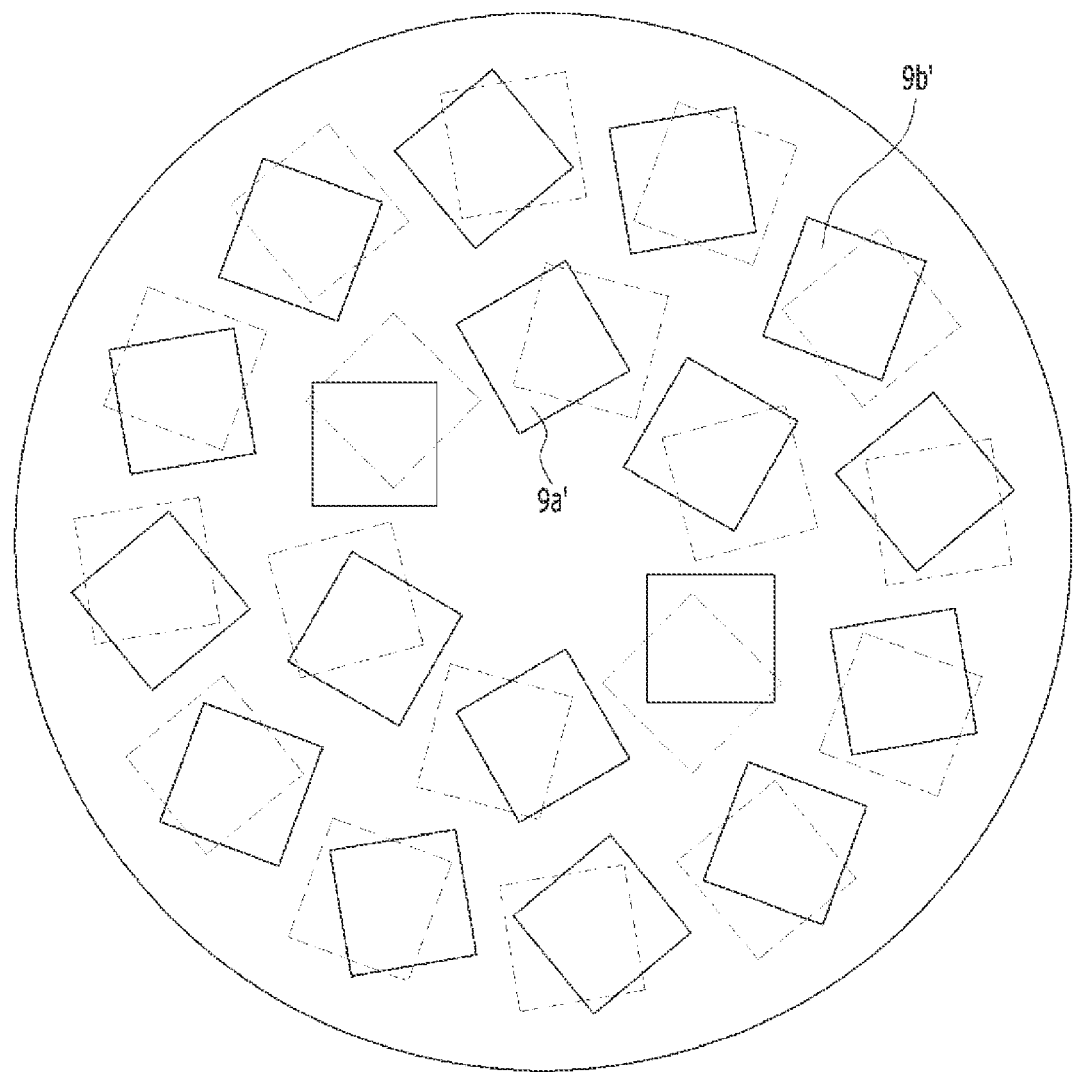
FIG. 5D is a schematic diagram illustrating first and second arrangement areas for a first and second group of racks, in accordance with some embodiments.
Figure 5E:
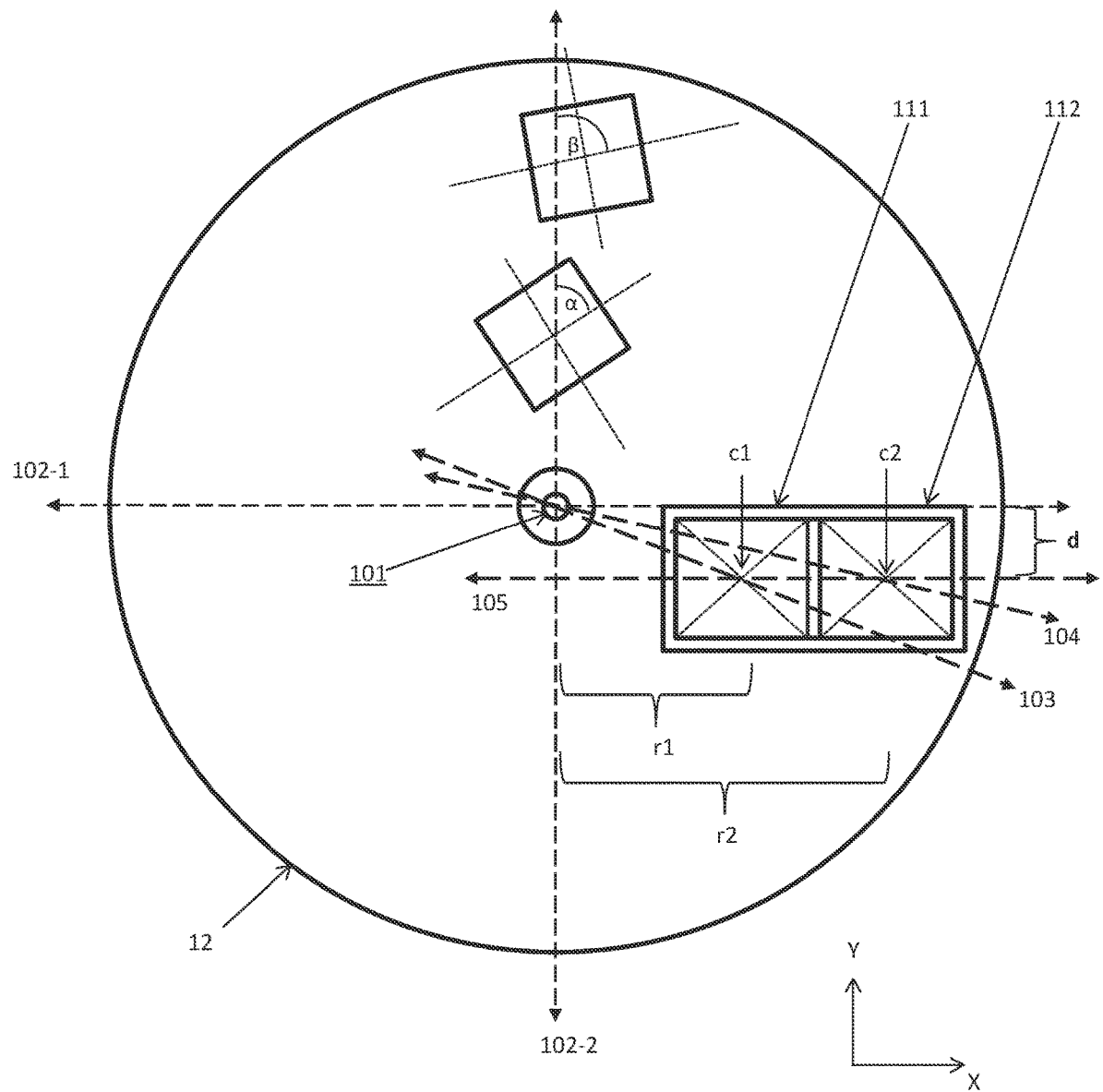
FIG. 5E illustrates a positional relationship between a center point of the cryogenic tank and the inner and outer doors of the cryogenic tank, in accordance with some embodiments.

FIG. 5D illustrates a first set of arrangement areas 9a' for the first group of racks and a second set of arrangement areas 9b' for the second group of racks. The first set of arrangement areas 9a' and the second set of arrangement areas 9b' may position the racks within the first group of racks and the second group of racks in a circular pattern (i.e., a ring configuration) around a center of the cryogenic tank. The first set of arrangement areas 9a' may align the racks in the first group of racks to a first set of predetermined positions and orientations. A rack in the first group of racks may move from one arrangement area to another consecutive arrangement area of the first set of arrangement areas, when the first group of racks is rotated by the first set of predetermined rotational angles. The first set of predetermined rotational angles may correspond to the first angular interval at which the first group of racks are spaced relative to each other. The second set of arrangement areas 9b' may align the racks in the second group of racks to a second set of predetermined positions and orientations. A rack in the second group of racks may move from one arrangement area to another consecutive arrangement area of the second set of arrangement areas, when the second group of racks is rotated by the second set of predetermined rotational angles. The second set of predetermined rotational angles may correspond to the second angular interval at which the second group of racks are spaced relative to each other. A movement of the first group of racks and a movement of the second group of racks, when rotated by the first set of predetermined rotational angles and/or the second set of predetermined rotational angles, respectively, is indicated by the dotted lines shown in FIG. 5D.

As shown in FIGS. 5A-5D, the first group of racks 9a and the second group of racks 9b may be positioned around the center of the cryogenic tank at one or more angular intervals. In other words, the racks in the first group of racks and the racks in the second group of racks may be positioned in a circular pattern around a center axis of the rotational shaft and may be equally spaced from one another at one or more predetermined angular intervals, or a multiple thereof. A rack in the first group of racks and the second group of racks may be oriented in a manner such that a line perpendicular to a midpoint of a side of the rack (e.g., the side closest to the center of the cryogenic tank) does not intersect with a center point of the cryogenic tank. In other words, the line perpendicular to the midpoint of the side of the rack closest to the center of the cryogenic tank may not be a radial line. In some cases, the racks in the first group of racks and the second group of racks may be oriented in a manner such that a first vertex of a side of the rack (e.g., the side closest to the center of the cryogenic tank) is positioned closer to the center of the cryogenic tank than a second vertex of the same side of the racks, which same side is a side of the rack closest to the center of the cryogenic tank. Further, the multiple racks may be arranged and rotated around a center axis of the rotational shaft by one or more predetermined rotational angles such that each vertex of the sides of an upper surface of each rack is positioned a different distance from the center of the cryogenic tank.

Referring to FIG. 5D, the first group of racks 9a may initially be radially arranged (e.g., evenly spaced at 60 degree intervals) in a circumferential direction around the rotational axis of the rotational shaft and at a first radial distance from the center of the cryogenic tank. The first group of racks may be rotated by a first predetermined rotational angle from their initial positions and/or orientations. Likewise, as shown in FIG. 5D, the second group of racks 9b may initially be radially arranged (e.g., equally spaced at 30 degree intervals) in a circumferential direction around the rotational axis of the rotational shaft and at a second radial distance from the center of the cryogenic tank. The second group of racks may be rotated by a second predetermined rotational angle from their initial positions and/or orientations. The first angle may be greater than the second angle. For example, in a state in which the first group of racks 9a is initially radially arranged in a circumferential direction around the rotational axis of the rotational shaft, the first group of racks may be rotated by 60 degrees clockwise and/or counterclockwise from their initial positions and/or orientations. Further, in a state in which the second group of racks 9b is initially radially arranged in a circumferential direction around the rotational axis of the rotational shaft, the second group of racks may be rotated by 30 degrees clockwise and/or counterclockwise from their initial orientation. In any of the embodiments described herein, the rotational axis of the rotational shaft may correspond to a center of the cryogenic tank.

The first predetermined rotational angle and the second predetermined rotational angle may be determined based on the positions and/or orientations of the first and second sets of arrangement areas 9a' and 9b' described above. In some examples, the first predetermined rotational angle may be 60°, and the second predetermined rotational angle may be 30°. Referring to FIG. 5D, when the first set of arrangement areas 9a' and the second set of arrangement areas 9b' are arranged radially, they may be respectively rotated by the first and second predetermined rotational angles about the center of the cryogenic tank, thereby aligning a rack from the first group of racks with the inner door and/or aligning a rack from the second group of racks with the outer door.

As described above, the first set of arrangement areas 9a' and the second set of arrangement areas 9b' may arrange the first group of racks and the second group of racks in a ring configuration (i.e., a circular configuration) around the center of the cryogenic tank at a first and second radial distance, respectively. The first group of racks and the second group of racks may be rotated by a first predetermined rotational angle and/or a second predetermined rotational angle to bring one or more racks in alignment with the inner door and/or the outer door of the cryogenic tank.

In some cases, the first radial distance and/or the second radial distance at which the first group of racks and the second group of racks is positioned may be increased or decreased by a predetermined distance in order to move a vertex of a rack (e.g., a vertex closest to the center of rotation) closer to or further away from the center of rotation. The predetermined distance may be adjusted so that the positions of the first arrangement areas 9a' and the second arrangement areas 9b' may be aligned with the inner door or the outer door when the first group of racks and/or the second group of racks are rotated.

As illustrated in FIGS. 5C-5D, the upper frame 1211 of the frame structure may be configured (i) to position the first group of racks based on the first set of arrangement areas 9a' and (ii) to position the second group of racks based on the second set of arrangement areas 9b'. The first set of arrangement areas may configure the first group of racks in a first rack arrangement pattern. The second set of arrangement areas may configure the second group of racks in a second rack arrangement pattern.

The first rack arrangement pattern and the second rack arrangement pattern may exhibit point symmetry with respect to a center of rotation of the receiving part of the cryogenic tank. For example, the first group of racks 9a in the first rack arrangement pattern may be arranged such that any two racks opposite each other have corresponding features that are positioned the same distance from the point of symmetry (i.e., the center of rotation) but are positioned and/or oriented in opposite directions (e.g., mirrored). In other words, the first rack arrangement pattern may position the first group of racks such that the racks remain in an identical rack arrangement pattern when rotated by 180 degrees. In another example, the second group of racks 9b in the second rack arrangement pattern may be arranged such that any two racks opposite each other have corresponding features that are positioned the same distance from the point of symmetry (i.e., the center of rotation) but are positioned and/or oriented in opposite directions (e.g., mirrored). In other words, the second rack arrangement pattern may position the second group of racks such that the racks remain in an identical rack arrangement pattern when rotated by 180 degrees.

The first rack arrangement pattern and the second rack arrangement pattern may exhibit rotational symmetry. For example, the first group of racks 9a in the first rack arrangement pattern may be arranged such that the racks remain in an identical rack arrangement pattern when rotated about the center of the cryogenic tank by a first rotational angle equal to the first angular interval, or a multiple thereof. In another example, the second group of racks 9b in the second rack arrangement pattern may be arranged such that the racks remain in an identical rack arrangement pattern when rotated about the center of the cryogenic tank by a second rotational angle equal to the second angular interval, or a multiple thereof.

Given the arrangement of the first group of racks 9a and the second group of racks 9b, as disclosed herein, the minimum and maximum separation distances between each rack may be reduced, and the racks can be efficiently arranged in a smaller area (i.e., space utilization is increased) as compared to conventional cryogenic systems holding the same number of racks. Thus, the size (i.e., a footprint or a dimension) of the entire cryogenic system may be reduced.

Referring to FIG. 5D and FIGS. 6A-6C, the cryogenic tank may comprise an inner door provided on the lid of the cryogenic tank. The location and/or orientation of the inner door may correspond to one of the first arrangement areas 9a' so that the first group of racks 9a may be inserted into or withdrawn from the receiving part 12 of the cryogenic tank via the inner door. Moreover, the cryogenic tank may comprise an outer door provided on the lid of the cryogenic tank. The location and/or orientation of the outer door may correspond to one of the second arrangement areas 9b' so that the second group of racks 9b may be inserted into or withdrawn from the receiving part 12 of the cryogenic tank via the outer door. The inner door and the outer door may be installed in the X-axis direction (i.e., in a direction parallel to the X-axis).

Figure 6A:
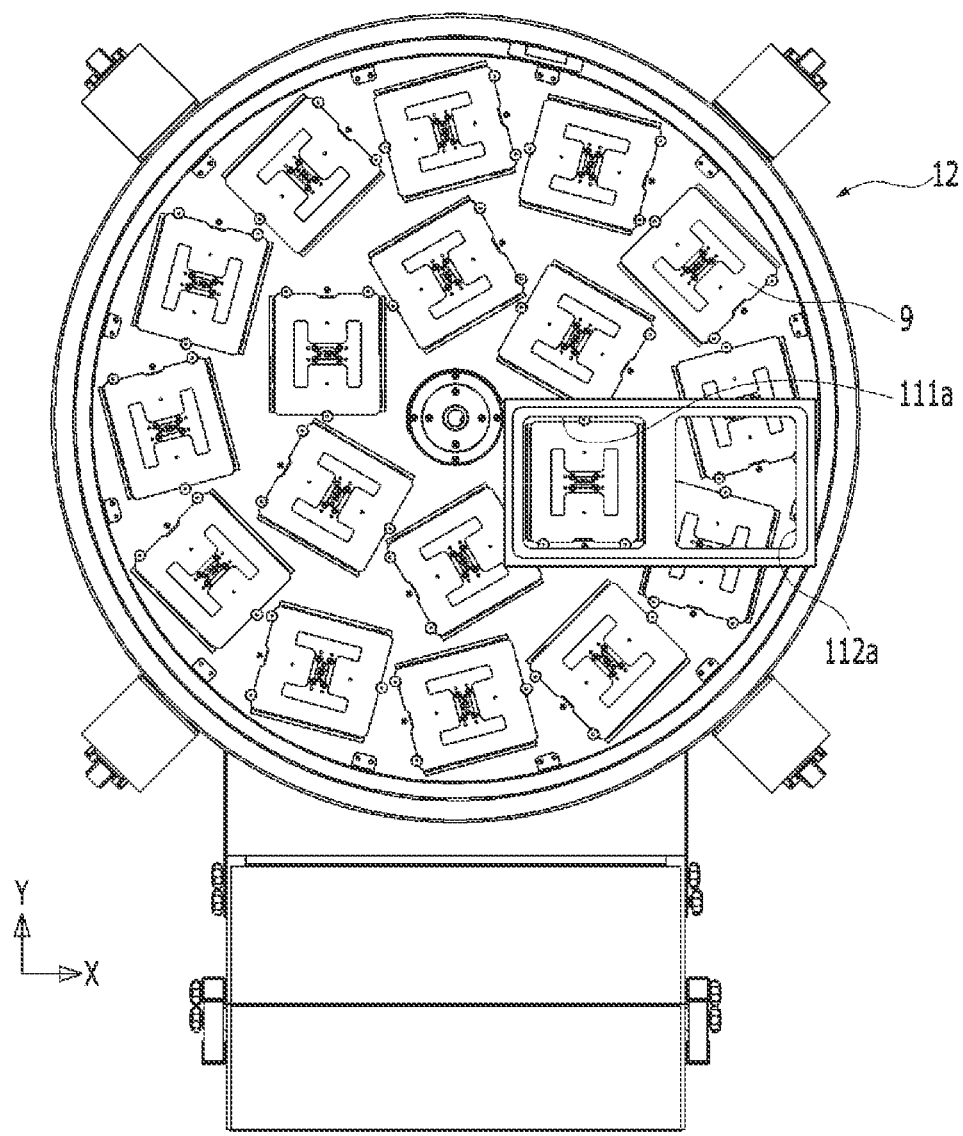
FIG. 6A is a schematic conceptual diagram provided to explain the array of racks and the positional relationship between inner and outer doors of a cryogenic storage system according to an embodiment of the present disclosure.
Figure 6B:
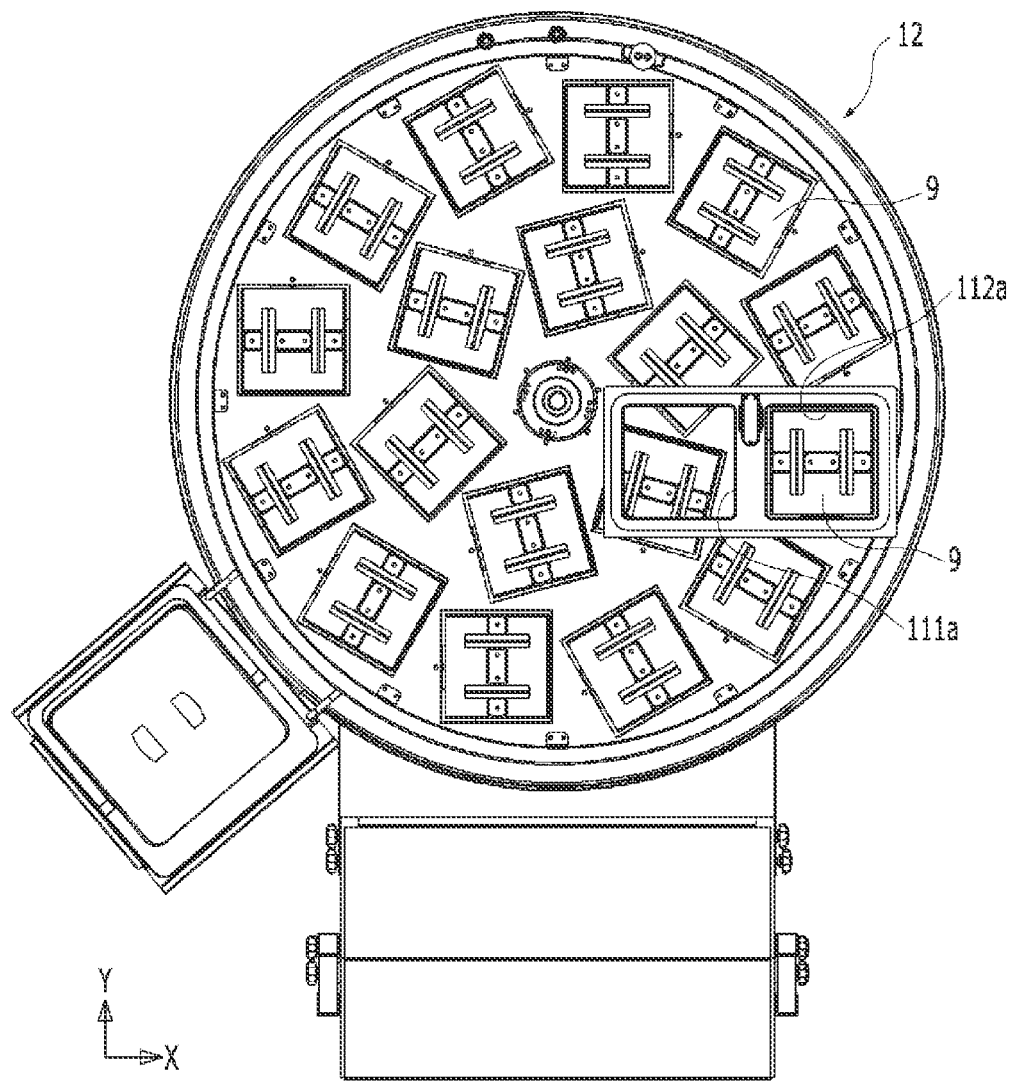
FIG. 6B illustrates the arrangement of racks and the positional relationship of the racks relative to the inner and outer doors of the cryogenic storage system, in accordance with some embodiments.
Figure 6C:
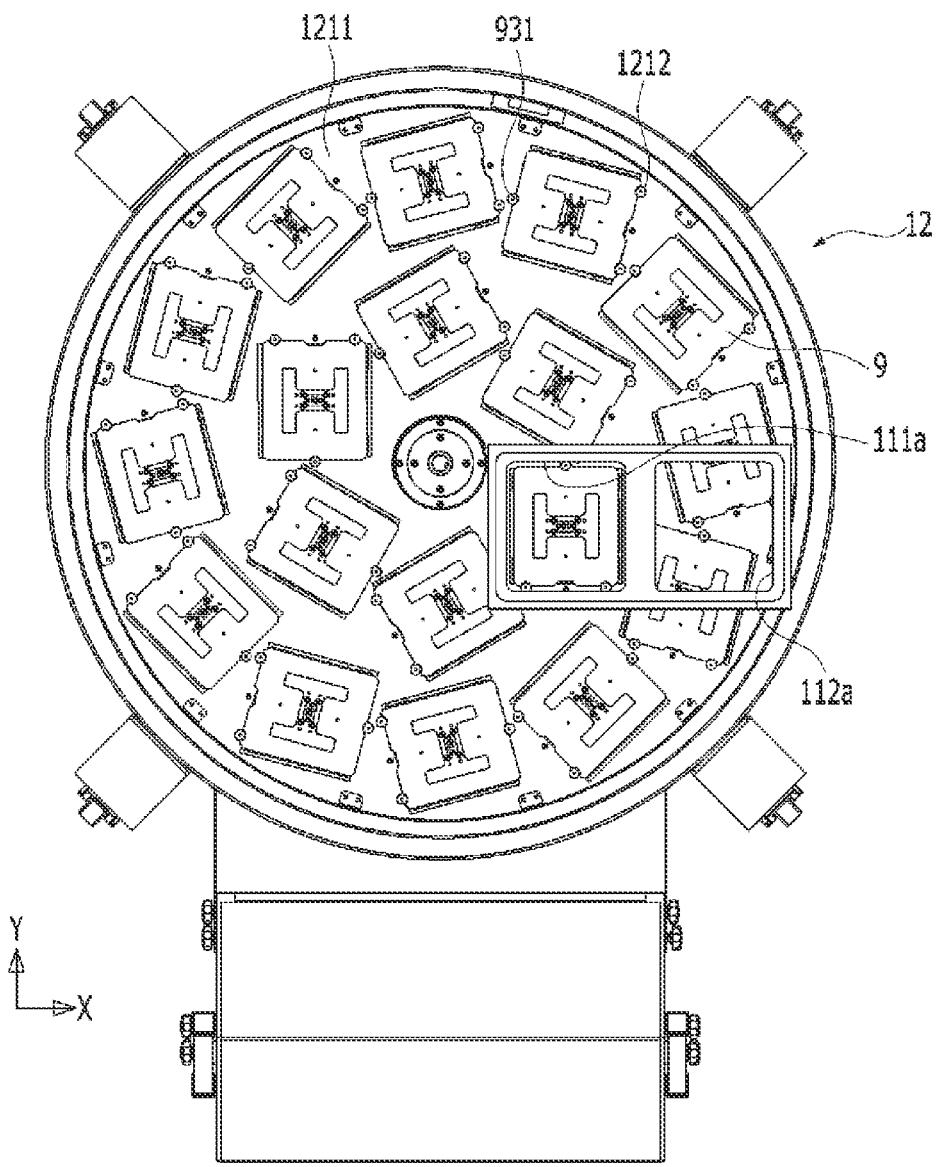
FIG. 6C is a schematic diagram illustrating the arrangement of racks and the positional relationship between the inner and outer doors of the cryogenic storage system, in accordance with some embodiments.

As illustrated in FIG. 6C, the lid may comprise one or more openings that correspond to the inner open area 111a and the outer open area 112a. The inner door and the outer door may respectively close each of the open areas 111a and 112a. Accordingly, when the inner door is opened, the open area 111a which is closed by the inner door can be opened, and when the outer door is opened, the open area 112a, which was closed by the outer door, can be opened. When the inner door or the outer door is opened, the open areas 111a and 112a can be opened, and a rack 9 in the first group of racks or the second group of racks may be inserted into the cryogenic tank and/or withdrawn from the cryogenic tank through one of the opening areas 111a or 112a. The inner door and the corresponding open area 111a may be positioned closer to the center of the lid than the outer door and the corresponding open area 112a.

FIGS. 6A-6C illustrate the arrangement of the first group of racks and the second group of racks, as well as the positional relationship between the racks and the inner and outer doors of the cryogenic storage system. FIGS. 6A and 6C show a configuration in which the first group of racks may align with the inner door. FIG. 6B shows a configuration in which the second group of racks may align with the outer door. FIG. 6C further illustrates a frame structure within the receiving part 12 of the cryogenic tank. As described elsewhere herein, the receiving part 12 may comprise a frame structure for positioning the first group of racks and the second group of racks in a first arrangement pattern and a second arrangement pattern around the center of the cryogenic tank. The frame structure may comprise an upper frame 1211, and the upper frame 1211 may comprise a projecting pin 1212 that may be configured to engage with one or more grooves 931 on an upper surface of a rack, when the rack is inserted into the frame structure.

Referring to FIGS. 3A-3B and FIGS. 6A-6C, the inner door 111 may be configured to allow access to one rack 9 included in the first group of racks 9a and located corresponding to the inner door 111, and the outer door 112 may be configured to allow access to one rack 9 included in the second group of racks 9b and located corresponding to the outer door 112. The inner door 111 may be sized such that the open region 111a formed by opening of the inner door 111 has a minimum area that allows access to one rack 9 included in the first group of racks 9a that is located corresponding to the inner door 111. The outer door 112 may be sized such that the open region 112a formed by opening the outer door 112 has a minimum area that allows access to one rack 9 included in the second group of racks 9b that is located corresponding to the outer door 112.

Another aspect of the present disclosure provides a cryogenic storage system for storing multiple racks. The cryogenic storage system may comprise a cryogenic tank comprising an inner door and an outer door through which a rack of the multiple racks may be insertable into the cryogenic tank or removable from the cryogenic tank. The cryogenic tank may be configured to hold the multiple racks in a ring configuration comprising (i) a first group of racks located at a first radial distance from the center of the cryogenic tank and (ii) a second group of racks located at a second radial distance from the center of the cryogenic tank. The center point of the cryogenic tank and a center point of the inner door may lie along a first axis, and the center point of the cryogenic tank and a center point of the outer door may lie along a second axis that is different from the first axis. The first axis and the second axis may not be parallel with each other. The first axis and the second axis may intersect at an angle. The angle may range from 0 degrees to 90 degrees. The first axis and the second axis may or may not lie on substantially a same plane. Alternatively, the first axis may lie on a first plane, and the second axis may lie on a second plane that is different from the first plane. The first plane and the second plane may be substantially parallel to each other. The first plane and the second plane may be oblique to each other. The first axis and the second axis may not lie along a common radial line extending from the center point of the cryogenic tank.

FIG. 5E illustrates a positional relationship between the center 101 of the cryogenic tank and the respective centers c1 and c2 of the inner door and the outer door. As shown in FIG. 5E, a center point 101 of the cryogenic tank and a center point of the inner door c1 may lie along a first axis 103, and the center point 101 of the cryogenic tank and a center point c2 of the outer door may lie along a second axis 104. The second axis 104 may not be parallel to the first axis 103.

As further illustrated in FIG. 5E, a center of the inner door 111 may be positioned at a 4 o'clock position with respect to the center of rotation of the rotational shaft, and a center of the outer door 112 may be positioned between a 3 o'clock direction and a 4 o'clock direction with respect to the center of rotation of the rotational shaft. Depending on the arrangement of the racks in the first group of racks and/or the second group of racks and the rotational position of the receiving part 12, the inner door 111 and the outer door 112 may be repositioned relative to the center of rotation of the rotational shaft. As described elsewhere herein, the positions and/or orientations of the inner door 111 and the outer door 112 may allow only one of the multiple racks 9 to be selectively positioned below either the inner door 111 or the outer door 112 at a time, for any rotational angle between 0 degrees and 360 degrees. Accordingly, when a rack 9 is pulled out, only the door above the rack 9 to be drawn out may be opened. Thus, any variations in temperature for the remaining racks may be minimized.

As described elsewhere herein, the cryogenic tank may be configured to rotate the multiple racks relative to (a) a center of the cryogenic tank and (b) the inner door and the outer door. The cryogenic tank may be configured to hold the multiple racks such that at most one rack of the multiple racks is removable from the cryogenic tank through the inner door or the outer door at a given time instance.

As described above, the cryogenic storage system may further comprise a robot apparatus that is located adjacent to the cryogenic tank. The robot apparatus may be configured to (i) selectively open or close the inner door or the outer door, and (ii) insert or withdraw the rack into or out of the cryogenic tank through the inner door or the outer door.

A different aspect of the present disclosure provides a cryogenic storage system. The cryogenic storage system may comprise a cryogenic tank comprising an inner door and an outer door through which a rack is insertable into the cryogenic tank or removable from the cryogenic tank. The cryogenic tank may be configured to hold (i) a first group of racks at a first radial distance from a center of the cryogenic tank and (ii) a second group of racks at a second radial distance from the center of the cryogenic tank. The first group of racks may have a different angular orientation than the second group of racks relative to a radial line extending from the center of the cryogenic tank.

As shown in FIG. 5E, an individual rack of the first group of racks may be oriented at a first angle α relative to a center axis 102-2 of the cryogenic tank that is parallel to the Y-axis, and each individual rack of the second group of racks may be oriented at one or more angles β relative to the center axis 102-2 of the cryogenic tank. The one or more angles β may be different than the first angle α.

As described elsewhere herein, the first group of racks and the second group of racks may be rotatable relative to (a) the center of the cryogenic tank and (b) the inner door and the outer door. Further, the cryogenic tank may be configured to hold the first group of racks and the second group of racks such that at most a single rack from either the first group of racks or the second group of racks is removable from the cryogenic tank through the inner door or the outer door. As described above, the cryogenic storage system may further comprise a robot apparatus located adjacent to the cryogenic tank. The robot apparatus may be configured to (i) selectively open or close the inner door or the outer door, and (ii) insert or withdraw the rack into or out of the cryogenic tank through the inner door or the outer door.

A further aspect of the present disclosure provides a cryogenic storage system for storing multiple racks. The cryogenic storage system may comprise a cryogenic tank comprising an inner door and an outer door each located on an upper surface of the cryogenic tank. The cryogenic tank may be configured to hold the multiple racks in a ring configuration comprising (i) a first group of racks located at a first radial distance from a center of the cryogenic tank and (ii) a second group of racks located at a second radial distance from the center of the cryogenic tank. The center of the inner door and the center of the outer door may lie along an axis that is laterally offset by a distance from the center of the cryogenic tank. The axis may not lie along a radial line extending from the center of the cryogenic tank.

As shown in FIGS. 3A-3B, FIG. 5E, and FIGS. 6A-6C, the inner door 111 and the outer door 112 may be arranged above or below a radial line that is parallel to the X-axis and extends from a center of the cryogenic tank. As shown in FIG. 5E, the inner door 111 and the outer door 112 may be positioned such that the center of the inner door c1 and the center of the outer door c2 lie along an axis that is displaced in the negative Y-direction relative to an axis 102-1 that lies parallel to the X-axis and intersects the center 101 of the cryogenic tank.

Referring to FIG. 5E, the cryogenic tank may comprise an inner door 111 and an outer door 112 disposed on an upper surface of the receiving part 12 of the cryogenic tank. A center c1 of the inner door 111 and a center c2 of the outer door 112 may lie along a center axis 105 that is not a radial line extending from the center 101 of the cryogenic tank. The axis 105 may be laterally offset in the Y-direction by a predetermined distance d from the center axis 102-1 of the cryogenic tank. The center axis 102-1 may intersect a center point 101 of the cryogenic tank and may be parallel to one or more sides of the inner door 111 and one or more sides of the outer door 112.

The cryogenic storage system may further comprise a receiving unit configured to arrange the multiple racks such that at most one rack from the first group of racks and the second group of racks is insertable or removable from the cryogenic tank through the inner door or the outer door. The cryogenic storage system may also include a rotatable frame structure configured to rotate the first group of racks and the second group of racks relative to the center of the cryogenic tank.

The rotatable frame structure may be configured to (i) position the first group of rack at the inner door by rotating the multiple racks by a first set of rotational angles and (ii) position the second group of racks at the outer door by rotating the multiple racks by a second set of rotational angles. The rotatable frame structure may be configured to position the first group of racks and the second group of racks in an arrangement exhibiting point symmetry with respect to the center of the cryogenic tank. The rotatable frame structure may be configured to (i) align consecutive racks within the first group of racks with the inner door when the multiple racks are rotated by a first rotational angle, and (ii) align consecutive racks within the second group of racks with the outer door when the multiple racks are rotated by a second rotational angle. The first rotational angle may be greater than the second rotational angle.

As described elsewhere herein, the inner door and the outer door may be positioned at different radial distances from the center of the cryogenic tank. In some cases, the cryogenic storage system may further comprise a robot apparatus located adjacent to the cryogenic tank and configured to selectively (i) open the inner door, (ii) close the inner door, (iii) open the outer door, (iv) close the outer door, (v) insert a rack of the first group of racks or the second group of racks into the cryogenic tank, and (vi) withdraw a rack of the first group of racks or the second group of racks from the cryogenic tank.

Figure 7:
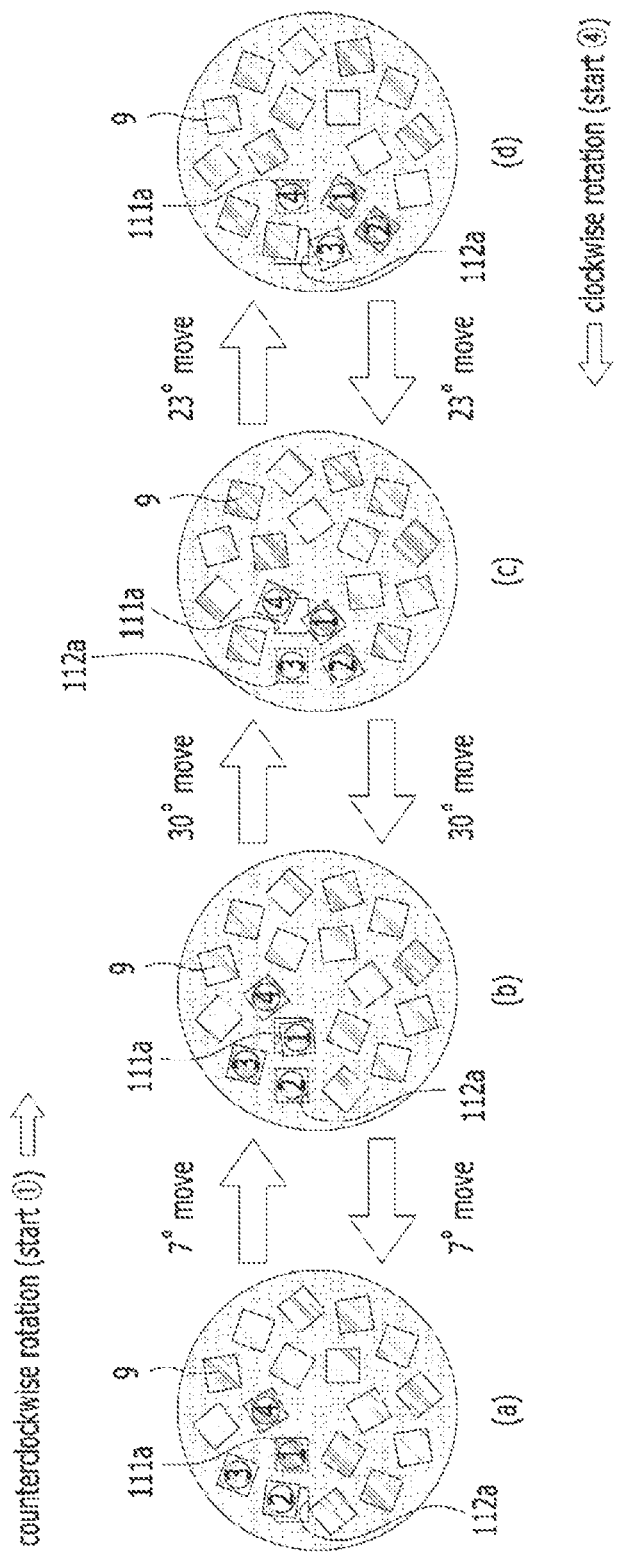
FIG. 7 is a schematic conceptual diagram provided to explain the corresponding relationship between a rack and inner and outer doors of a cryogenic storage system when the rack is rotated, in accordance with some embodiments.

FIG. 7 illustrates the positional relationship between one or more racks and the inner and outer doors of a cryogenic storage system when the one or more racks are rotated according to any of the embodiments disclosed herein.

As shown in FIG. 7, if the multiple racks 9 are rotated by 7° in one direction (e.g., a counterclockwise direction) along the circumferential direction from a state where one rack (e.g., the rack 9 marked with $\hat{1}$) in the first group of racks 9a is located corresponding to the inner open region 111a (see FIG. 7(a)), one rack (e.g., the rack 9 marked with $\hat{2}$) in the second group of racks 9b may be located corresponding to the outer open region 112a (see FIG. 7(b)). If the multiple racks 9 are further rotated by 30° in the one direction, another one rack (e.g., the rack 9 marked with $\hat{3}$) in the second group of racks 9b may be located corresponding to the outer open region 112a (see FIG. 7(c)), and if the multiple racks 9 are further rotated by 23° in the one direction, yet another one rack (e.g., the rack 9 marked with $\hat{4}$) in the first group of racks 9a may be located corresponding to the inner open region 111a (see FIG. 7(d)). Further, according to the above description, if the multiple racks 9 are rotated by 23° in another direction (e.g., a clockwise direction) along the circumferential direction from the state where one rack (e.g., the rack 9 marked with $\hat{4}$) in the first group of racks 9a is located corresponding to the inner open region 111a (see FIG. 7(d)), one rack (e.g., the rack 9 marked with $\hat{3}$) in the second group of racks 9b may be located corresponding to the outer open region 112a (see FIG. 7(c)). If the multiple racks 9 are further rotated by 30° in the other direction, another one rack (e.g., the rack 9 marked with $\hat{2}$) in the second group of racks 9b may be located corresponding to the outer open region 112a (see FIG. 7(b)), and if the multiple racks 9 are further rotated by 7° in one direction (e.g., a counterclockwise direction) along the circumferential direction, another one rack (e.g., the rack 9 marked with $\hat{1}$) in the first group of racks 9a may be located corresponding to the inner open region 111a (see FIG. 7(a)). Thus, in the present cryogenic storage system, the multiple racks 9 may be rotated by a predetermined angle in a combined order of 7°, 30°, and 23° so that one of the multiple racks 9 containing a desired box 91 may be located (i.e., positioned and oriented) corresponding to the inner door or the outer door.

According to the above description, when the multiple racks 9 are rotated, at most a single rack of the multiple racks 9 may be located corresponding to one of the inner door 111 or the outer door 112. In some cases, when the multiple racks 9 are rotated, at most a single rack of the multiple racks 9 may be aligned directly underneath one of the inner door 111 or the outer door 112. In such cases, only one of the inner door 111 or the outer door 112 may be opened to allow a rack 9 to be withdrawn. Accordingly, when the rack 9 is withdrawn, a size (i.e., an area) of an open region of the cryogenic tank can be reduced as compared to an open region exposed when a rack is removed from a cryogenic tank of conventional cryogenic storage systems. Therefore, the cryogenic storage systems disclosed herein may be configured to reduce a change in temperature within the cryogenic tank and to minimize a leakage of a cooling nitrogen gas when one or more racks 9 are removed from the cryogenic tank. Conventional systems may provide a single door through which a first group of racks and a second group of racks may be inserted into or withdrawn from the cryogenic tank. In such conventional systems, the door and the corresponding open region covered by the door may be much greater in area than the size of the individual racks. Thus, when a rack is selected for withdrawal, opening the door may expose an open region with an area larger than the dimensions of the rack, thereby causing the cryogenic tank to discharge large volumes of a gas (e.g., liquid nitrogen) used to cool and/or preserve the biological samples. Further, a temperature of a rack near the open region may increase due to exposure to ambient air, which may damage any biological samples stored in the rack. However, the present cryogenic storage system may comprise an inner door and an outer door, both of which are sized with a minimum area that allows for the withdrawal and/or insertion of a rack 9 in the first group of racks 9a and the second group of racks 9b, respectively. Accordingly, in the cryogenic storage systems disclosed herein, the size of an open region through which a rack 9 is inserted or withdrawn may be reduced. Therefore, the cryogenic storage systems of the present disclosure may be configured to (i) reduce the amount of a gas that is discharged from the cryogenic tank and (ii) minimize a change in temperature of the one or more racks 9 within the cryogenic system when a rack from the first group of racks and/or the second group of racks is removed from and/or inserted into the cryogenic tank.

As illustrated in FIGS. 1A-1B and FIGS. 2A-2C, the present cryogenic storage system may comprise a robot apparatus 2. The robot apparatus 2 may be placed on or adjacent to the cryogenic tank 1. The robot apparatus 2 may be configured to selectively open and close the inner door 111 or the outer door 112. The robot apparatus 2 may be configured to insert or withdraw the rack 9 into or out of the cryogenic tank 1 through the inner door 111, the outer door 112, or an open region (e.g., an inner open region and/or an outer open region) that may be formed when the inner door 111 or the outer door 112 is opened.

Referring to FIGS. 2A-2C, the robot apparatus 2 may include a puller 21. The puller 21 may include a grip portion 211 capable of gripping the inner door 111, the outer door 112, and the rack 9. The puller 21 of the robot apparatus 2 may be configured to grip all of the rack 9 as well as the inner door 111 and outer door 112 through which one or more racks 9 can come in and out. Further, in the present cryogenic tank 1, the puller 21 may be configured to open the inner door 111, close the inner door 111, open the outer door 112, close the outer door 112, withdraw one or more racks from the cryogenic storage system (e.g., a first group of racks 9a and/or a second group of racks 9b as shown in FIGS. 5A-5C), and/or insert one or more racks into the cryogenic storage system (e.g., a first group of racks 9a and/or a second group of racks 9b as shown in FIGS. 5A-5C). Therefore, the cryogenic storage systems disclosed herein may utilize fewer mechanical components than a conventional system that includes one component for opening a door and a separate component for withdrawing a rack 9.

FIG. 2B illustrates a portion of a robot apparatus 2 of a cryogenic storage system. The robot apparatus 2 may comprise a housing 22 that may be configured to accommodate a puller 21 and one or more racks 9 to be drawn in to or out of the cryogenic tank. Further, the robot apparatus 2 may comprise a pushing unit (i.e., a pusher) 23 for pushing a box in the Y direction so that at least a portion of the box 91 loaded on the rack 9 may extend out of the housing 22. The robot apparatus 2 may comprise a box door 24 formed in a portion of the housing 22 such that at least a portion of the box 91 pushed by the pushing unit 23 may extend outside of the housing 22 in the Y-direction. The robot apparatus may comprise two or more box doors 24. One of the two or more box doors 24 may be used to insert and/or withdraw a box 91 accommodated in a rack 9 (e.g., a rack in the first group of racks) through the inner door 111. Another of the two or more box doors may be used to insert and/or withdraw a box 91 accommodated in a rack 9 (e.g., a rack in the second group of racks) through the outer door 112. When a box 91 is pushed by the pushing unit 23, the pushing unit 23 may push the box 91 in the Y-direction, thereby causing the pushed box 91 to exert an external force on the box door 24 that may be sufficient to push open the box door 24. An upper end of the two or more box doors 24 may be hinged to the housing 22.

Referring to FIG. 2B and FIGS. 10A-10C, the housing 22 may provide an edge frame 25 adjacent to the side surfaces of the inner door 111 and the outer door 112. The edge frame 25 may comprise a pushing unit through-groove 2521 through which the pushing unit 23 can be inserted. Accordingly, the pushing unit 23 may be inserted into the edge frame 25 through the pushing unit through-groove 2521 of the edge frame 25 to push a box 91 through the inner door 111 and/or the outer door 112.

FIGS. 2A and 2C show a cryogenic storage system wherein the inner door 111 may be arranged on (i.e., placed above) the outer door so that an inner open area corresponding to the inner door 111 may be opened. The puller 21 may be configured to lift a rack through the inner open area, and a box may be drawn out from the raised rack. As further illustrated in FIG. 2C and FIG. 4D, an upper surface 93 of the rack 9 may comprise one or more grooves 931 recessed inward in the Y-direction. Further, the one or more racks 9 may comprise one or more projections 92 that project upward in the Z-direction from a surface of each level of the rack, as described elsewhere herein.

Figure 8:
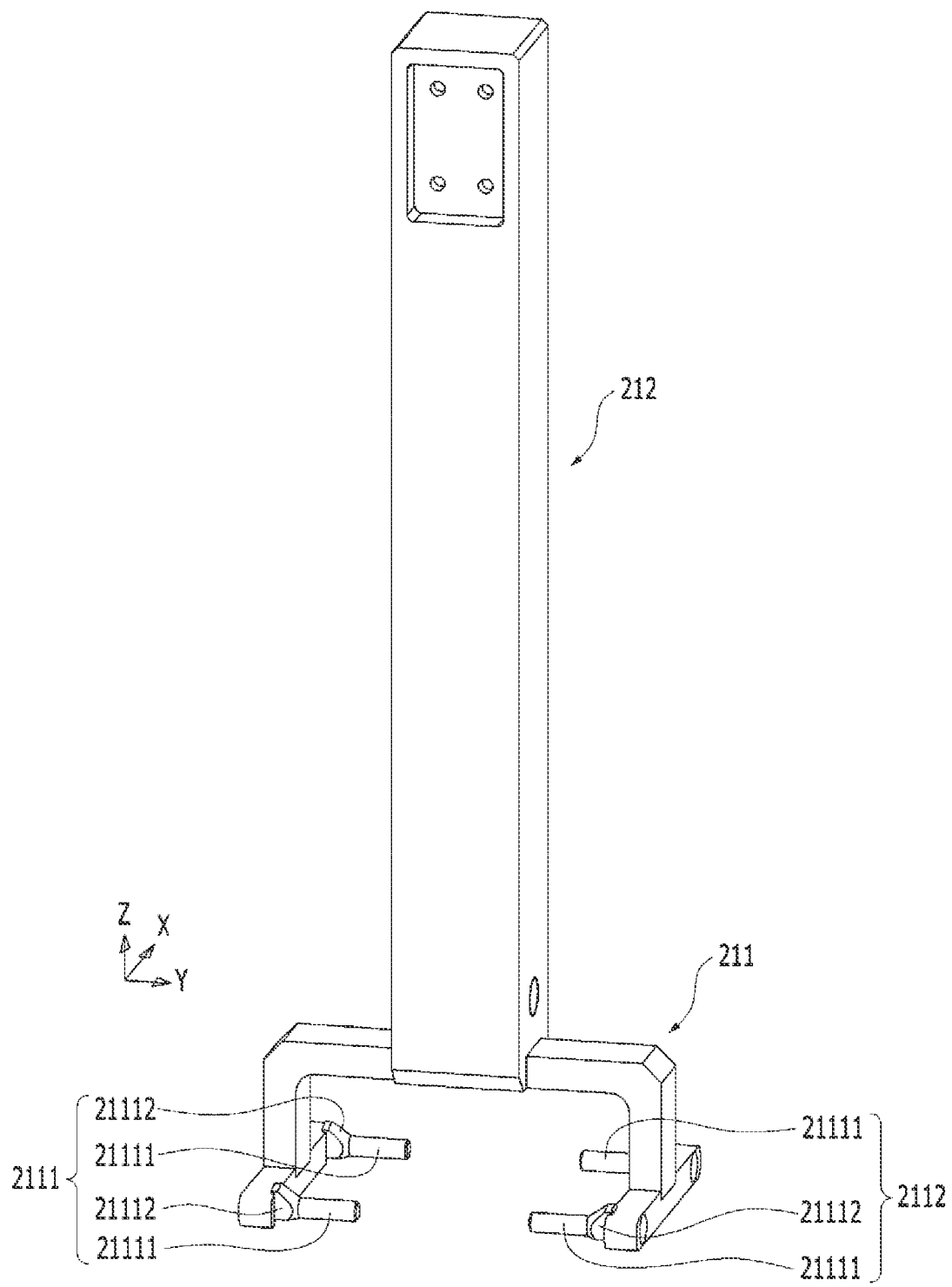
FIG. 8 is a schematic conceptual diagram illustrating a puller of a cryogenic storage system according to an embodiment of the present disclosure.

FIGS. 2A-2C and FIG. 8 illustrate a puller of the robot apparatus. As shown in FIG. 8, the puller may comprise a grip portion 211 and a moving bar 212 that may extend upward from the grip portion 211. The moving bar 212 may be configured to move in upward and downward directions (i.e., along the Z-axis) and in a direction parallel to the X-axis and/or parallel to the inner door and the outer door. The grip portion 211 may include a first insertion unit 2111 including two insertion pins 21111 arranged parallel to each other and a second insertion unit 2112 including two insertion pins 21111 arranged parallel to each other and facing the first insertion unit 2111. The first insertion unit 2111 may include outer alignment units 21112 which may be positioned between the insertion pins 21111 and the grip portion 211 of the puller. The outer alignment units 21112 may have slanted surfaces that gradually decrease in height along the Y-direction. The second insertion unit 2112 may include outer alignment units 21112 which may be positioned between the insertion pins 21111 and the grip portion 211 of the puller. The outer alignment units 21112 may have slanted surfaces that gradually increase in height along the Y-direction.

Referring to FIGS. 2A-2C and FIG. 8, the puller 21 may include a moving bar 212 that may extend upward from the grip portion 211. The moving bar 212 may be configured to move in upward and downward directions parallel to the Z-axis and/or in a direction parallel to the X-axis. The robot apparatus 2 of the present cryogenic storage system may further comprise moving members such as a driving unit (e.g., a motor) and a guide that may be configured to move the puller 21, including the moving bar 212 and the grip portion 211, in a direction parallel to the X-axis and/or the Z-axis. The inner door 111 and the outer door 112 may be positioned such that the inner door 111 and the outer door 112 are oriented in a direction parallel to the X-axis. The puller 21 may be positioned relative to either the inner door 111 or the outer door 112 such that the puller 21 and the inner door 111 or the outer door 112 are oriented along a direction that is parallel to the Z-axis. The pusher (i.e., the pushing unit) 23 may be positioned relative to the inner door 111 and the outer door 112 such that the pusher 23 and the inner door 111 or the outer door 112 are oriented along a direction that is parallel to the Y-axis. The inner door 111, the outer door 112, the puller 21, and the pusher 23 may be installed in one or more positions that do not interfere with the R-axis driving device (i.e., the driving device that rotates the rotary shaft 13).

Figure 9A:
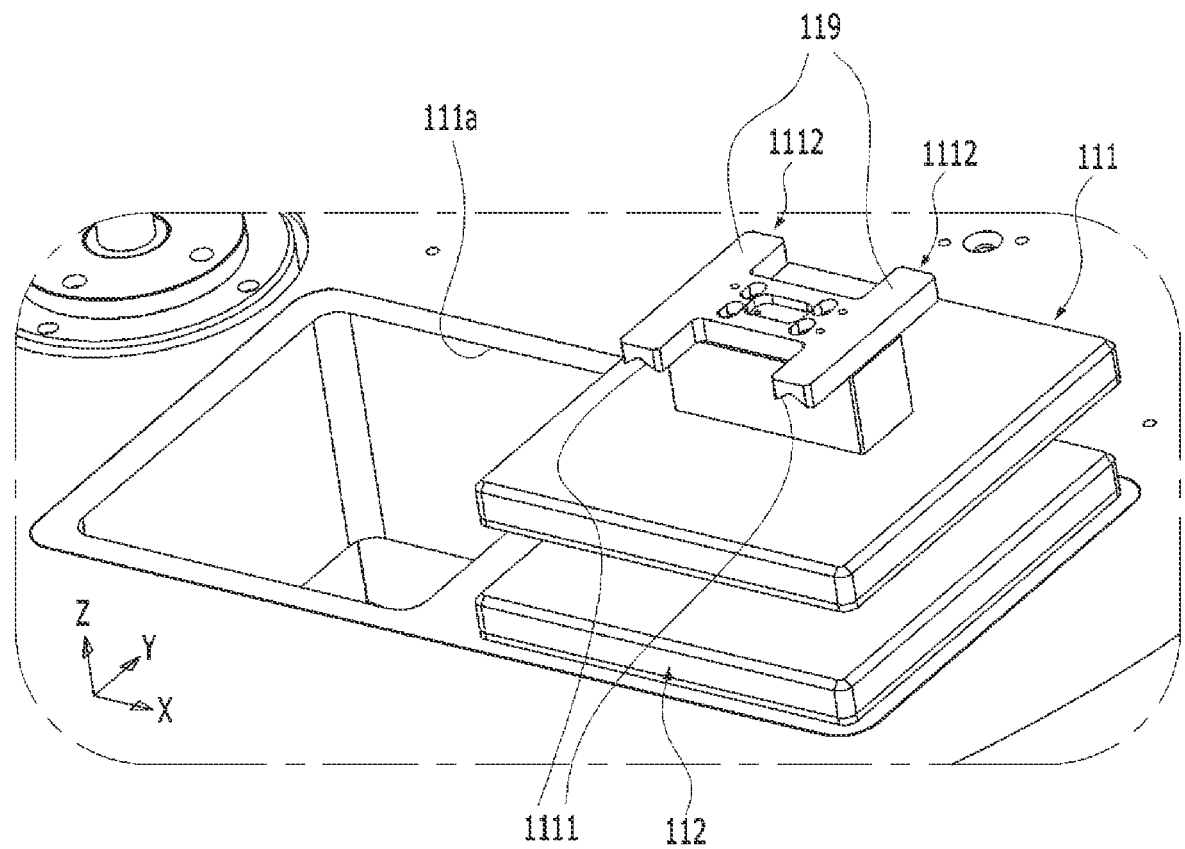
FIG. 9A is a schematic conceptual diagram illustrating an inner door of a cryogenic storage system that is placed on an outer door, in accordance with some embodiments.
Figure 9B:
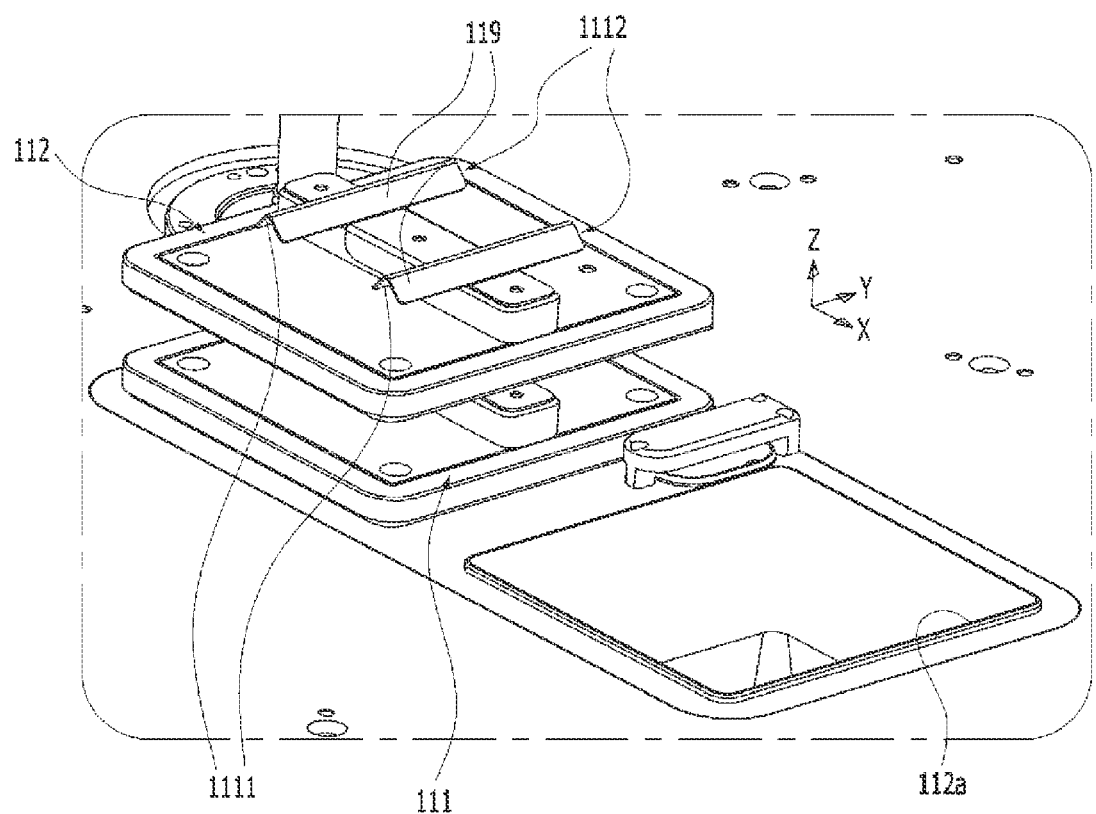
FIG. 9B is a schematic diagram showing an outer door placed on the inner door of the cryogenic storage system, in accordance with some embodiments.
Figure 9C:
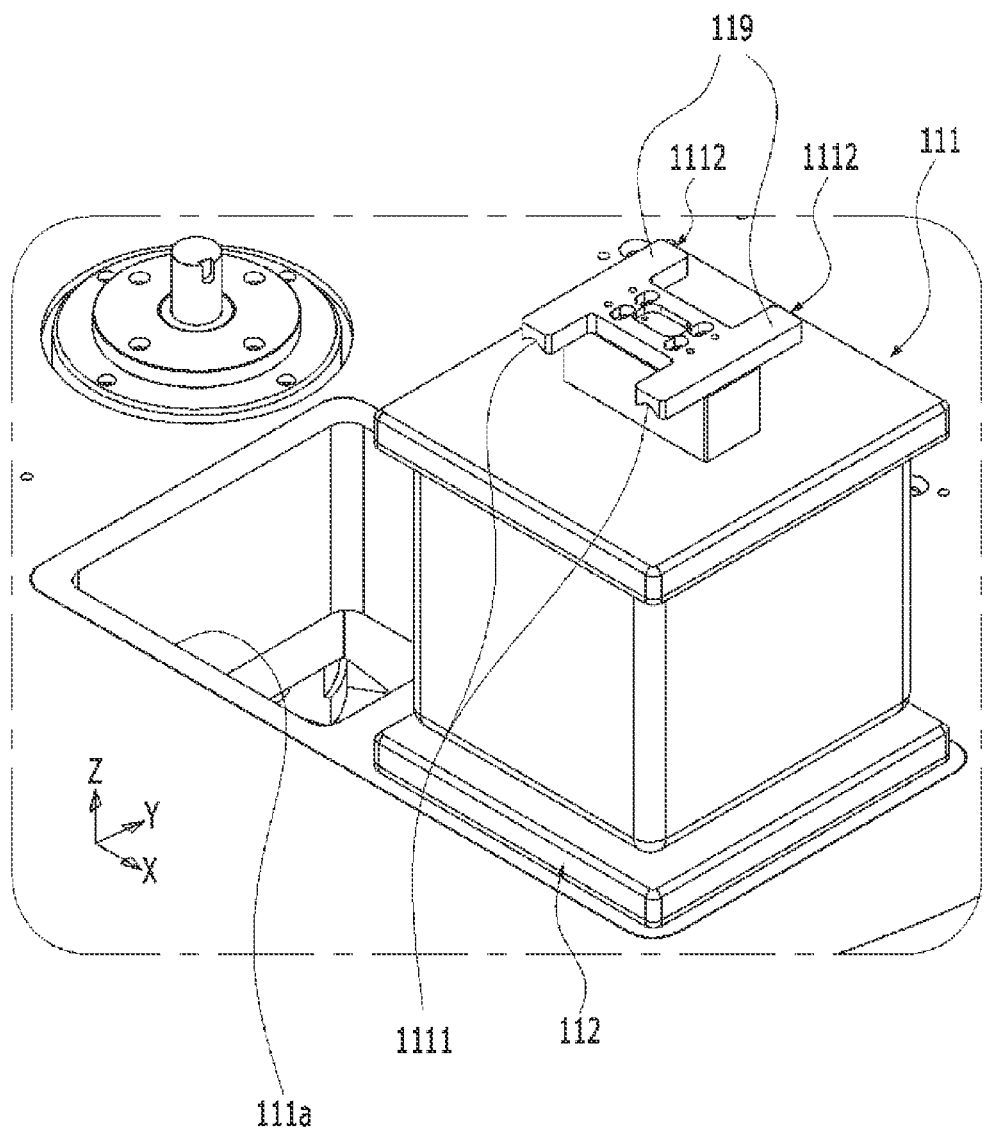
FIG. 9C illustrates an inner door positioned above an outer door of the cryogenic storage system, in accordance with some embodiments.

Referring to FIGS. 9A-9C, an upper surface of the rack 9, the inner door 111, and/or the outer door 112 may comprise (i) a first insertion portion 1111 through which the insertion pin 21111 of the first insertion unit 2111 may be inserted for support, and (ii) a second insertion portion 1112 through which the insertion pin 21111 of the second insertion unit 2112 may be inserted for support. As shown in FIGS. 9A-9C, two holding bars 119 may be provided on an upper surface of the inner door 111, the outer door 112, and each of the multiple racks 9. The first and second insertion portions 1111 and 1112 may comprise one or more recessed grooves that may be depressed into one or more lower surface of the holding bars 119. The moving bar may be configured to lower the grip portion 211 of the puller 21 to an upper surface of the inner door 111, the outer door 112, and/or a rack 9, thereby positioning the insertion pins 21111 of the first insertion unit 2111 and the second insertion unit 2112 adjacent to one side (i.e., on the left side or right side) of the two holding bars 119 and between the two holding bars 119. The moving bar may be configured to move the insertion pins 21111 of the first insertion unit 2111 and the second insertion unit 2112 along a direction that is parallel to the X-axis to the left or right sides of the two holding bars 119, thereby positioning the four insertion pins 21111 underneath the first and second insertion portions 1111 and 1112 of the holding bars, respectively. The moving bar may be configured to raise the grip portion 211 of the puller 21 so that the four insertion pins 21111 may engage with the recessed grooves and the first and second insertion portions 1111 and 1112 of the holding bars 119. Thus, the moving bar may be configured to grip and reposition the inner door 111, the outer door 112, and/or the rack 9.

In some cases, the one or more racks 9 may be shaken within the cryogenic tank 1, thereby causing the one or more racks 9 to deviate from an aligned state (i.e., a configuration where the racks 9 are aligned in a direction parallel to a Z-axis, without skewing in the X-axis and/or Y-axis direction). As a result, the one or more racks 9 may become misaligned and may remain in a slightly slanted state (i.e., in a configuration where the racks 9 are slanted in the X-axis and/or Y-axis directions). In such cases, the one or more misaligned racks 9 may be realigned to properly engage with the puller 21.

For example, when the insertion pins 21111 are inserted into the first and second insertion portions 1111 and 1112 of the holding bars 119 that are provided on an upper surface of the one or more misaligned racks 9, the first and second insertion portions 1111 and 1112 and the corresponding insertion pins 21111 may deviate towards a longitudinal direction (e.g., a direction parallel to the Y-axis) and/or a widthwise direction (e.g., a direction parallel to the X-axis) of the holding bars 119. In such cases, if the one or more racks 9 are moved in upward and downward directions, the one or more racks may be caught in the frame structure 121 or the inner door 111 and outer door 112. However, if the insertion pins 21111 are inserted into the first and second insertion portions 1111 and 1112, respectively, and at least a part of the grip portion 211 of the puller 21 is raised, the first and second insertion portions 1111 and 1112 of the holding bars 119 may be configured to move in the longitudinal and/or widthwise directions along the slanted surfaces of the outer alignment units 21112. Thus, the one or more misaligned racks 9 may be moved and/or realigned towards the center of the holding bars 119. Therefore, the four insertion pins 21111 may uniformly support the first and second insertion portions 1111 and 1112 (i.e., the four insertion pins 21111 may have the same contact area with the first and second insertion portions 1111 and 1112). Thus, the puller 21 may be configured to stably grip the one or more misaligned racks 9.

Further referring to FIGS. 9A-9C, the recessed grooves provided on a portion of the first and second insertion portions 1111 and 1112 may each have a triangular cross-sectional shape that decreases in width along the Z-direction. For example, the depressed grooves may each have a triangular cross-section with one or more slanted sides converging at an uppermost position of the recessed grooves. The first and second insertion portions 1111 and 1112 may be an indentation into a lower surface of the holding bar 119 towards an upper surface of the holding bar 119. As illustrated in FIG. 9C, in some cases, the first and second insertion portions 1111 and 1112 may include a middle bent portion that may be formed by bending down one or more ends of a plate member that forms the holding bar 119.

As described above, the one or more racks 9 may be shaken within the cryogenic tank such that the racks 9 deviating from an aligned state may need to be realigned within the cryogenic tank. When the insertion pins 21111 are inserted into the first and second insertion portions 1111 and 1112 of the holding bars 119 of one or more misaligned racks 9, the first and second insertion portions 1111 and 1112 and the insertion pins 21111 may deviate towards the widthwise direction and/or the longitudinal direction of the holding bars 119. If the insertion pins 21111 are inserted into the first and second insertion portions 1111 and 1112, respectively, and at least a part of the grip portion 211 of the puller 21 is raised, the insertion pins 21111 may slide along the one or more slanted surfaces of the recessed grooves of the holding bars 119, and the insertion pins 21111 may be repositioned at an uppermost position of the recessed grooves of the holding bars 119. Therefore, the four insertion pins 21111 may be positioned at an uppermost position of each of the slanted surfaces of the first and second insertion portions 1111 and 1112, and the one or more misaligned racks 9 may be realigned in the widthwise direction and/or longitudinal direction of the holding bars 119 such that the racks 9 are reconfigured in an aligned state. Thus, the puller 21 may be able to stably grip and realign the one or more misaligned racks 9.

Referring to FIGS. 9A-9C, when one of the inner door 111 and/or the outer door 112 is opened, the puller 21 may grip the opened door and place it on the other door. Further, when one of the inner door 111 and/or the outer door 112 is closed, the puller 21 may grip the door placed on the other door and reposition the door to close an inner open region or an outer open region. For example, as shown in FIGS. 9A and 9C, the inner door 111 may be placed on the outer door 112. A conventional system may comprise a single door and may include a component for opening the single door that is separate and distinct from another component configured to insert and/or withdraw a rack into or out of a cryogenic tank. Therefore, when the door is opened, the component configured to insert and/or withdraw the rack may need to be moved away from an upper part of the cryogenic tank and towards the outside to minimize interference by the component configured to insert and/or withdraw the rack, thereby increasing a movement line and/or a movement distance of the robot apparatus. However, the puller 21 of the present cryogenic storage system may be configured to grip the inner door 111 or the outer door 112 and place it on the adjacent door 112 or 111 before withdrawing the rack 9. Therefore, a movement line and/or a movement distance of the puller 21 may be minimized. Accordingly, a movement line and/or a movement distance of the robot apparatus may be reduced as compared with a conventional system, and the robot apparatus may be configured to minimize installation area. Further, the present cryogenic system may be configured such that the puller 21 itself need not be positioned away from an upper part of the cryogenic tank towards the outside when withdrawing the rack 9; therefore, the line of movement of the puller 21 may be minimized, and the footprint of the apparatus may likewise be minimized.

FIG. 9B illustrates an alternative scenario in which the outer door 112 may be placed on the inner door 111. By way of illustration, it is shown in FIG. 9B that the outer door 112 may be placed on the inner door 111. When a rack from the first group of racks 9a is positioned beneath the inner door 111, the puller 21 may be configured to grasp the inner door 111 and place the inner door on the outer door to open the inner open area 111a. The puller may be configured to grip one or more racks in the first group of racks 9a positioned under the open area 111a and to draw out the racks through the inner open area 111a. When the operation to withdraw the first group of racks 9a is complete, the puller 21 may be configured to draw in the first group of racks 9a through the inner open area 111a and to close the inner open area using the inner door 111 which was previously placed on top of the outer door 112. Thereafter, when the second group of racks 9b is rotated into a position below the outer door 112 by the rotation of the frame structure 121, the puller 21 may be configured to grasp the outer door 112 and place the outer door 112 on top of the inner door 111 to expose the open area 112a. The puller 21 may be configured to grip one or more racks in the second group of racks 9b positioned underneath the open area 112a and to draw out the racks through the open area 112a. When the operation to withdraw the second group of racks 9b is complete, the puller may be configured to draw in the racks 9b of the second group through the outer open area 112a and to close the outer open area using the outer door 112 which was previously placed on top of the inner door 111.

The inner door and the outer door may have one or more recessed portions that correspond to the shape and/or size of the holding bars 119 which are located on an upper surface of the inner door and the outer door. The one or more recessed portions may be recessed upwards into a lower surface of the inner door 111 and/or outer door 112, and may be configured such that a holding bar 119 may be inserted into the recessed portions to position and secure the inner door 111 on top of the outer door 112, or vice versa. Accordingly, when the puller 21 grasps one of the inner door 111 or the outer door 112 and either (i) places the inner door 111 on top of the outer door 112 or (ii) places the outer door 112 on top of the inner door 111, the mounting bar 119 of either the inner door 111 or the outer door 112 may be inserted into the corresponding recessed portion, which recessed portion is located on a lower surface of the inner or outer door. Thus, the inner door 111 may be positioned on top of the outer door 112, or the outer door 112 may be positioned on top of the inner door 111. The inner door 111 and/or the outer door 112 may have a predetermined thickness.

Referring to FIGS. 10A-10C and FIGS. 11A-11B, the robot apparatus 2 may comprise a pusher 23 that is configured to push a box to extend at least a portion of the box 91 from a loaded rack outside of the housing 22. Moreover, referring to FIGS. 2A-2C, the robot apparatus 2 may comprise a box door 24 that is provided on the housing 22 to allow at least the part of the box 91 pushed by the pusher 23 to extend out of the housing 22. In some cases, the robot apparatus may comprise two box doors 24. A first box 91 in a rack 9 that is withdrawn through the inner door 111 may come in and out through one of the two box doors 24, and a second box 91 in a rack 9 withdrawn through the outer door 112 may come in and out through the other box door 24. Accordingly, when the box 91 is pushed by the pusher 23, the pushed box may exert an external force on the box door 24 in a direction towards the outside of the housing 22, and the box door 24 may be pushed and opened by the pushed box 91. An upper end of each of the two box doors 24 may be hinge-connected to the housing 22.

In some cases, the robot apparatus may comprise a plurality of box doors. The plurality of box doors may comprise an inner box door, an outer box door, and a plurality of intermediate box doors. Each of the plurality of box doors may correspond to a group of racks of the multiple groups of racks. Each of the plurality of box doors may be configured such that a box from a corresponding group of racks may be pushed through a corresponding box door.

In some cases, an operator may not be present or able to receive a box that is positioned for removal from the cryogenic tank through the box door. In such cases, the box positioned for removal from the cryogenic tank may not be pushed by the pusher, and the box may not exert an external force on the box door to open the box door. Instead, the box door may be opened manually by the operator once the operator is present or able to receive the box positioned for removal from the cryogenic tank.

Further, the puller 21 may be configured to withdraw a rack 9 from the cryogenic tank to a predetermined height corresponding to a level at which one or more boxes 91 are stored within the rack. For example, the boxes 91 may be arranged at one or more predetermined heights corresponding to one or more levels within the rack 9. If the box 91 to be withdrawn is located on an nth level of the rack 9, the puller 21 may be configured to withdraw the rack 9 to a predetermined height in order to position the box 91 on the nth level of the rack 9 at a height that allows the pusher 23 to push the box 91. The puller 21 and the pusher 23 may be controlled by a controller, a processor, and/or a control device included in or operatively connected to the present cryogenic storage system.

Referring to FIGS. 10A-10C and FIGS. 11A-11B, the pusher 23 may be configured to push a box 91 of a rack 9 withdrawn through the inner door 111 and/or a box 91 of a rack 9 withdrawn through the outer door 112. Moreover, the pusher 23 may comprise multiple contact units 231 that may be configured to contact the box 91 such that the pusher 23 has multiple contact points with the box 91. For example, referring to FIGS. 10A-10C, the pusher 23 may comprise two contact units 231. Therefore, when the pusher 23 pushes the box 91, the pusher 23 may be configured to directly apply an external force on two points of the box 91. In some cases, the pusher 23 may have one contact point with the box 91. In such cases, the box 91 may lose its balance and may be rotated unless the pusher 23 pushes the box 91 while being in accurate contact with the center of the box 91. This may happen when the box 91 is larger than the pusher 23. In other cases, the pusher 23 may have one or more contact points with the box 91 and may be configured to apply an external force to the box 91 at the one or more contact points. Therefore, the box 91 may be pushed without being rotated, regardless of the size of the box 91.

Further, for example, the pusher 23 may be configured to move in a direction parallel to the X-axis and parallel to a rear side of the inner door 111 and the outer door 112 (i.e., a side of the inner door 111 and the outer door 112 that is disposed furthest along the Y-direction as shown in FIGS. 6A-6C). The pusher 23 may also be configured to push a box 91 within a rack 9 in the negative Y-direction (i.e., from a rear side of the inner door 111 and/or the outer door 112 to a front side of the inner door 111 and/or the outer door 112). The robot apparatus 2 of the present cryogenic storage system may further include moving members, such as a driving unit (motor) and a guide, configured to move the pusher 23 in the X-axis and Y-axis directions and to move the puller 21 in the X-axis and Z-axis directions. According to an embodiment of the present disclosure, the pusher 23 and either the inner door 111 or the outer door 112 may be arranged along a direction parallel to the Y-axis. Further, the puller 21 and either the inner door 111 or the outer door 112 may be arranged along a direction parallel to the Z-axis. In any of the embodiments described herein, the inner door 111, the outer door 112, the puller 21, and the pusher 23 may be placed at and/or movable to one or more locations that do not interfere with the R-axis driving apparatus including the rotational shaft 13 and the driving apparatus that rotates the rotational shaft 13.

Further, when a rack 9 is withdrawn, the pusher 23 may be configured to push a part of the box 91 to extend out of the housing 22. For example, the pusher 23 may be configured to push the box 91 such that about half (e.g., about 50%) of the box 91 may extend outside of the housing 22. If the pusher 23 pushes the box 91 as such, a user may withdraw the box 91 from the housing 22. Furthermore, when a box 91 partially pushed by the pusher 23 is eliminated from the rack 9, the puller 21 may be configured to move the rack 9 withdrawn from the cryogenic tank 1 in a downward direction parallel to the Z-axis to be reinserted into the cryogenic tank 1. If the box 91 is eliminated naturally by the user, the puller 21 may be configured to immediately insert the rack 9 back into the cryogenic tank 1 without waiting for the eliminated box 91 to be reinserted. Then, if the user inputs a command to insert the box 91, the puller 21 may be configured to withdraw the rack 9 and lift the rack 9 to a predetermined height to allow the box 91 to be inserted into the rack 9.

Furthermore, according to an embodiment of the present disclosure, if the partially pushed box 91 is not eliminated from the rack 9 within a predetermined period of time (e.g., 10 seconds), the pusher 23 may be configured to further push the partially pushed box 91 in the Y-direction to be forcibly eliminated from the rack 9. Moreover, if the box 91 is forcibly eliminated, the puller 21 may be configured to move the withdrawn rack 9 in the downward direction parallel to the Z-axis to be reinserted into the cryogenic tank 1. The box 91 partially pushed by the pusher 23 may not be eliminated from the rack 9 within the predetermined period of time if the pushed box 91 is not immediately withdrawn due to the absence of a worker or the like. In such cases, the other boxes 91 mounted on the rack 9 may be exposed to external air for a long time, which may cause degradation of the biological samples. Therefore, according to an embodiment of the present disclosure, the pusher 23 may be configured to forcibly push a partially pushed box 91 in the Y-direction to be forcibly eliminated from the rack 9. Thereafter, the puller 21 may be configured to reinsert the rack 9 into the cryogenic tank 1 to protect the other boxes 91.

When the puller 21 withdraws the rack 9, the pusher 23 may be configured to exert a primary push to push a part of the box 91 from the rack 9 to extend outside of the housing 22, in which case the user may withdraw and eliminate the partially exposed box 91 from the rack 9 through the box door 24 by natural elimination. When the box 91 is eliminated, the puller 21 may be configured to reinsert the rack 9 into the cryogenic tank 1. Further, if the box 91 is not eliminated from the rack 9 through the box door 24 after the primary push, the pusher 23 may be configured to push the box 91 to be forcibly eliminated from the rack 9 through the box door 24 and to discharge the box 91 to the outside of the housing 22. Thereafter, the puller 21 may be configured to reinsert the rack 9 into the cryogenic tank 1.

If the rack 9 is withdrawn and exposed to the outside of the cryogenic tank 1 for a long time, the sample may be damaged due to ambient temperatures that are higher than an internal temperature of the cryogenic tank 1. However, according to the present cryogenic storage systems disclosed herein, if the box 91 is not eliminated from the rack 9 within the predetermined period of time, the box 91 may be forcibly eliminated. Therefore, it may be possible to reduce a length of exposure of the rack 9 to an outside environment external to the cryogenic tank 1 and to secure the stability of the biological samples.

Further, an edge frame surrounding the sides of the inner door 111 and the outer door 112 may be provided within the housing 22. A pusher through groove through which the pusher 23 can be inserted into the edge frame may be formed within the edge frame. Accordingly, the pusher 23 may be configured to push the box 91 of the rack 9, which box 91 may be inserted into the edge frame through the pusher through groove of the edge frame and may be subsequently withdrawn through the inner door 111 or the outer door 112.

Figure 10A:
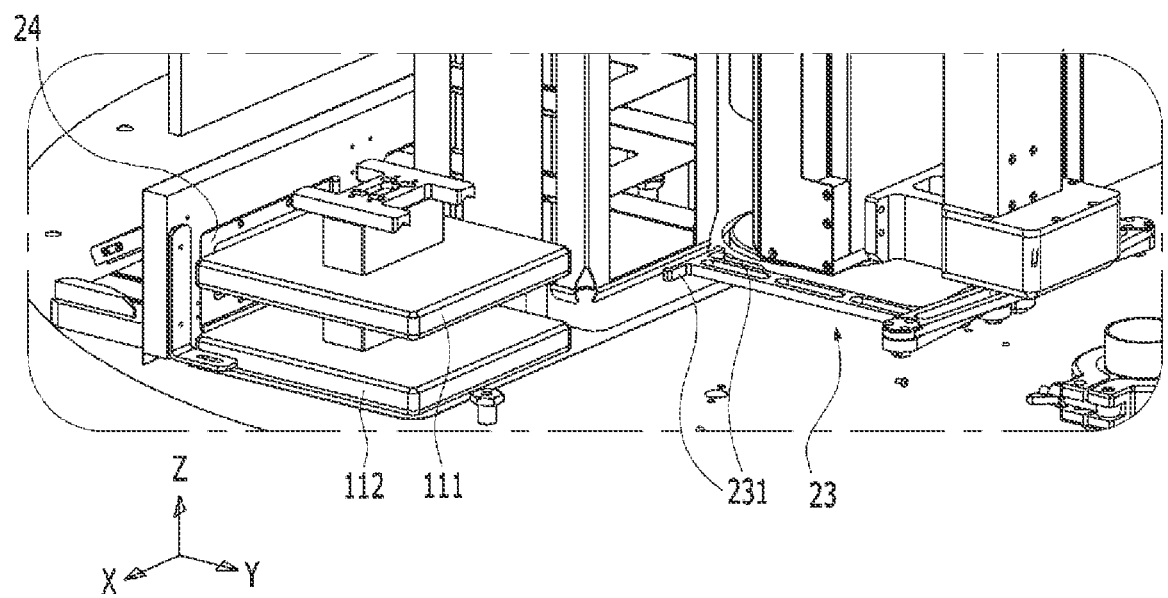
FIG. 10A is a schematic conceptual diagram showing the inside of a partially cut-open robot apparatus, in accordance with some embodiments.
Figure 10B:
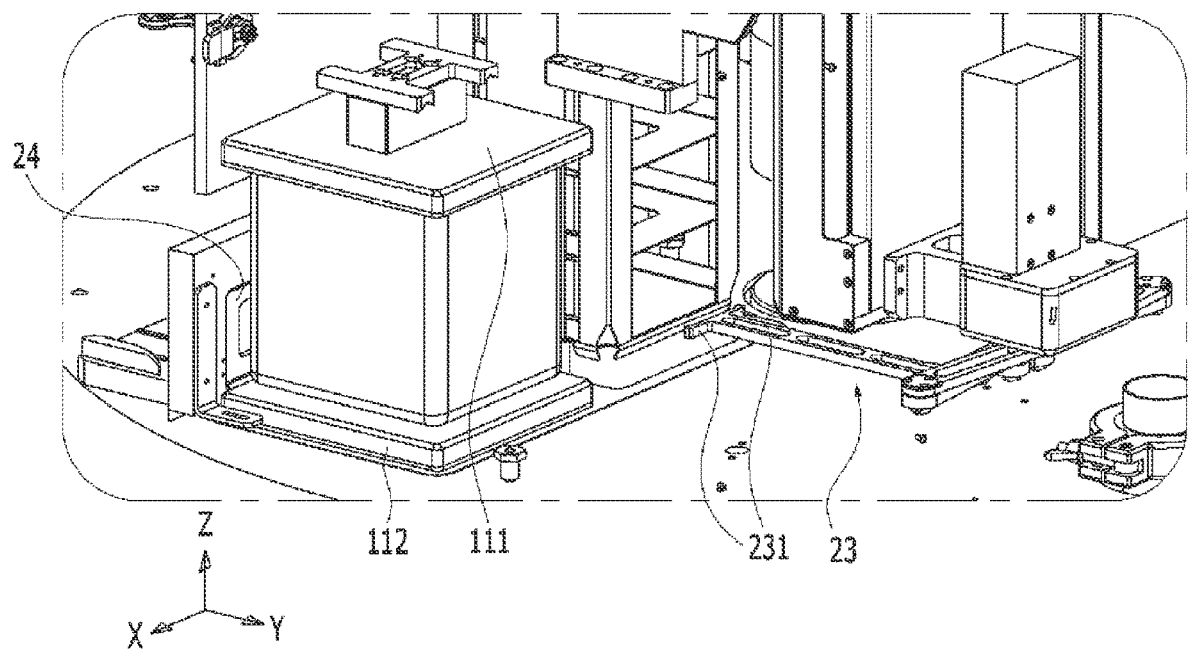
FIG. 10B illustrates a portion of a robot apparatus and a pushing unit of the cryogenic storage system, in accordance with some embodiments.

Referring to FIG. 10A, the edge frame may include an edge frame groove greater in size (e.g., in width, height, length, and/or area) than the pusher through groove. The edge frame may include a plate that covers the edge frame groove. The pusher through groove may be formed on a surface of the plate. The pusher 23 may be configured with a different size depending on the size of the box 91. The size of the pusher through groove through which the pusher 23 passes through may be adjusted depending on the size of the pusher 23. For example, the width, height, length, and/or surface area of the pusher 23 may be increased, in which case the dimensions of the pusher through groove may be increased accordingly. In such cases, the existing plate may be removed from the edge frame and interchanged with a plate having a pusher through groove that is larger than the pusher through groove of the existing plate. In such cases, the plate having a larger pusher through groove may be fixed to the edge frame. Thus, the pusher through groove may be enlarged to allow a pusher 23 having an increased size to pass through the pusher through groove. The edge frame groove may be larger than the pusher through groove through which the pusher 23 may pass through.

Figure 10C:
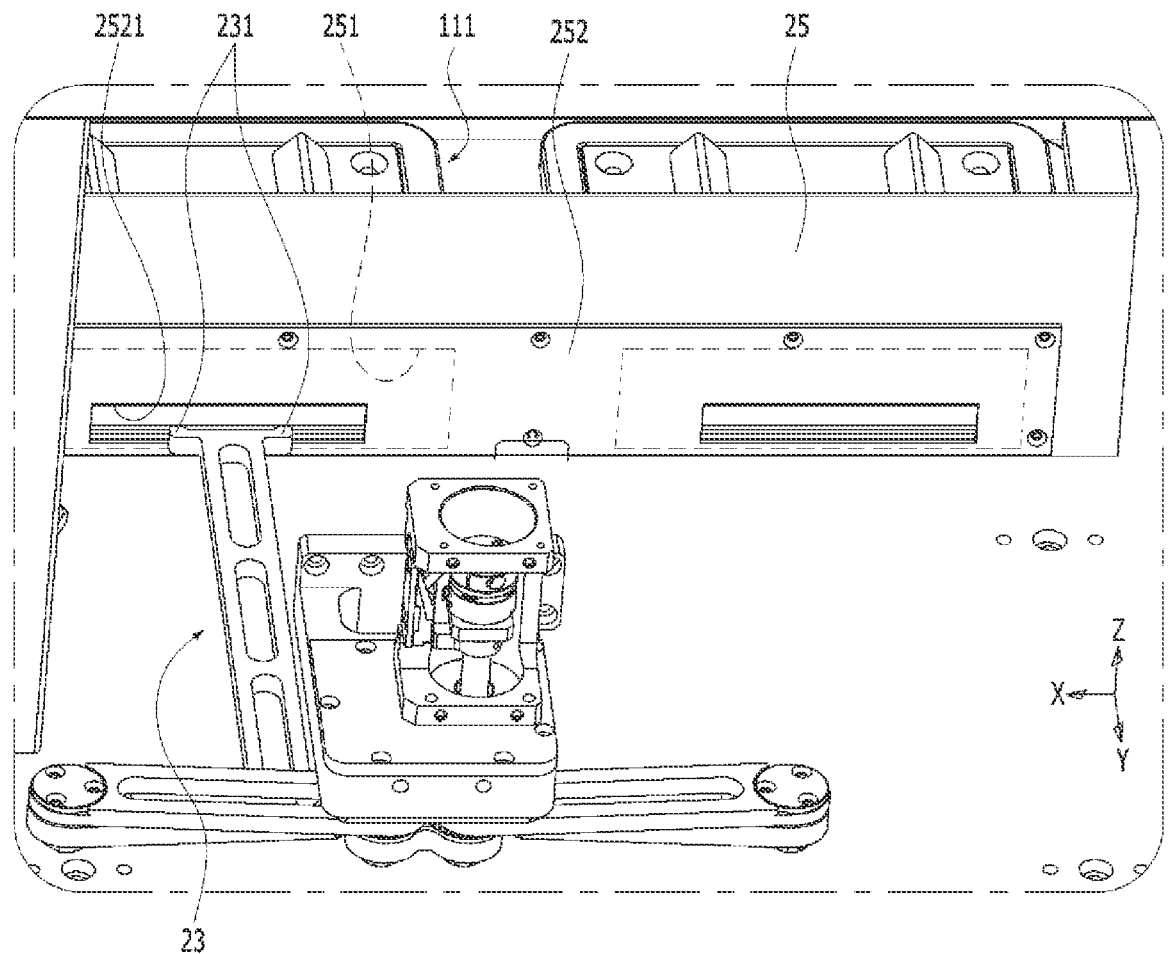
FIG. 10C illustrates a pushing unit of the cryogenic storage system, in accordance with some embodiments.
Figure 11A:
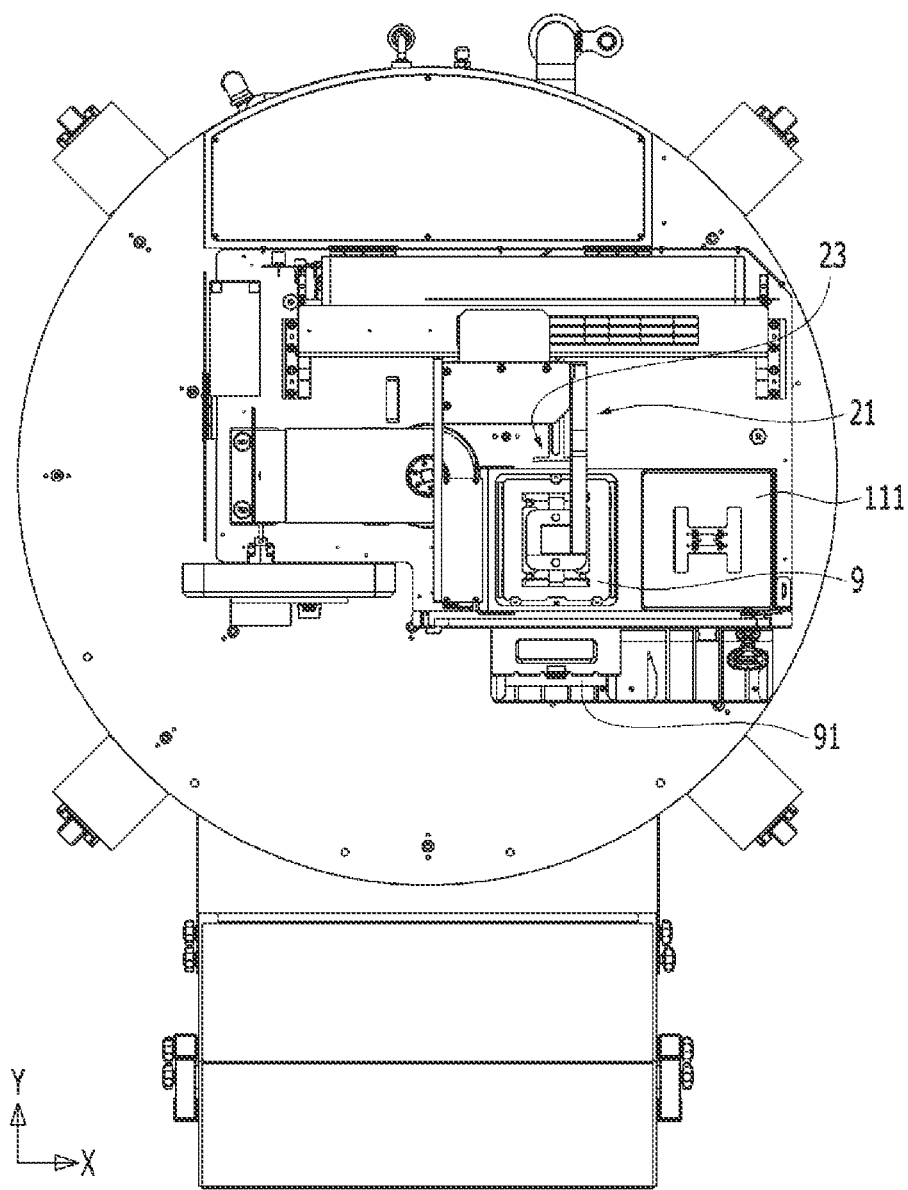
FIG. 11A is a top view illustrating the inside of a robot apparatus of a cryogenic storage system, in accordance with some embodiments.
Figure 11B:
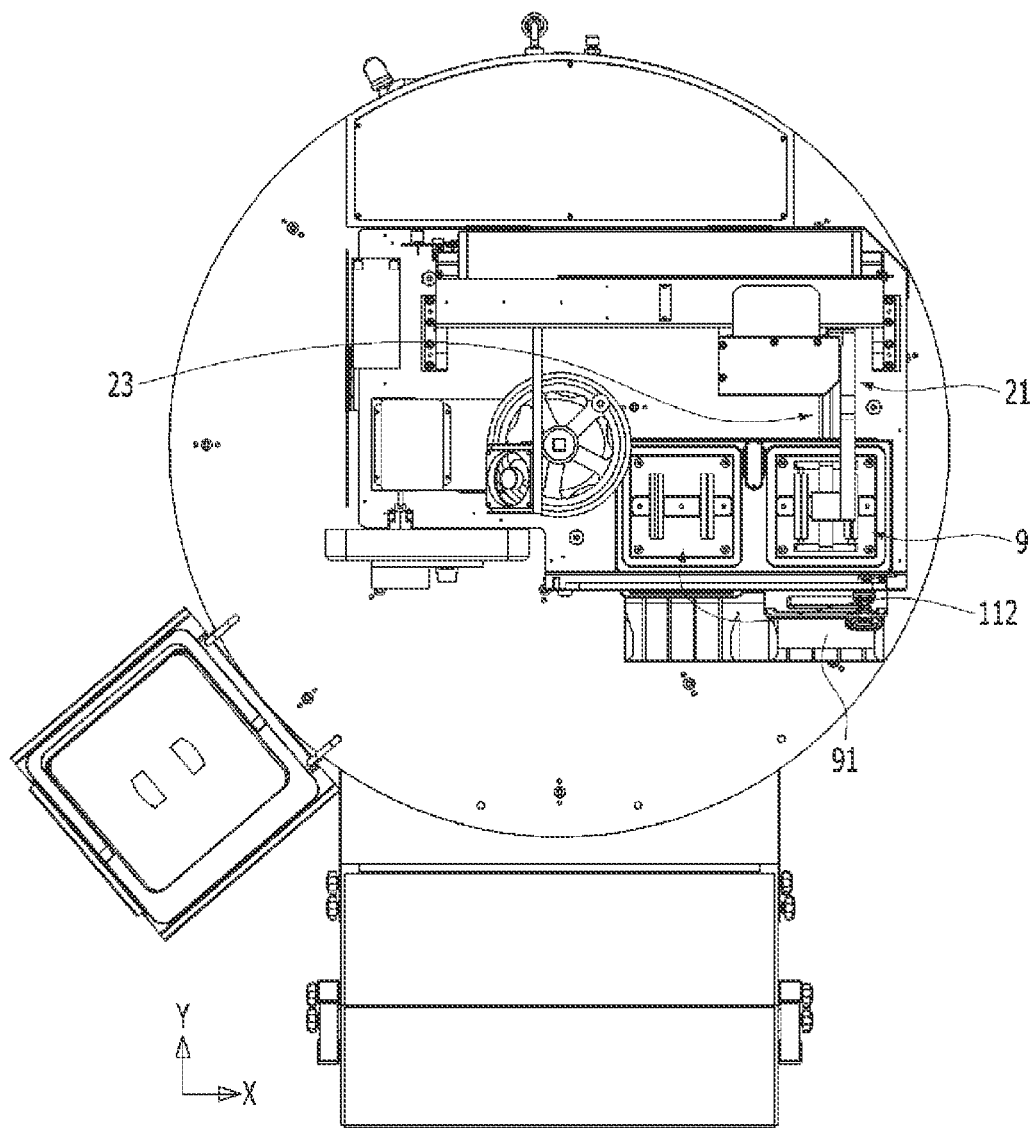
FIG. 11B is a top view of an inner portion of a robot apparatus of a cryogenic storage system, in accordance with some embodiments.

Referring to FIG. 10C, the housing 22 of the robot apparatus may comprise an edge frame 25 surrounding the side surfaces of an inner frame of the inner door 111 and an outer frame of the outer door 112. In addition, the edge frame 25 may comprise a pushing unit through-groove 2521 through which the pushing unit 23 may be inserted. Accordingly, the pushing unit 23 may be inserted into the edge frame 25 through the pushing unit through-groove 2521 of the frame 25 and may be configured to push the box 91 of the rack 9 through the inner door 111 or the outer door 112.

As illustrated in FIG. 10C, the frame 25 may comprise an edge frame groove 251 having larger dimensions (e.g., a larger length, width, height, and/or area) than the pushing unit through-groove 2521. The edge frame 25 may comprise a plate 252 covering the edge frame groove 251. The pushing unit through-groove 2521 may be provided on a face of the plate 252. Depending on the size of the box 91, the size of the pushing unit 23 may be increased or decreased. Further, depending on the size of the pusher 23, the size of the pushing unit through-groove 2521 through which the pusher 23 passes may be adjusted accordingly to accommodate the dimensions of the pusher 23. For example, it may be necessary for the size of the pushing unit 23 to be enlarged and for the pushing unit through-groove 2521 to be expanded. In such case, the existing plate 252 may be removed from the frame 25 and may be replaced with another plate with a pushing unit through-groove 2521 that is larger in size than that of the pushing unit through-groove 2521 of the plate 252 previously provided. The pushing unit through-groove 2521 may be enlarged such that a pusher 23 with larger dimensions can easily pass through the pushing unit through-groove 2521. For reference, it is preferable for the size of the edge frame groove 251 to be larger than the size of the pushing unit through-groove 2521 through which a pusher 23 with larger dimensions can pass.

Furthermore, the robot apparatus 2 may include a box door sensor that is configured to obtain opening information associated with the box door 24. According to an embodiment of the present disclosure, whether or not the time to remove the box exceeds the predetermined period of time may be determined based on the opening information. The opening information may comprise information on how long a box door 24 has been opened. For example, the box door sensor may calculate an open time of the box door 24. An open state of the box door 24 may refer to a state where the box door 24 is pushed and at least a part of the box 91 protrudes out of the housing 22. Therefore, a period of time in which the box 91 is not eliminated from the withdrawn rack 9 may be calculated based on the open time of the box door 24. Thus, it may be possible to determine whether or not the period of time during which the pushed box 91 is not eliminated from the rack 9 exceeds the predetermined period of time.

In some cases, the box door sensor may be configured to (i) obtain opening information associated with the box door, and (ii) provide the opening information to a processor of the cryogenic storage system. The processor may be configured to determine, based on the opening information, (a) whether or not a time to remove the box exceeds a predetermined period of time, (b) whether or not an operator is present to receive the box, and (c) whether or not to extend the pusher to remove the box from the rack. The processor may be configured to determine whether or not to extend the pusher to remove the box from the rack, in part based on a determination of whether or not an operator is present to receive the box.

Moreover, according to an embodiment of the present disclosure, the robot apparatus 2 may include a push sensing unit that is configured to obtain push information associated with the pusher 23. Push information may comprise information on the degree of insertion of the box 91 into the rack (i.e., how much of the box remains inside the rack). The pusher 23 may be configured to move towards the inner and/or outer doors 111 and 112 to push the box 91. Alternatively, the pusher 23 may be configured to move in a direction away from the inner and/or outer doors 111 and 112. During this process, whether or not the box 91 is eliminated from the rack 9, how much of the box 91 extends outside of the housing 22, whether or not the box 91 is inserted into the rack 9, and how much the box 91 is inserted into the rack 9, may be determined depending on the position of the pusher 23 and/or the degree of protrusion of the pusher 23. Further, secondary information may be obtained based on the push information. For example, when a user inserts the box 91 into the rack 9, the degree of insertion of the box 91 into the rack 9 may be calculated, and, thus, whether or not the box 91 is fully inserted into the rack 9 can be determined. In this case, if the box 91 is determined to have been fully inserted into the rack 9, the rack 9 can be inserted again into the cryogenic tank and the thermal insulation of the system can be improved. For example, the push sensing unit may sense the degree of forward or backward movement of the pusher 23 and may include a torque sensor of the motor that drives the pusher 23. As such, according to an embodiment of the present disclosure, the position of the pusher 23 may be determined based on the amount of torque output by the driving unit that is driving the pusher 23, without using a separate sensor for sensing a contact state between the pusher 23 and the box 91. Thus, it may be possible to reduce the cost and complexity of the cryogenic storage systems disclosed herein.

Figure 12:
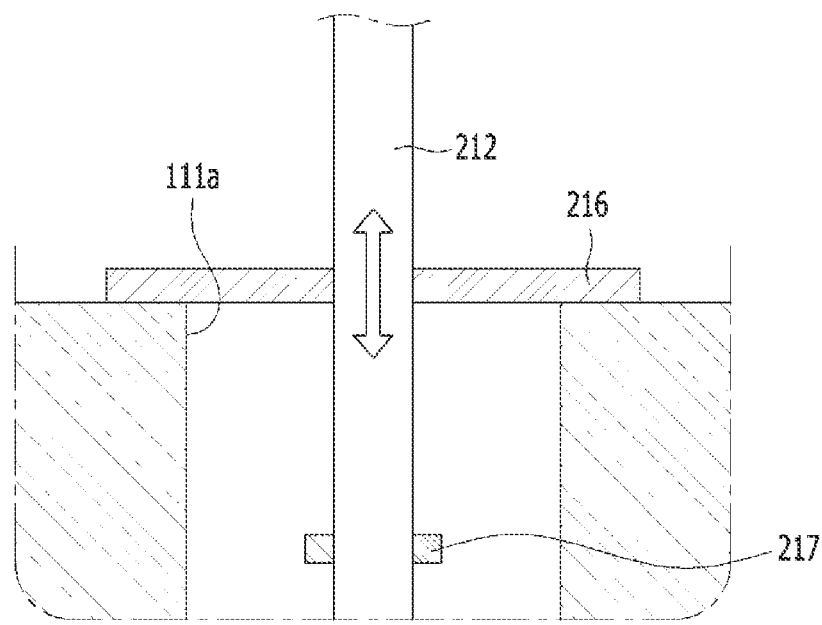
FIG. 12 is a schematic conceptual diagram provided to explain a temporary door of a cryogenic storage system, in accordance with some embodiments.
Figure 12:
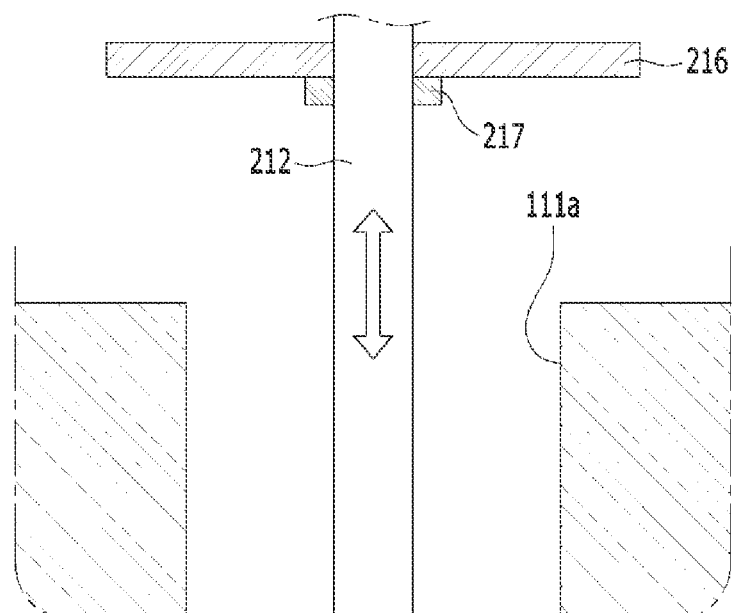

Referring to FIG. 12, the puller 21 may include a temporary door 216 provided adjacent to the moving bar 212 and above the grip portion 211. The temporary door 216 may be provided around the moving bar 212. The temporary door 216 may be movable in upward and downward directions relative to the moving bar 212. Further, when any one of the inner door 111 or the outer door 112 is opened and the grip portion 211 is inserted into the corresponding open regions 111a or 112a, the temporary door 216 may be configured to temporarily close the open regions 111a or 112a. The temporary door 216 may be positioned around the moving bar 212 and above the grip portion 211. As such, when the grip portion 211 is moved in a downward direction and inserted into the open region 111a or 112a, the temporary door 216 may be positioned adjacent to a surface of the lid 11 and/or mounted on an edge of the inner open region 111a or the outer open region 112a, thereby closing the open region 111a or 112a through which the grip portion 211 is inserted. Therefore, it may be possible to reduce the amount of gas discharged from the cryogenic tank through the open region 111a or 112a, thereby minimizing an increase in temperature of the biological samples contained in one or more boxes and/or one or more racks. In some cases, the temporary door 216 may be configured to temporarily close one or more open regions (e.g., an inner open region 111a, an outer open region 112a, and/or an intermediate open region of the plurality of open regions), thereby reducing the amount of gas discharged from the cryogenic tank through the one or more open regions of the plurality of open regions.

Furthermore, referring to FIG. 12, the temporary door 216 may be provided on the moving bar 212 with one or more degrees of freedom in upward and downward movements. Also, a guide unit 217 configured to guide an upward movement of the temporary door 216 may be provided on a level between the temporary door 216 of the moving bar 212 and the grip portion 211. The guide unit 217 may be provided and fixed at a predetermined location on the moving bar 212.

If the grip portion 211 is moved in an upward direction parallel to the Z-axis to be withdrawn from the cryogenic tank 1 (through the open region 111a or 112a), the temporary door 216 may be supported by the guide unit 217 and moved in the upward direction in line with the moving bar 212.

Further, according to an embodiment of the present disclosure, when the temporary door 216 is used to close the open region for a time period that exceeds a predetermined period of time, the puller 21 may be configured to close the open region 111a or 112a with the inner door 111 or the outer door 112.

For example, in a state where the grip portion 211 is inserted into the open region 111a formed by opening the inner door 111, if a command to perform a subsequent operation is not received and the open region 111a remains covered by the temporary door 216 for a certain period of time that exceeds a predetermined period of time, the puller 21 may be configured to withdraw from the open region 111a and to close the open region 111a with the inner door 111. Likewise, in a state where the grip portion 211 is inserted into the open region 112a formed by opening the outer door 112, if a command to perform a subsequent operation is not entered and the open region 112a remains covered by the temporary door 216 for a certain period of time that exceeds the predetermined period of time, the puller 21 may be configured to withdraw from the open region 112a and to close the open region 112a with the outer door 112. If the open region 111a or 112a is closed by the temporary door 216 and remains closed for a predetermined period of time, the present cryogenic storage system may close the open regions 111a and 112a with the inner door 111 and the outer door 112 to minimize temperature changes within the cryogenic tank.

Further, the housing 22 may include a separate door for emergency cases where the robot apparatus does not operate. The user may access the inside of the housing 22 through the separate door and manually perform an operation of withdrawing the rack 9, an operation of inserting the rack 9, and/or an operation of opening or closing the inner open region or outer open region with the inner door 111 or outer door 112.

One or more objects or biological samples may be accommodated in respective sample containers. Sample containers may include, for example, well microplates, cassettes, labware, glassware (e.g., bottles, beakers, slides, dishes, flasks, vials, and/or tubes), and/or any storage device configured to hold an object or a sample. The box 91 may be configured to (i) receive one or more sample containers and (ii) arrange the one or more sample containers for cryogenic storage. The box 91 may be barcoded and placed on an nth level of a rack 9. If the user inputs information relevant to (i) one or more specific boxes desired by the user or (ii) one or more samples accommodated in a box 91 desired by the user, the multiple racks 9 (i.e., the first group of racks 9a and the second group of racks 9b) may be rotated within the cryogenic tank such that the rack 9 accommodating the box 91 desired by the user is repositioned to a location corresponding to one of the inner door 111 or the outer door 112. If the box 91 desired by the user is included in the first group 9a, when the multiple racks 9 are rotated, any one rack 9 including the box 91 desired by the user may be located corresponding to (i.e., underneath or facing) the inner door 111. If the box 91 desired by the user is included in the second group 9b, any one rack 9 including the box 91 desired by the user may be located corresponding to the outer door 112. The puller 21 may be configured to grip the door corresponding to the rack 9 that includes the box 91 desired by the user and to lift the door up to place it on the other door. Thus, the puller 21 may be configured to open the door corresponding to the rack 9 that includes the box 91 desired by the user, and to withdraw the rack 9 that includes the box 91 desired by the user through the open region 111a or 112a formed when the door is opened. In some cases, the puller 21 may be configured to withdraw and lift the rack 9 at an appropriate height for the pusher 23 to push the box 91 desired by the user, which appropriate height is determined based on the height and/or level at which the box 91 desired by the user is located within the rack 9. Thus, the pusher 23 may be positioned at a height that allows the pusher 23 to push the box 91.

In such case, the pusher 23 may be configured to push the box 91 to expose (i.e., extend) a part of the box 91 to the outside of the housing 22, thereby allowing a user to withdraw (e.g., pull) the desired box 91 and eliminate the box 91 from the rack 9. If the box 91 is not eliminated within a predetermined period of time, the pusher 23 may be configured to push the box 91 to eliminate the box 91 from the rack 9 in order to protect samples in the other boxes 91 of the withdrawn rack 9. Thus, the box 91 may be eliminated from the rack 9 and the puller 21 may be configured to reinsert the rack 9 into the cryogenic tank 1.

The present cryogenic storage system described above may be in communication with an external management computer and may comprise a touch screen and a barcode reader. The touch screen and the barcode reader may be in communication with a user input device such as a computer or mobile device. Further, according to the present cryogenic storage system, the touch screen may be configured to allow a user to monitor the temperature within the cryogenic tank 1 and to control the supply of liquid nitrogen to maintain the temperature. Furthermore, the present cryogenic storage system may be configured to record and manage inventory information of those samples stored within. The present cryogenic storage system may also comprise a processor configured to process information gathered by one or more sensors (e.g., a box door sensor). The processor may be integrated with the cryogenic storage system or located remote to the cryogenic storage system.

In any of the embodiments described herein, the cryogenic storage system may comprise a robot apparatus. The robot apparatus may comprise a puller configured to withdraw a rack from the cryogenic tank or insert a rack into the cryogenic tank. The puller may comprise (a) a grip portion configured to grip one of the inner door, the outer door, a first rack of the first group of racks, or a second rack of the second group of racks, and (b) a moving bar that is configured to extend upward from the grip portion and move in an upward direction, a downward direction, and in a direction parallel to the inner door and the outer door. The puller may be configured to grip one of the inner door or the outer door and (i) place the inner door on the outer door, thereby exposing an inner open region, or (ii) place the outer door on the inner door, thereby exposing an outer open region.

In any of the embodiments described herein, the robot apparatus may further comprise a housing, a pusher configured to push a box to extend at least a portion of the box out of the housing when the rack is withdrawn from the cryogenic tank, and a box door that is provided on the housing. The box door may be configured to allow at least the portion of the box to pass through the box door when the box is pushed by the pusher, such that the portion of the box is exposed to the outside of the housing. The box door may comprise (i) an inner box door configured such that a box within a rack from the first group of racks passes through the inner box door when pushed by the pusher and (ii) an outer box door configured such that a box within a rack from the second group of racks passes through the outer box door when pushed by the pusher. In some cases, the robot apparatus may comprise a plurality of box doors comprising the inner box door, the outer box door, and a plurality of intermediate box doors. Each of the plurality of box doors may correspond to a group of racks of the multiple groups of racks. Each of the plurality of box doors may be configured such that a box, microplate, cassette, or storage device from each corresponding group of racks of the multiple groups of racks may be pushed through a corresponding box door. The plurality of intermediate box doors may comprise n intermediate box doors, where n may be at least about one, two, three, four, five, six, seven, eight, nine, ten, eleven, twelve, thirteen, fourteen, fifteen, sixteen, seventeen, eighteen, nineteen, twenty, thirty, forty, fifty, sixty, seventy, eighty, ninety, one hundred, or more. Each of the plurality of intermediate box doors may correspond to an intermediate rack group of the multiple groups of racks. Each of the plurality of intermediate box doors may be configured such that a box, microplate, cassette, or storage device from each corresponding intermediate rack group of the multiple groups of racks may be pushed through a corresponding intermediate box door.

As described above, the pusher may be configured to push the box such that the portion of the box is exposed to the outside of the housing when the rack is withdrawn from the cryogenic tank. The puller may be configured to move the rack in a downward direction to be inserted into the cryogenic tank when the box is partially pushed by the pusher and eliminated from the rack. In some cases, the pusher may be further configured to push a partially pushed box and forcibly eliminate the partially pushed box from the rack if the partially pushed box is not eliminated from the rack within a predetermined period of time. The puller may be configured to move the rack in the downward direction to insert the rack into the cryogenic tank if the box is forcibly eliminated from the rack.

In any of the embodiments described herein, robot apparatus may further comprise a box door sensor configured to (i) obtain opening information associated with the box door, and (ii) determine, based on the opening information, whether or not the time to remove the box exceeds the predetermined period of time. In some cases, the box door sensor may be configured to (i) obtain opening information associated with the box door, and (ii) provide the opening information to a processor of the cryogenic storage system. The processor may be configured to determine, based on the opening information, (a) whether or not a time to remove the box exceeds a predetermined period of time, (b) whether or not an operator is present to receive the box, and (c) whether or not to extend the pusher to remove the box from the rack. The processor may be configured to determine whether or not to extend the pusher to remove the box from the rack, in part based on a determination of whether or not an operator is present to receive the box. The robot apparatus may further comprise a push sensing unit configured to (i) obtain push information associated with the pusher, and (ii) calculate, based on the push information, the degree of insertion of the box into the rack.

In any of the embodiments described herein, the puller may further comprise a temporary door provided on the moving bar and above the grip portion. The temporary door may be configured to temporarily close the inner open region or the outer open region when any one of the inner door or the outer door is opened. The temporary door may be provided on the moving bar with one or more degrees of freedom in an upward and a downward direction, and a guide unit configured to guide an upward movement of the temporary door may be provided on a level between the temporary door of the moving bar and the grip portion. The guide unit may be provided such that (i) when the grip portion is moved in a downward direction to be inserted into the inner open region or outer open region, the temporary door may be configured to (a) mount on an edge of the inner open region or outer open region and (b) close the inner open region or the outer open region through which the grip portion is inserted. Alternatively, the guide unit may be provided such that (ii) when the grip portion is moved in an upward direction to be withdrawn from the cryogenic tank, (a) the guide unit may be configured to support the temporary door, and the temporary door may be configured to move in the upward direction in line with the moving bar. If a time during which the temporary door closes the inner open region or the outer open region exceeds a predetermined period of time, the puller may be configured to close the inner open region or the outer open region with the inner door or the outer door.

In any of the embodiments described herein, the cryogenic storage system may comprise a cryogenic tank comprising a plurality of inner doors and a plurality of outer doors. The plurality of inner doors may be configured to cover a plurality of inner openings disposed on an upper surface of the cryogenic tank. The plurality of outer doors may be configured to cover a plurality of outer openings disposed on an upper surface of the cryogenic tank. The plurality of inner doors may correspond to one or more openings located closer to the center of the cryogenic tank than one or more openings corresponding to the plurality of outer doors. Each of the plurality of inner doors may be positioned at different radial distances from the center of the cryogenic tank. Each of the plurality of outer doors may be positioned at different radial distances from the center of the cryogenic tank. The plurality of inner doors may be positioned at one or more radial distances that are different than one or more radial distances at which the plurality of outer doors are positioned.

Each of the plurality of inner doors may be positioned around a center of the cryogenic tank at one or more angular distances from a reference radial line extending from a center of the cryogenic tank. For example, a first inner door may be positioned such that a center of the first inner door and a center of the cryogenic tank lie on a first axis that is disposed at a first angle relative to a reference radial line extending from the center of the cryogenic tank. Further, a second inner door may be positioned such that a center of the second inner door and a center of the cryogenic tank lie on a second axis that is disposed at a second angle relative to the reference radial line extending from the center of the cryogenic tank. Each of the plurality of inner doors may or may not have different angular orientations relative to the reference radial line extending from a center of the cryogenic tank. Each of the plurality of inner doors may be positioned around a center of the cryogenic tank at one or more angular intervals relative to one another. The plurality of inner doors may be positioned such that each consecutive rack in the first group of racks is aligned with an inner door when the first group of racks is rotated by a first set of rotational angles. The first set of rotational angles may correspond to one or more angular distances and/or one or more angular intervals between two or more inner doors of the plurality of inner doors.

Each of the plurality of outer doors may be positioned around a center of the cryogenic tank at one or more angular distances from a reference radial line extending from a center of the cryogenic tank. For example, a first outer door may be positioned such that a center of the first outer door and a center of the cryogenic tank lie on a first axis that is disposed at a first angle relative to a reference radial line extending from the center of the cryogenic tank. Further, a second outer door may be positioned such that a center of the second outer door and a center of the cryogenic tank lie on a second axis that is disposed at a second angle relative to the reference radial line extending from the center of the cryogenic tank. Each of the plurality of outer doors may or may not have different angular orientations relative to the reference radial line extending from a center of the cryogenic tank. Each of the plurality of outer doors may be positioned around a center of the cryogenic tank at one or more angular intervals relative to one another. The plurality of outer doors may be positioned such that each consecutive rack in the second group of racks is aligned with an outer door when the second group of racks is rotated by a second set of rotational angles. The second set of rotational angles may correspond to one or more angular distances and/or one or more angular intervals between two or more outer doors of the plurality of outer doors.

In some cases, the cryogenic tank may comprise a plurality of intermediate openings disposed at a plurality of radial distances in between the first radial distance at which the plurality of inner doors are located and the second radial distance at which the plurality of outer doors are located. In such cases, the cryogenic tank may comprise a plurality of intermediate doors located in between the plurality of inner doors and the plurality of outer doors. The plurality of intermediate doors may be configured to cover the plurality of intermediate openings disposed in between the plurality of inner openings and the plurality of outer openings. In some cases, the plurality of intermediate doors may comprise two or more sets of intermediate doors disposed at two or more distinct radial distances from the center of the cryogenic tank.

In any of the embodiments described herein, the cryogenic storage system may comprise a single robot apparatus located adjacent to and/or proximate to the cryogenic tank. Alternatively, in any of the embodiments described herein, the cryogenic storage system may comprise a plurality of robot apparatuses. The plurality of robot apparatuses may be located adjacent to and/or proximate to the cryogenic tank. The plurality of robot apparatuses may be positioned at different radial distances from the center of the cryogenic tank. Each of the plurality of robot apparatuses may be separated from each other by a predetermined distance. The predetermined distance may be less than a diameter of the cryogenic tank. The plurality of robot apparatuses may or may not have different angular orientations relative to a reference radial line extending from a center of the cryogenic tank.

The robot apparatus and/or the plurality of robot apparatuses may be physically and/or operatively coupled to the cryogenic tank. In some cases, the robot apparatus and/or the plurality of robot apparatuses may be integrated with a portion of the cryogenic tank. Alternatively, a portion or a component of the robot apparatus and/or the plurality of robot apparatuses may be integrated in whole or in part with the cryogenic tank. In some cases, the robot apparatus and/or the plurality of robot apparatuses may be configured as one or more stand-alone units that may be physically and/or operatively coupled to the cryogenic tank.

The plurality of robot apparatuses may be configured to open and/or close the plurality of inner doors or the plurality of outer doors. For example, a first robot apparatus may be configured to open the plurality of inner doors and/or the plurality of outer doors, and a second robot apparatus may be configured to close the plurality of inner doors and/or the plurality of outer doors. Alternatively, the first robot apparatus may be configured to open and/or close the plurality of inner doors, and the second robot apparatus may be configured to open and/or close the plurality of outer doors. The plurality of robot apparatuses may be further configured to insert one or more racks into the cryogenic tank and/or withdraw one or more racks from the cryogenic tank through the plurality of inner doors or the plurality of outer doors. For example, the first robot apparatus may be configured to insert one or more racks from the first group of racks and/or one or more racks from the second group of racks into the cryogenic tank, and the second robot apparatus may be configured to withdraw the one or more racks from the first group of racks or the second group of racks from the cryogenic tank. Alternatively, the first robot apparatus may be configured to insert and/or withdraw one or more racks from the first group of racks into or out of the cryogenic tank, and the second robot apparatus may be configured to insert and/or withdraw one or more racks from the second group of racks into or out of the cryogenic tank. The first robot apparatus may be configured to insert and/or withdraw one or more racks from the first group of racks into or out of the cryogenic tank through one or more inner doors of the cryogenic tank. The second robot apparatus may be configured to insert and/or withdraw one or more racks from the second group of racks into or out of the cryogenic tank through one or more outer doors of the cryogenic tank.

In another aspect, the present disclosure provides methods for cryogenic storage. The method may comprise providing a cryogenic tank and a robot apparatus. The robot apparatus may be located adjacent to the cryogenic tank. The multiple racks in the cryogenic tank may be provided as a first group of racks and a second group of racks such that a first rack of the first group of racks may be located at a first radial distance that is less than a second radial distance at which a second rack of the second group of racks may be located. Next, at most one rack of the first group of racks or at most one rack of the second group of racks may be withdrawn or inserted through an inner door or an outer door of the cryogenic tank using the robot apparatus. A center point of the cryogenic tank and a center point of the inner door may lie along a first axis. The center point of the cryogenic tank and a center point of the outer door may lie along a second axis. The first axis and the second axis may not be parallel to each other.

In any of the embodiments described herein, the inner door may be configured to allow access to a first rack included in the first group of racks when the first rack is positioned adjacent to the inner door, and the outer door may be configured to allow access to a second rack included in the second group of racks when the second rack is positioned adjacent to the outer door.

The multiple racks may be rotatable relative to the inner door and the outer door. The cryogenic tank may be configured to hold the multiple racks in a manner such that, for a rotational angle between 0 degrees and 360 degrees, at most a single rack of the multiple racks may be aligned with one of the inner door or the outer door, and at most a single rack of the multiple racks may be removable from the cryogenic tank through the inner door or the outer door.

In some cases, when an individual rack of the first group of racks is oriented at a first angle relative to a center of the cryogenic tank, each individual rack of the second group of racks may be oriented at one or more angles relative to the center of the cryogenic tank, which one or more angles may be different than the first angle.

In any of the embodiments described herein, the robot apparatus may be configured to (i) selectively open and close the inner door or the outer door, and (ii) insert or withdraw the single rack into or out of the cryogenic tank through the inner door or the outer door.

In any of the preceding embodiments, the one or more boxes used to store and/or house a sample (e.g., a biological sample) may be interchanged with any one of a holder, a container, a microplate, a cassette, glassware configured to hold or store an object or sample, labware configured to hold or store an object or sample, and/or any storage device configured to hold or store one or more objects or samples.

Computer systems

Figure 13:
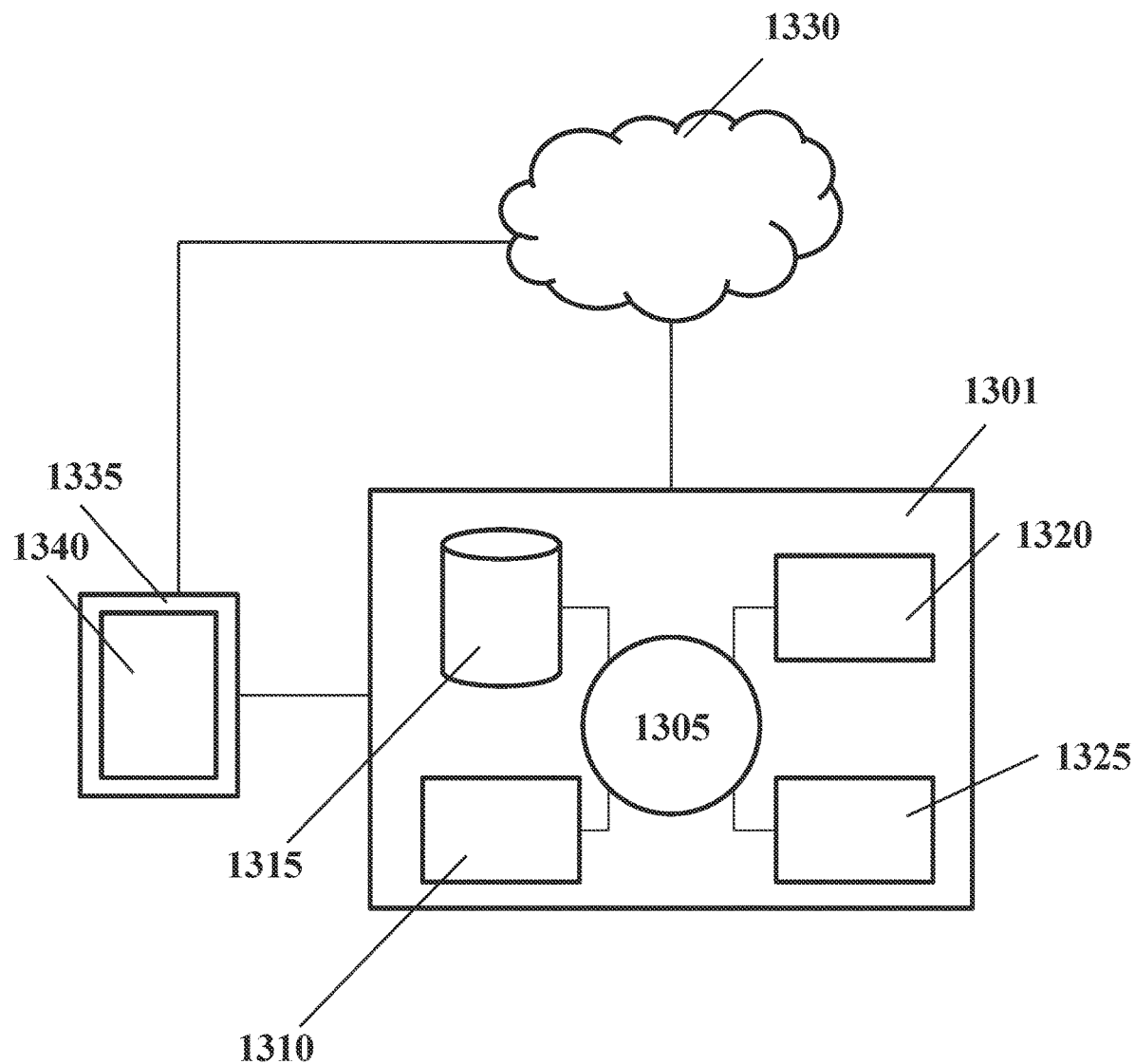
FIG. 13 shows a computer system that is programmed or otherwise configured to implement methods provided herein, in accordance with some embodiments.

The present disclosure further provides computer systems that may be programmed to implement any of methods disclosed herein. FIG. 13 shows a computer system 1301 that may be programmed or otherwise configured to monitor and/or control the internal temperature of the cryogenic storage system, rotate the first group of racks and/or the second group of racks, and operate the robot apparatus for the withdrawal and/or insertion of one or more racks. The computer system 1301 can regulate various aspects of the present disclosure, such as, for example, the rotation of racks and/or the withdrawal and/or insertion of one or more racks containing one or more biological samples desired by a user. The computer system 1301 can be an electronic device of a user or a computer system that is remotely located with respect to the electronic device. The electronic device may be a mobile electronic device.

The computer system 1301 may include a central processing unit (CPU, also "processor" and "computer processor" herein) 1305, which can be a single core or multi core processor, or a plurality of processors for parallel processing. The computer system 1301 may also include memory or memory location 1310 (e.g., random-access memory, read-only memory, flash memory), electronic storage unit 1315 (e.g., hard disk), communication interface 1320 (e.g., network adapter) for communicating with one or more other systems, and peripheral devices 1325, such as cache, other memory, data storage and/or electronic display adapters. The memory 1310, storage unit 1315, interface 1320 and peripheral devices 1325 are in communication with the CPU 1305 through a communication bus (solid lines), such as a motherboard. The storage unit 1315 can be a data storage unit (or data repository) for storing data. The computer system 1301 can be operatively coupled to a computer network ("network") 1330 with the aid of the communication interface 1320. The network 1330 can be the Internet, an internet and/or extranet, or an intranet and/or extranet that is in communication with the Internet. The network 1330 in some cases is a telecommunication and/or data network. The network 1330 can include one or more computer servers, which can enable distributed computing, such as cloud computing. The network 1330, in some cases with the aid of the computer system 1301, can implement a peer-to-peer network, which may enable devices coupled to the computer system 1301 to behave as a client or a server.

The CPU 1305 can execute a sequence of machine-readable instructions, which can be embodied in a program or software. The instructions may be stored in a memory location, such as the memory 1310. The instructions can be directed to the CPU 1305, which can subsequently program or otherwise configure the CPU 1305 to implement methods of the present disclosure. Examples of operations performed by the CPU 1305 can include fetch, decode, execute, and writeback.

The CPU 1305 can be part of a circuit, such as an integrated circuit. One or more other components of the system 1301 can be included in the circuit. In some cases, the circuit is an application specific integrated circuit (ASIC).

The storage unit 1315 can store files, such as drivers, libraries and saved programs. The storage unit 1315 can store user data (e.g., user preferences and user programs), inventory locations, sample storage locations within the cryogenic tank, event logs comprising information on prior events (e.g., rotations of racks, insertion or removal of racks or stored samples, operation of the robot apparatus to insert and/or withdraw samples, operation of the robot apparatus to lift and/or reposition one or more doors of the cryogenic tank, operation of the puller to raise and/or lower a rack, operation of the pusher to eject a storage device positioned on a level of a rack, or measurements taken by a sensor), and/or action logs comprising information on (i) prior actions taken by the user (e.g., insertion and/or removal of one or more samples or storage devices into or out of the cryogenic tank) and/or (ii) commands provided to the cryogenic tank or the robot apparatus (e.g., commands to rotate the racks, commands to insert and/or remove racks, commands to lift and/or reposition one or more doors, commands to raise and/or lower a rack, or commands to eject a storage device). The computer system 1301 in some cases can include one or more additional data storage units that are external to the computer system 1301, such as located on a remote server that is in communication with the computer system 1301 through an intranet or the Internet.

The computer system 1301 can communicate with one or more remote computer systems through the network 1330. For instance, the computer system 1301 can communicate with a remote computer system of a user (e.g., a mobile device). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 1301 via the network 1330.

Methods as described herein can be implemented by way of machine (e.g., computer processor) executable code stored on an electronic storage location of the computer system 1301, such as, for example, on the memory 1310 or electronic storage unit 1315. The machine executable or machine readable code can be provided in the form of software. During use, the code can be executed by the processor 1305. In some cases, the code can be retrieved from the storage unit 1315 and stored on the memory 1310 for ready access by the processor 1305. In some situations, the electronic storage unit 1315 can be precluded, and machine-executable instructions are stored on memory 1310.

The code can be pre-compiled and configured for use with a machine having a processer adapted to execute the code, or can be compiled during runtime. The code can be supplied in a programming language that can be selected to enable the code to execute in a pre-compiled or as-compiled fashion.

Aspects of the systems and methods provided herein, such as the computer system 1301, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 1301 can include or be in communication with an electronic display 1335 that comprises a user interface (UI) 1340 for providing, for example, information relating to the rotational arrangement of the first and second group of racks, the amount of time during which an inner door or an outer door has remained open, a degree of protrusion of a box through a box door, and/or an internal temperature of the cryogenic storage tank. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 1305. The algorithm can, for example, control the degree of rotation of the first group of racks and/or the second group of racks, the movement of the puller during withdrawal and/or insertion of one or more racks, and/or the movement of the pusher to eliminate one or more boxes from a rack. The algorithm may be further configured to control the puller to open and/or close the inner door or the outer door of the cryogenic tank, based on information such as how long the inner door or the outer door have remained open, or how much the internal temperature of the cryogenic tank has changed.

While preferred embodiments of the present disclosure have been shown and described herein, it will be obvious to those skilled in the art that such embodiments are provided by way of example only. It is not intended that the present disclosure be limited by the specific examples provided within the specification. While the present disclosure has been described with reference to the aforementioned specification, the descriptions and illustrations of the embodiments herein are not meant to be construed in a limiting sense. Numerous variations, changes, and substitutions will now occur to those skilled in the art without departing from the present disclosure. Furthermore, it shall be understood that all aspects of the present disclosure are not limited to the specific depictions, configurations or relative proportions set forth herein which depend upon a variety of conditions and variables. It should be understood that various alternatives to the embodiments of the present disclosure described herein may be employed in practicing the present disclosure. It is therefore contemplated that the present disclosure shall also cover any such alternatives, modifications, variations or equivalents. It is intended that the following claims define the scope of the present disclosure and that methods and structures within the scope of these claims and their equivalents be covered thereby.

What is claimed is:

1. A method of operating a cryogenic storage system, the method comprising:
   (a) providing a cryogenic tank comprising an inner door and an outer door through which one or more racks for storing one or more samples are insertable into or removable from the cryogenic tank, wherein the inner door and the outer door are positioned at different radial distances from a center of the cryogenic tank, and wherein the one or more racks are rotatable relative to (i) a center of the cryogenic tank and (ii) the inner door or the outer door;
   (b) positioning and orienting the one or more racks relative to the inner door and the outer door such that (i) a first set of racks sequentially aligns with the inner door when rotated by a first predetermined angle and (ii) a second set of racks sequentially aligns with the outer door when rotated by a second predetermined angle; and
   (c) controlling a robot apparatus that is located adjacent to the cryogenic tank to (i) selectively open or close the inner door or the outer door, and (ii) insert or withdraw the one or more racks into or out of the cryogenic tank through the inner door or the outer door.

2. The method of claim 1, wherein (b) comprises positioning and orienting the one or more racks such that the first set of racks is located at a first radial distance from the center of the cryogenic tank and the second set of racks is located at a second radial distance from the center of the cryogenic tank.

3. The method of claim 2, wherein the first radial distance is less than the second radial distance.

4. The method of claim 1, wherein (b) further comprises controlling the first set of racks to move along a first path that coincides with the inner door, and controlling the second set of racks to move along a second path that coincides with the outer door.

5. The method of claim 4, wherein (c) comprises controlling the robot apparatus to open the inner door to allow access to a first rack of the first set of racks when the first rack is positioned adjacent to or aligned with the inner door, and controlling the robot apparatus to open the outer door to allow access to a second rack of the second set of racks when the second rack is positioned adjacent to or aligned with the outer door.

6. The method of claim 1, wherein (b) comprises, for any rotational angle ranging from 0 degrees to 360 degrees, positioning at most a single rack of the one or more racks adjacent to or aligned with either the inner door or the outer door, thereby permitting the single rack to be removed from the cryogenic tank via either the inner door or the outer door.

7. The method of claim 1, wherein (b) comprises positioning a first rack of the first set of racks and a second rack of the second set of racks adjacent to or aligned with the inner door and the outer door at different time instances during a rotation of the one or more racks, such that no more than one rack from the first set of racks and the second set of racks is accessible via the inner door or the outer door at any given time instance.

8. The method of claim 1, wherein the center of the cryogenic tank and a center of the inner door lie along a first axis, and wherein the center of the cryogenic tank and a center of the outer door lie along a second axis that is different than the first axis.

9. The method of claim 1, wherein the first set of racks has a different angular orientation than the second set of racks relative to a radial line extending from the center of the cryogenic tank.

10. The method of claim 1, wherein a center of the inner door and a center of the outer door lie along an axis that is laterally offset from the center of the cryogenic tank by a predetermined distance.

11. The method of claim 1, wherein (b) comprises arranging the first set of racks as a first circular configuration of racks and the second set of racks as a second circular configuration of racks, wherein the first circular configuration of racks is concentric with the second circular configuration of racks.

12. The method of claim 1, wherein (b) comprises fixing a position or orientation of the first set of racks relative to the second set of racks.

13. The method of claim 12, wherein the position or orientation is fixed or maintained when the one or more racks are rotated relative to (i) the center of the cryogenic tank or (ii) the inner door or the outer door.

14. The method of claim 1, wherein (b) comprises using a rotatable frame structure to rotate the first set of racks and the second set of racks relative to the center of the cryogenic tank.

15. The method of claim 14, wherein (b) further comprises controlling the rotatable frame structure to collectively or simultaneously rotate the first set of racks and the second set of racks.

16. The method of claim 14, wherein (b) further comprises using the rotatable frame structure to (i) rotate the one or more racks by the first predetermined angle thereby positioning the first set of racks at or near the inner door by and (ii) rotate the one or more racks by the second predetermined angle thereby positioning the second set of racks at or near the outer door.

17. The method of claim 1, wherein (c) comprises controlling a robot apparatus to access the first rack of the first set of racks and the second rack of the second set of racks respectively via the inner door and the outer door in a sequential manner when the first set of racks and the second set of racks are rotated relative to the center of the cryogenic tank.

18. The method of claim 1, wherein (c) comprises controlling a puller of the robot apparatus to move the one or more racks into or out of the cryogenic tank, wherein the puller comprises a grip portion that is used to grip at least one of the inner door, the outer door, a first rack of the first set of racks, or a second rack of the second set of racks.

19. The method of claim 18, wherein (c) comprises controlling the puller to grip one of the inner door and the outer door and (i) place the inner door on the outer door to expose an inner open region, or (ii) place the outer door on the inner door to expose an outer open region.

20. The method of claim 19, wherein (c) comprises controlling a temporary door of the puller to temporarily close the inner open region or the outer open region when any one of the inner door or the outer door is opened.

* * * * *